US012718990B2

(12) United States Patent
Dayrell

(10) Patent No.: US 12,718,990 B2
(45) Date of Patent: Aug. 25, 2026

(54) FILTERING PATTERN FOR LASER BEAMS SUITABLE FOR THE PRODUCTION OF SUPERCAPACITORS

(71) Applicant: Ivan Araujo Dayrell, Sion (BR)

(72) Inventor: Ivan Araujo Dayrell, Sion (BR)

( * ) Notice: Subject to any disclaimer, the term of this patent is extended or adjusted under 35 U.S.C. 154(b) by 817 days.

(21) Appl. No.: 18/022,143

(22) PCT Filed: Aug. 21, 2020

(86) PCT No.: PCT/BR2020/050333
§ 371 (c)(1),
(2) Date: Feb. 18, 2023

(87) PCT Pub. No.: WO2022/036418
PCT Pub. Date: Feb. 24, 2022

(65) Prior Publication Data
US 2023/0335349 A1 Oct. 19, 2023

(51) Int. Cl.

| | |
|---|---|
| ***H01G 11/86*** | (2013.01) |
| ***B23K 26/064*** | (2014.01) |
| ***B23K 26/066*** | (2014.01) |
| ***B23K 26/082*** | (2014.01) |
| ***B23K 26/20*** | (2014.01) |

(Continued)

(52) U.S. Cl.
CPC ......... *H01G 11/86* (2013.01); *B23K 26/0643* (2013.01); *B23K 26/066* (2015.10); *B23K 26/082* (2015.10); *B23K 26/206* (2013.01); *B23K 26/359* (2015.10); *B23K 26/38* (2013.01); *G02B 27/30* (2013.01); *H01G 11/08* (2013.01);

(Continued)

(58) Field of Classification Search
None
See application file for complete search history.

(56) References Cited

U.S. PATENT DOCUMENTS 5,364,493 A 11/1994 Hunter, Jr. et al.
5,387,484 A 2/1995 Doany et al.
(Continued)

FOREIGN PATENT DOCUMENTS

JP H01-243062 A * 9/1989
KR 20168750 A 4/2017
WO WO2017201591 11/2017

OTHER PUBLICATIONS

JP H01-243062 A (Kamiya, Saburo) Sep. 27, 1989 [retrieved on Dec. 13, 2025]. Retrieved from Foreign Image and Text database, translation by Clarivate Analytics. (Year: 1989).*
(Continued)

*Primary Examiner* — John J Norton
(74) *Attorney, Agent, or Firm* — Z IP Law PLLC

(57) ABSTRACT

A method and apparatus comprising a manufacturing process, equipment and a product. The manufacturing process and equipment configured to produce very high precision parts using a laser beam. Embodiments of the manufacturing process and equipment provide an improved method for the production of supercapacitors with critical dimensions on the order of one to fifty microns that can store electricity at very high energy densities using a modified laser beam. Using the manufacturing process and equipment, the proposed improvements allow the production of key parts thousands of times faster than what can be achieved using the usual process, resulting in a manufacturing time suitable for mass production.

18 Claims, 26 Drawing Sheets

(51) Int. Cl.

| | |
|---|---|
| ***B23K 26/359*** | (2014.01) |
| ***B23K 26/38*** | (2014.01) |
| ***G02B 27/30*** | (2006.01) |
| ***H01G 11/08*** | (2013.01) |
| ***H01G 11/84*** | (2013.01) |
| ***H01G 13/00*** | (2013.01) |
| ***H01G 13/06*** | (2006.01) |

(52) U.S. Cl.

CPC ............. *H01G 11/84* (2013.01); *H01G 13/00* (2013.01); *H01G 13/06* (2013.01)

(56) References Cited

U.S. PATENT DOCUMENTS

| | | | | |
|---|---|---|---|---|
| 8,729,426 | B2 | 5/2014 | Rumsby | |
| 10,505,193 | B2 | 12/2019 | Tour et al. | |
| 2002/0192572 | A1 | 12/2002 | Lau | |
| 2007/0000884 | A1* | 1/2007 | Salama | B23K 26/0622 219/121.68 |
| 2008/0057718 | A1* | 3/2008 | Omata | B23K 26/382 257/E21.247 |
| 2015/0165563 | A1 | 6/2015 | Manley et al. | |
| 2017/0338058 | A1* | 11/2017 | Dayrell | H01G 11/36 |

OTHER PUBLICATIONS

International Search Report issued in PCT International Patent Application PCT/BR2020/050333 mailed on May 21, 2021.

Written Opinion issued in PCT International Patent Application PCT/BR2020/050333 mailed on May 21, 2021.

Jiang, Q. et al/Hybrid Microsupercapacitors with Vertically Scaled 3D Current Collectors Fabricated using a Simple Cut-and-Transfer Strategy (Adv. Energy Mater. 2017, 7, 1601257).

Tu, Yudi et al/Fabrication of reduced graphene oxide micro patterns by vacuum-ultraviolet irradiation: From chemical and structural evolution to improving patterning precision by light collimation (Carbon 119 (2017) 82-90).

Wang, C. et al/ Flexible graphene-based micro-capacitors using ultrafast laser ablation (Microelectronic Engineering 215 (2019) 111000).

* cited by examiner 30
31
X
32
33
Y 30
32
31
33
30
32

31

45
37a
38a
37b
38b
37c
38c
49j
41b
48j
48i
48h
41a
49g
48g
41c
49f
48f
49e
48e
39c
49d
48d
48c
48b
48a
34a
39a
34b
39b
34c
A
B
C
1
2
3
4
5
6
7
8
9
10
11
12
13
14
15
16

45
37a
39a
37b
39b
41b
37c
39c
48j
48i
48h
41a
48g
48f
48e
48d
48c
48b
48a
41c
34a
34b
34c
A
B
C
1
2
3
4
5
6
7
8
9
10
11
12
13
14
15
16

48a
48b
48c
48d
48e
48f
48g
42a
48h
48i
48j
46
35a
41a
A
44a
43a
49g
49j
34b
49e
37b
B
39b
49d
38b
41b
34c
39c
41c
37c
38c
C
1
2
3
4
5
6
7
8
9
10
11
12
13
14
15
16

46
44a
37b
39b
41b
37c
39c
48j
48i
48h
42a
48g
41a
41c
48f
48e
48d
48c
48b
48a
35a
A
34b
B
34c
C
1
2
3
4
5
6
7
8
9
10
11
12
13
14
15
16

47
41a
43a
42a
38b
37b
37c
38c
A
A
X
Y
34b
36a
34c 47
43a
41a
37b
38b
37c
38c
48h
41b
48g
49f
48f
41c
42a
49e
48e
39c
49d
48d
48c
48b
48a
36a
44a
34b
39b
34c
A
B
C
1
2
3
4
5
6
7
8
9
10
11
12
13
14
15
16

47
44a
41a
42a
36a
A
37b
39b
41b
34b
B
37c
39c
41c
34c
C
48a
48b
48c
48d
48e
48f
48g
48h
1
2
3
4
5
6
7
8
9
10
11
12
13
14
15
16

50
52a
51a
45
34a
34b
34c
32
30
X
54a
Y
52b
51b
53
54b
55
56

34a
34b
34c
32
30
45
50
53
51
57
54
55
X
Y 50
60
51a
59b
52
53
51b
59a
46
35a
34b
34c
32
30
33
X
Y
43a
38b
38c
54
55

60
50
51

59
46
43a
38b
35a
34b
34c
54
Y
55
X
32
33
30

69
70b
63b
67
68
62
70a
63a

FILTERING PATTERN FOR LASER BEAMS SUITABLE FOR THE PRODUCTION OF SUPERCAPACITORS

FIELD OF THE INVENTION

The present invention is related to a method and apparatus comprising a manufacturing process, equipment for the production of a product, and a product. The manufacturing process and equipment configured to produce very high precision parts using a laser beam. Embodiments of the manufacturing process and equipment provide an improved method for the production of supercapacitors with critical dimensions on the order of one to fifty microns that can store electricity at very high energy densities using a modified laser beam. Using the manufacturing process and equipment, the proposed improvements allow the production of key parts thousands of times faster than what can be achieved using the usual process, resulting in a manufacturing time suitable for mass production.

BACKGROUND

Laser beams have been extensively applied in many different areas in the manufacture of all sorts of small and big parts made of a wide variety of materials. Lasers have been proved as both reliable and precise and, in many areas, quickly evolved to become the industry standard method to produce a part or component.

Lasers offer many advantages allowing the user to select different levels of power, wavelength, pulse duration and width of the beam to achieve the desired result, whether it is a cut, an engraving, material removal, cleaning, drilling. welding, and many other options. Laser sources of all sorts of characteristics in terms of power, wavelength, modulation, advanced optics and control systems have been perfected and are now available off the shelf allowing a laser beam to be generated according to the needs of a particular process and be positioned with accuracy at relatively high speeds matching the demands for most applications.

The production of very high precision parts however poses a dauting challenge that has so far not been met by the available laser manufacturing processes. In particular, the production of a supercapacitors using materials such as graphene requires an extremely high number of very thin tracks with width and depth dimensions of less than fifty microns to be cut out of a graphene slab.

The tracks form a structure of two electrodes each one with a very high number of intertwined fringes that support an electrolyte and that are made as thin as possible so that more fringes can be accommodated in a given volume to as required produce a high-performance supercapacitor. The cuts required to separate adjacent fringes must be very precise and leave no undesired remains that could produce short circuits in the finished structure. The cuts also need to be done gently and in a controlled manner to avoid damaging the delicate structure rendering it less accessible to the electrolyte that in turn would result in negative impacts on the performance of the device.

This means a laser beam used to do the job cannot use more than a certain amount of power per unit area limiting the cutting speed and the depth of the cut. As it is advantageous to use thick slabs to increase the amount of active material in the supercapacitor the limitations in cut speed and depth result in a compound problem for manufacturing time. A very narrow beam of limited power thin enough to cut the fringes apart to form each electrode must be made to follow a very precise path that in most cases may have a total combined length of hundreds of thousands of meters to produce the number of required fringes within the three-dimensional volume of the graphene or other conductive material of only a few centimeters. Additionally, this beam must pass exactly over the same path many times to achieve the goal of a clean cut along each channel and all the way through the bottom of the slab. Depending on the size of the structure several hours or even days may be required to produce the parts needed. This is not practical for mass production of affordable devices.

An obvious possibility is to use multiple laser beams, but this is not easy and causes serious problems. The alignment of the multiple individual beams must be perfect; a single misaligned beam may result in produced parts with impaired performance and the problem can very easily reach a point that the parts become inoperative. As the requirements for both beam positioning precision and beam movement speed tend to push the limits of the laser positioning system this becomes even more challenging as high speeds tend to introduce some jitter in the effective beam positioning.

Another problem is maintenance. As the positioning system is required to operate constantly near its limits for extended periods of time, normal wear and tear may result in frequent need to realign the beams and periodic replacement of affected components resulting in down time for maintenance and increased operational costs.

Using advanced optics to split a laser beam into multiple parallel beams is also not satisfactory. An optical device able to produce thousands of perfectly parallel beams is difficult to construct and expensive to buy. The optic design parameters need to be very narrowly adjusted to the laser wavelength, power, etc. resulting in only one fixed beam configuration. Many different optics may be required to produce all the features in a part design and integrating all these pieces with the required level of precision in a streamlined production line is very difficult. The fact that these multiple beam optic devices can only do one job for one specific part results in poor flexibility as a manufacturer is requested to produce many different components for different applications requiring therefore an excessive number of custom devices and custom production lines with correspondent cost impact.

Even if a solution can be found to align multiple beams and make them operate with reduced down time, this may still not be enough in practice because so many beams cannot be made to simultaneously operate in a particular part for many reasons including heat dissipation, laser attenuation by the vaporized gas cloud produced by too many lasers and cost. A solution that can deliver a thousand-time factor in the manufacturing performance at an affordable cost is needed to allow supercapacitors made using materials such as graphene to be economically made with lasers.

SUMMARY OF THE INVENTION

Technical Problem

Laser beams have been used extensively in manufacturing processes for many decades now. There are many options among wavelengths, power levels, pulse width, focusing and positioning devices to choose from. This great variety of choices for equipment and configuration suits the needs for most applications and produces very good results and is the main reason why lasers have been so successfully integrated into manufacturing processes in many different areas such as cutting, cleaning, engraving, welding, measuring, and many others.

There are many variations of equipment, configurations and materials but in most applications the common aspect is that a laser beam is produced, collimated, focused, pointed to a target and stopped once it has achieved the intended goal. In some cases, the laser beam is pulsated over convenient periods of time that can be very short to produce the intended result. But in almost all cases what strikes the target is a single beam or a beam composed of a relatively small number of rays that have been produced using optic devices to split the original beam in a very specific and fixed way given by the optic device design.

An important part of typical laser manufacturing equipment is a control system that can deflect the laser beam using mirrors or prisms and position the beam accurately where it is intended to reach and at the same time be able to move the mirror or prism so that the beam can move at relatively high speeds without losing accuracy to improve production speed.

Despite all this flexibility, existing laser systems face difficulties when used to manufacture smaller size parts with a very high number of tiny and intricate details such as a graphene supercapacitor. Laser beams have been proposed to construct a graphene supercapacitor either by cutting the supercapacitor fringes out of a piece of material containing graphene or by drawing the fringes into a block of graphene oxide. In the latter case, the laser heats the material causing the reduction of the graphene oxide, a substance that does not conduct electricity, into graphene, a substance that is a good conductor of electricity.

The reduction of graphene oxide is simpler to implement but has a big disadvantage because this approach produces a two-dimensional 2D supercapacitor. As the graphene oxide remains in the structure only the top portions of the material where the graphene oxide was reduced in the areas that were hit by the laser form the graphene tracks that are accessible to the electrolyte. As the energy storage capability of a supercapacitor is proportional to the active area of the graphene that is in contact with the electrolyte, then this approach cannot compete with another method that produces a three-dimensional 3D graphene structure where all the exposed graphene layers have access to the electrolyte.

Such a structure could in principle be created by cutting a thick slab of graphene into many thin fringes leaving channels between any two adjacent fringes that are then filled with the electrolyte. That is the goal of a graphene supercapacitor manufacturer in order to produce a 3D graphene lattice with very high aspect ratio and higher energy storage capability than a 2D supercapacitor.

The challenge however to cut a thick slab of graphene into many tiny fringes is significant. To achieve best results, the fringes must be as thin as possible, orders of magnitude smaller than the other dimensions of the device. This means a mechanical cutting tool cannot be used. A particle beam ion or electron beam, or a laser beam are the only possibilities. Laser beams have been better developed for manufacture and are more easily procured and are therefore less expensive and tend to be more effective than electron or ion beams. Lasers appear to be the best choice in this situation, but the challenge remains exceedingly difficult.

The focus is a big challenge. Producing a very narrow laser beam requires very precise collimation and focus and the required optics impose a very short focal distance that is incompatible with trying to cut a structure with very high aspect ratio. The focusing problem imposes restrictions on the aspect ratio, limiting the maximum thickness of material that can be cut with respect to the beam diameter using traditional laser systems.

The target for a good supercapacitor though remains the same, obtaining a high aspect ratio or much higher thickness than the beam width. Supposing the focus problem could somehow be solved, for the purpose of understanding the other implications of using high aspect ratio, the calculations for a hypothetical example follow in the next paragraphs.

Assuming the graphene slab being cut has dimensions of 10 cm long by 5 cm wide and 1 cm thick, about the size typical of a handheld device battery, and the dimensions of a single fringe are in the range of one micron, the fringes will be four orders of magnitude smaller than the other dimensions and the aspect ratio, the fringe width to slab thickness, will be 1:10000, very high indeed.

Assuming a 1 μm thin laser beam could be produced, positioned and focused with very high accuracy to cut the channels separating the fringes, this would require 24999× 10 cm long cuts to make all the 25000 fringes in the 5 cm width. Assuming a laser maximum velocity of 1 m/s, that will require 2499 seconds or approximately 42 minutes for a single pass.

The problem is compounded because at 1 m/s the laser beam cannot cut very deep into the material as that would require a high level of power that in turn would damage the delicate structure being created. Using high power causes too much heat to enter the structure at a single point causing the surrounding areas to heat up to near the melting point and become weakened. Additionally, too much power produces too much vaporized material in the illuminated laser spot that does not have time to escape the structure producing a pressure wave that warps the fragile partially melted material in the vicinity. Furthermore, the produced vaporized material absorbs part of the incident power reducing the effective power and therefore the ability to remove additional material.

As a result, at 1 m/s at a reasonable level of power, the laser beam will be able to cut just a thin layer of the material generating the need for multiple passes to complete the structure. Assuming a value of 10 μm cut at each pass, a value that is achievable considering practical focusing limitations, to cut all the way down to 1 cm, 1000 passes will be required and the time needed to complete the structure working 24/7 will be in the order of 29 days.

Even assuming very optimistic and improbable improvements, multiplying the laser speed by a factor of 10 and the amount of material removed at each pass by another factor of 10 and even using multiple laser beams simultaneously disregarding the very demanding alignment and synchronization challenges among all beams and the focusing limitations, the manufacturing time would still be too high and by any measure impractical for mass production. Even more so if considered that the calculations in the above paragraphs were made for a single supercapacitor with dimensions compatible with a handheld device. The challenge to mass produce devices to be used not only in handheld devices but also with electric cars, photovoltaic arrays, wind turbines and other applications that require much larger electricity storage capacities, hence require larger device sizes, is even more daunting. A better solution is needed.

Technical Solution

An object and advantage of the invention is a filtering device composed of one or more filtering patterns that serves as a template to produce a specific part by a process of laser cutting.

Another object and advantage of the invention is to use several different filtering devices each one with a specific design to produce entire parts or specific regions of a part by a process of laser cutting.

Another object and advantage of the invention is a filtering device composed of one or more filtering patterns that serves a similar function as a beam splitter and collimator for the laser beam.

Another object and advantage of the invention is the use of a filtering device composed of one or more filtering patterns with the first filtering pattern placed at an angle to the laser beam so that the reflected laser beam is not reflected back to the laser source.

Another object and advantage of the invention is a manufacturing method of using a filtering device composed of one or more filtering patterns to split one or multiple laser beams into a plurality of collimated child laser beams following the pattern contained in the filtering patterns and use the child laser beams to do the intended job of cutting the material increasing the accuracy and speed of the process.

Another object and advantage of the invention is an advanced double layer graphene supercapacitor manufactured using the proposed method of using a filtering device composed of one or more filtering patterns to split one or multiple laser beams into a plurality of collimated child laser beams following the pattern contained in the filtering patterns and use the child laser beams to do the intended job increasing the accuracy and speed of the process.

Accordingly, the present invention is related to a filtering pattern for the collimation of a laser beam, comprising a glass layer; a sealant layer comprising a pattern; wherein the sealant layer is formed on a surface of the glass layer and the sealant layer is designed to absorb the laser beam; wherein the pattern in the sealant layer is formed by a plurality of gaps, the gaps designed to allow the laser beam to pass through the sealant layer and produce cuts on a substrate; and the pattern formed by the plurality of gaps is on a 1 to 1 scale to the cuts on the substrate.

Furthermore, the present invention is related to a filtering device for the collimation of a laser beam comprising a plurality of filtering patterns each filtering pattern comprising a pattern formed by a plurality of gaps, the gaps designed to allow the laser beam to pass through the sealant layer and produce cuts on the substrate; wherein the plurality of filtering patterns are placed at variable distances to each other in perfect alignment so that when seen from the point of view of the incident laser beam all filtering patterns are seen as a single filtering pattern and correspondent gaps in the filtering patterns are seen as a single gap; wherein the filtering device is configured to reflect or absorb portions of a laser beam that enter the plurality of filtering patterns at a diversion angle non-perpendicular to the plurality of filtering patterns and at an angle greater than the angle allowed by the edges of correspondent gaps in the first and last filtering pattern and smaller than the maximum diversion angle of the laser source.

Furthermore, the present invention is related to a method for the production of a supercapacitor using a filtering device and laser, comprising forming a plurality of filtering patterns with gaps in the intended pattern to be created; aligning a plurality of filtering patterns with a laser source; aligning a substrate to the plurality of filtering patterns; emitting a laser beam from the laser source; reflecting or absorbing portions of the laser beam that encounter a reflective or absorptive structure in any of the plurality of filtering patterns; cutting the substrate with the portion of the laser beam entering the gaps to produce the pattern contained in the filtering patterns, resulting in a structure with a first terminal and a second terminal of a supercapacitor.

Advantageous Effects of the Invention

The proposed invention uses a simple yet effective filtering device that works as a laser beam splitter producing several thousand child laser beams from a single parent laser beam. The filtering device is constructed with the same shape of the part being produced and allows for multiple laser beams to work on different areas of the same part simultaneously further improving the manufacturing time. The proposed filtering device also works as a collimator, reducing the laser dispersion angle without the need of complicated optics.

The proposed filtering device works as a template for the part being produced. The filtering device is kept in the same position relative to the part at all times eliminating the need for precise control of the parent laser beam used. Even if the laser beam moves with jitter, if it is shut off and turned on again or if it works with poor synchronicity and poor alignment with other laser beams in the manufacture of a particular part, the filtering device filters all imprecision out of the process and allows only precise child laser beams to pass and make quick clean cuts in the part.

The proposed invention has the advantage of allowing a very quick and precise manufacture of the intended parts in a time frame several thousand times shorter than using existing processes and that could not be attainable in any other way.

The proposed invention has the advantage to be very simple and cheap, dramatically reducing manufacturing costs. Because of the simplicity and low cost, different filtering devices can be easily and quickly constructed to manufacture supercapacitors to a very wide range of dimensions and specifications to match the needs for different applications.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EMBODIMENTS

The present invention is composed of an apparatus designed to achieve the goal of making a very high number of very thin cuts into a thick layer of material. This apparatus can be used for many applications and in particular to create a functional double layer, three-dimensional supercapacitor.

The material can be made of graphene and a binder; a mixture of graphene, carbon nanotubes, fullerenes and activated carbon and a binder; a block of graphite, or of another conductive or other type material. The binder can be a resin, plastic, glue or another substance that serves as a base or solvent for all the components so they can be properly mixed and then after an adequate treatment settle into a solid. The material can also be pressed into a solid using a hydraulic press or smelted and cast into a mold and machined into the final intended shape. The laser cutting apparatus can be used in a wide variety of materials and the reference to graphene and other components such as carbon nanotube, activated carbon, fullerenes and graphite is made only because those are the best suited materials to produce a high energy density double layer supercapacitor that is an object of this invention.

For consistence and to avoid unnecessary redundancy, the piece of material being cut regardless of its composition is henceforward called graphene layer. That does not infer that only graphene is used or that other materials such as graphite or even metals cannot be cut using the proposed invention. The invention is therefore not limited to any specific material.

While references may be made to upper, lower, vertical and horizontal, these terms are used merely to describe relationships and not to limit the operation or use of the present invention to any one orientation.

First Embodiment

Figures 1, 2, 3:
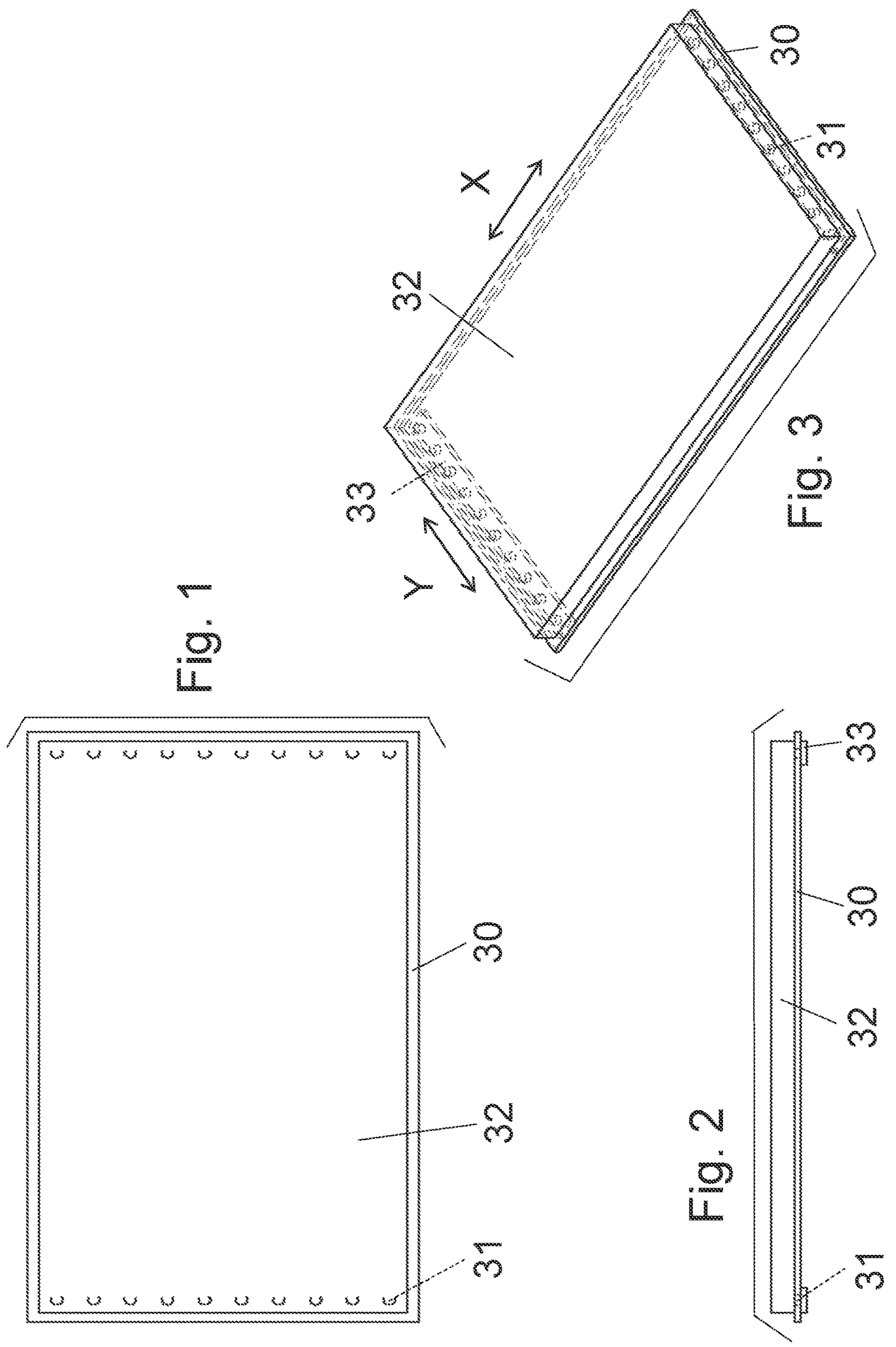
FIG. 1 is a top view of an embodiment of a substrate with an applied graphene layer in this embodiment although layers of other conductive material may be applied and are within the scope of the present invention meaning that the invention is not limited to any specific conductive or other type of material, FIG. 1 showing perforations in an embodiment of the laser cutting filtering device of the present invention.
FIG. 2 is a side elevation view of the substrate of the embodiment of FIG. 1 with applied graphene layer showing under contacts in an embodiment of the laser cutting filtering device of the present invention.
FIG. 3 is an isometric view of the embodiment of FIG. 1 of the substrate with applied graphene layer and under contacts in an embodiment of the laser cutting filtering device of the present invention.

FIG. 1 shows a substrate 30 where a series of perforations 31 are made at both ends of the substrate. The substrate 30 can be made using a very thin plastic film, a thin sheet of glass or a thin sheet of a suitable insulting material. A graphene layer 32 is then applied on top of the substrate 30 in such a way to cover the surface and to flow through to cover surfaces through all the perforations 31. To ensure that the graphene layer 32 has a good bond to the substrate 30, a surface treatment such as surface plasma eroding process can be applied to the substrate 30 if necessary.

FIG. 2 shows the substrate 30 and the graphene layer 32 from a side angle to better illustrate the differences in thickness between the substrate that is made as thin as possible and the graphene layer 32 that is made as thick as possible with the limitation on thickness being dependent on the graphene layer 32 being suitable to cut through its entire thickness by the process. Beneath the substrate 30 a pair of under contacts 33 is created out of the same material that is used to create the graphene layer 32. The perforations 31 create a series of bridges that are filled with the same material as the graphene layer 32 and the under contacts 33 in such a way that the graphene layer 32 and the under contacts 33 remain physically and electrically connected across the substrate 30.

FIG. 3 shows an isometric view of the graphene layer 32 applied over the substrate 30 also showing the perforations 31 and the under contacts 33 in dashed lines to better illustrate the produced part that will be cut using the apparatus of this invention. The X-axis along the length and the Y-axis along the width of the graphene layer are indicated by the arrows. These directions are indicated in the same way in other drawings and will be used later on as reference and to explain the operation.

Figures 4, 4A:
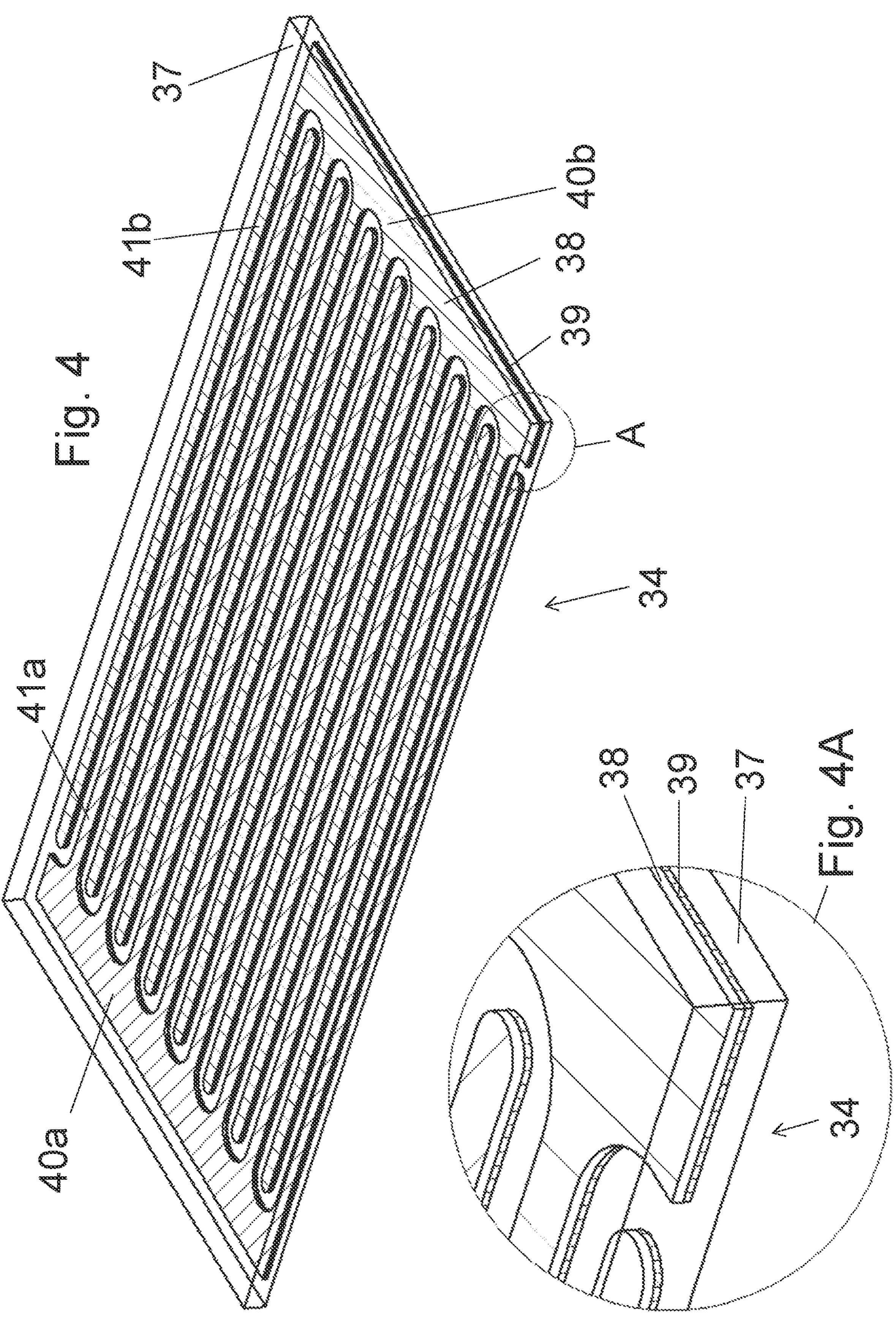
FIG. 4 is an isometric view of an embodiment of a filtering pattern in an embodiment of the laser cutting filtering device of the present invention.
FIG. 4A is a detail view of an embodiment of a filtering pattern showing the sealant layer in an embodiment of the laser cutting filtering device of the present invention.

FIG. 4 shows an embodiment of a filtering pattern 34 that is composed of a glass layer 37 with portions of the glass layer 37 coated with a mirror layer 38 along the underside of the glass layer 37 with the mirror layer 38 formed in a pattern.

The glass layer 37 works as support and protection from oxidation to the mirror layer 38. The mirror layer 38 is created with a thin layer of a highly reflective material in the laser bandwidth used and with the same template in a 1:1 scale as the structure that is intended to be created in the graphene layer. The mirror layer 38 in some embodiments is coated at the underside, opposite to the glass layer 37, with a dark sealant layer 39 in the same shape as the mirror layer 38 to protect the mirror layer 38 from oxidation and to absorb any laser light hitting the underside of the mirror layer 38.

As the embodiment of the filtering pattern 34 shown in FIG. 4 is used to create a graphene supercapacitor the mirror layer 38 is constructed in the shape of two intertwined structures each one composed of a terminal 40*a*, 40*b* and a set of parallel fringes 41*a*, 41*b* in such a way that the two terminals 40*a*, 40*b* are each connected to its own set of fringes 41*a*, 41*b* respectively but not to any of the fringes belonging to the set of the other terminal. In other words, there is no connection between the two terminals 40*a*, 40*b* that remain physically separated from each other. The mirror layer 38 and sealant layer 39 patterns may be formed through a photoresist process that can achieve a consistent resolution of fifty nanometers in order to produce electrodes that are sufficiently precise and uniform to achieve supercapacitors having high energy densities as described in U.S. Pat. No. 10,373,765 to the same inventor or by etching or other processes.

Detail FIG. 4A shows a small part of the filtering pattern 34 in greater magnification to show the placement of the glass layer 37, the mirror layer 38 and the sealant layer 39 in better detail. The sealant layer 39, shown in thick hatched lines, has the same shape as the mirror layer 38 and the sealant layer 39 is placed directly under the mirror layer 38 to prevent oxidation and consequent degradation of the mirror layer 38.

Figure 5:
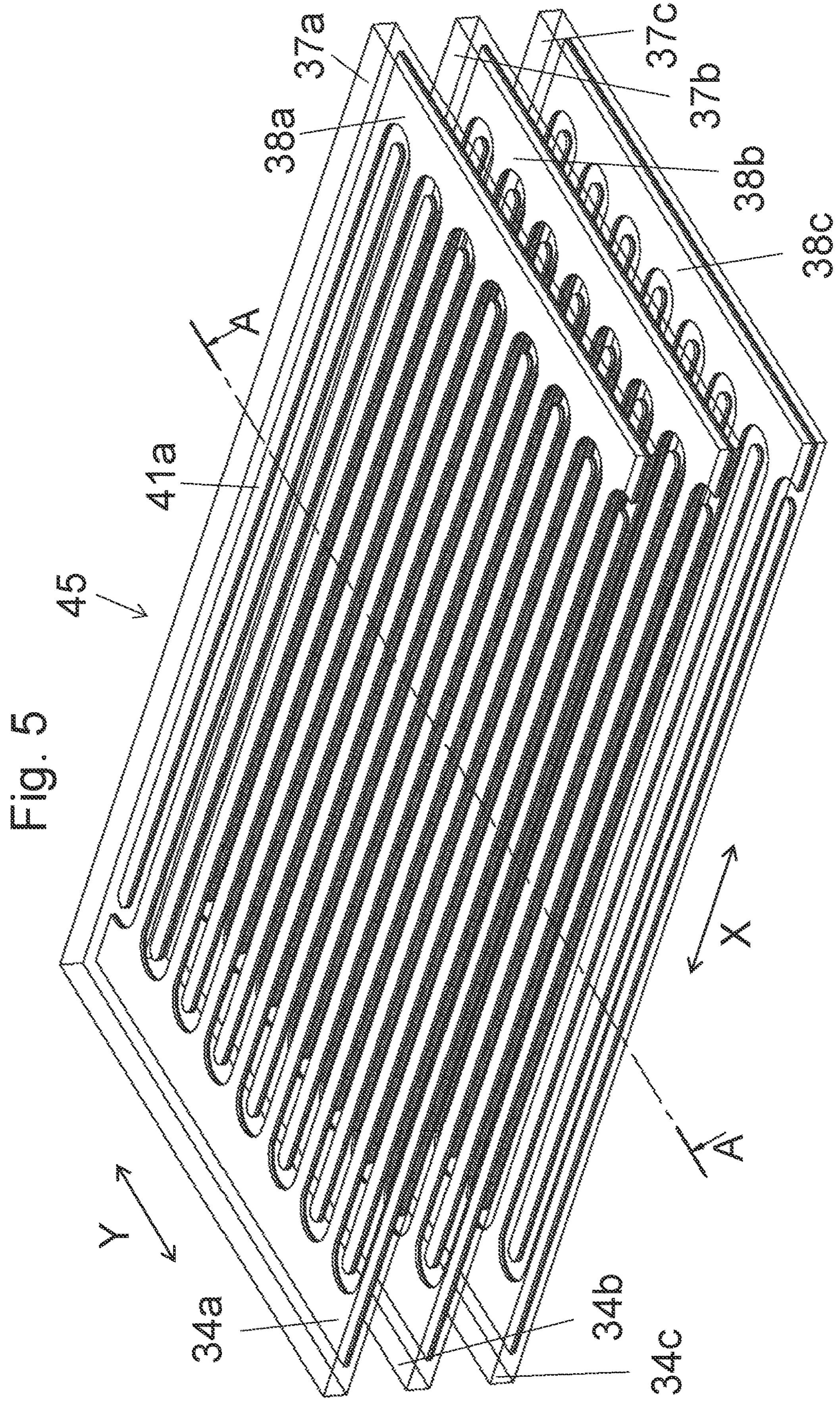
FIG. 5 is an isometric view of an embodiment of a filtering device of the present invention.

FIG. 5 shows an embodiment of a filtering device 45 made with one or more, three in the embodiment shown in FIG. 5, filtering patterns 34*a*, 34*b*, 34*c*. The filtering patterns 34*a*, 34*b*, 34*c* are all identical, composed of the glass layer 37*a*, 37*b*, 37*c* coated with the mirror layer 38*a*, 38*b*, 38*c* on the underside. The filtering patterns 34*a*, 34*b*, 34*c* are placed at variable distances to each other with all filtering patterns 34*a*, 34*b*, 34*c* placed in perfect alignment to each other so that when seen from above the mirror layers 38*a*, 38*b*, 38*c* are all in perfect alignment. A section plane perpendicular to the filtering patterns 34*a*, 34*b*, 34*c* at a point where the mirror layers 38*a*, 38*b*, 38*c* contain only parallel fringes 41*a* is indicated by the section line A-A.

Figure 5A:
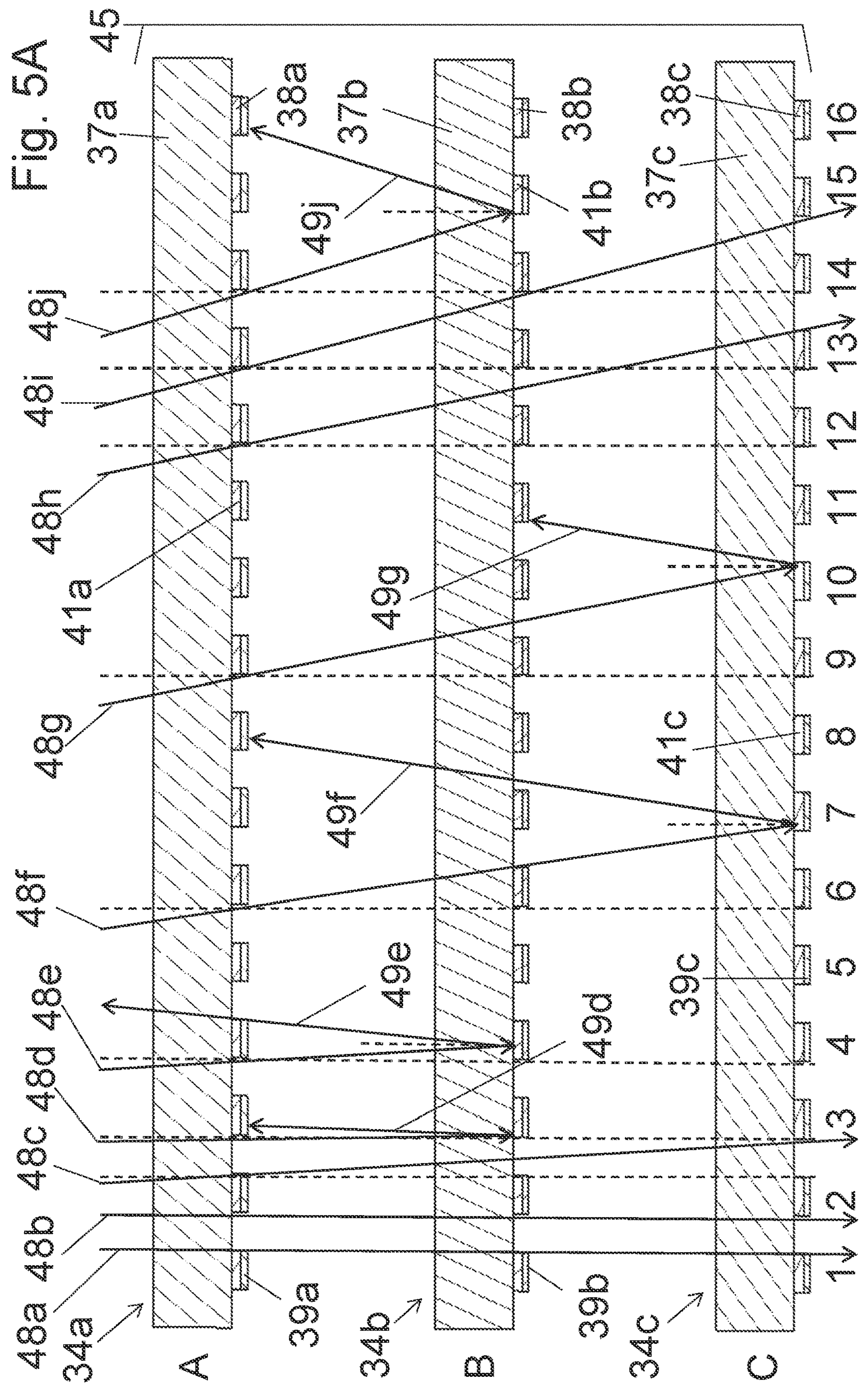
FIG. 5A is a cross-sectional view of the filtering device of FIG. 5 showing the propagation of different incoming rays according to various incidence angles and entry points in an embodiment of the laser cutting filtering device of the present invention.

FIG. 5A shows a cross-section of the filtering device 45 shown in FIG. 5 along the A-A section line. The filtering patterns 34*a*, 34*b*, 34*c* are sectioned by a plane perpendicular to the respective glass layers 37*a*, 37*b*, 37*c* and the mirror layers 38*a*, 38*b*, 38*c*. The sealant layers 39*a*, 39*b*, 39*c* are seen directly below the mirror layers 38*a*, 38*b*, 38*c*.

The filtering patterns 34*a*, 34*b*, 34*c* are placed at variable distances apart from each other in perfect alignment so that when seen from above all fringes 41*a*, 41*b*, 41*c* as well as the other structures of the mirror layers 38*a*, 38*b*, 38*c* and the sealant layers 39*a*, 39*b*, 39*c* are all in perfect alignment.

A series of incoming rays 48*a* through 48*j* and for the incoming rays that are reflected a series of corresponding reflected rays 49*d* through 49*j* are shown to illustrate the geometry and workings of the filtering device 45.

To facilitate the identification of individual fringes a grid structure with letters and numbers has been created. This way to refer to the fringe 41*a*, the reference A11 can be used. Likewise, the fringe 41*b* can be appointed by the reference B15 and the fringe 41*c*, by the reference C8. Using this grid structure it is easy to note that the fringes A1, B1, and C1 are in perfect alignment and likewise any fringes with different letters but with the same number are aligned.

Any set of fringes with different letters but with the same number that are aligned create a channel that allows incoming rays to pass through. Any incoming ray hitting a fringe at any level is reflected.

The incoming ray 48*a* goes through all filtering patterns 34*a*, 34*b*, 34*c* as it is perpendicular to the filtering patterns and does not intercept any fringe, passing just to the right of the fringes located at position 1. Likewise the incoming ray 48*b* also goes through all filtering patterns 34*a*, 34*b*, 34*c* as it is perpendicular to the filtering patterns and does not intercept any fringe, passing just to the left of the fringes located at position 2. The incoming ray 48*a* and the incoming ray 48*b* pass at the edges of the channel 1-2, between the fringes located at the positions 1 and 2.

The incoming ray 48*c* goes through all filtering patterns 34*a*, 34*b*, 34*c* at the maximum possible diversion angle with the normal to the filtering patterns allowed for a ray going through a given channel, passing just at the right of the fringe located at A2 and to the left of the fringe located at C3. The diversion angle can be ascertained using the dashed line drawn perpendicular to the filtering patterns at the point where the incoming ray 48*c* passes the fringe located at A2.

The incoming ray 48*d* goes through the filtering pattern 34*a*, passing just at the left of the fringe located at A3. The incoming ray 48*d* has a smaller diversion angle than the maximum diversion angle of the incoming ray 48*c*, but because it passes just at the left edge of the channel 2-3 it does not go all the way through. Instead it hits the fringe located at B3 and is reflected. The reflected ray 49*d* goes back and is absorbed by the sealant layer at the back of the fringe located at A3.

The incoming ray 48*e* goes through the filtering pattern 34*a*, passing just at the left of the fringe located at A4. The incoming ray 48*e* has a larger diversion angle than the diversion angle of the incoming ray 48*d* so it hits the fringe located at B4 further to the right than the incoming ray 48*d* hits the fringe located at B3. As a result the reflected ray 49*e* misses the sealant layer at the back of the fringe located at A4 and continues back towards the laser source as any other incoming ray hitting a fringe of the filtering pattern 34*a*.

The incoming ray 48*f* goes through the filtering pattern 34*a*, passing just at the left of the fringe located at A6. The incoming ray 48*f* has a larger diversion angle than the diversion angle of the incoming ray 48*e* just sufficient for it to go through the filtering pattern 34*b* missing the fringe located at B6 continuing until it hits the fringe located at C7. The reflected ray 49*f* goes back, misses the fringes located at B7 and B8 and is absorbed by the sealant layer at the back of the fringe located at A8.

The incoming ray 48*g* goes through the filtering pattern 34*a*, passing just at the left of the fringe located at A9. The incoming ray 48*g* has a larger diversion angle than the diversion angle of the incoming ray 48*f* the maximum possible for it to go through the filtering pattern 34*b* but not go through the filtering pattern 34*c* hitting the fringe located at C10. The reflected ray 49*g* goes back and is absorbed by the sealant layer at the back of the fringe located at B11.

The incoming ray 48*h* goes through the filtering pattern 34*a*, passing just at the left of the fringe located at A12. The incoming ray 48*h* has a larger diversion angle than the diversion angle of the incoming ray 48*g* exceeding the maximum possible diversion angle that still hits any fringe. As a result, the incoming ray 48*h* goes through all filtering patterns 34*a*, 34*b*, 34*c* exiting the filtering device 45 just at the right of the fringe located at C13.

The incoming ray 48*i* goes through the filtering pattern 34*a*, passing just at the left of the fringe located at A13. The incoming ray 48*i* has a larger diversion angle than the incoming ray 48*h* and at the same time still misses all fringes. As a result the incoming ray 48*i* goes through all filtering patterns 34*a*, 34*b*, 34*c* exiting the filtering device 45 just at the left of the fringe located at C15.

The incoming ray 48*j* goes through the filtering pattern 34*a*, passing just at the left of the fringe located at A14. The incoming ray 48*j* has a larger diversion angle than the diversion angle of the incoming ray 48*i* causing it to hit the fringe located at B15. The reflected ray 49*j* goes back and is absorbed by the sealant layer at the back of the fringe located at A16.

The embodiment of the filtering device 45 with three filtering patterns 34*a*, 34*b*, 34*c* as shown in FIG. 5 and FIG. 5A allows unwanted incoming rays with diversion angles equal or greater than the diversion angle of the incoming ray 48*h* to potentially go through. In fact a series of diversion angle ranges are allowed through the first diversion angle range between the diversion angle of the incoming ray 48*h* and the diversion angle of the incoming ray 48*i*. The laser source used must have sufficient collimation to produce laser beams with smaller diversion angles than the diversion angle of incoming ray 48*h*. If sufficient collimation is not attainable, additional filtering patterns can be used to guarantee that all laser beams produced hitting the filtering device 45 at an unwanted angle are stopped.

Figure 5B:
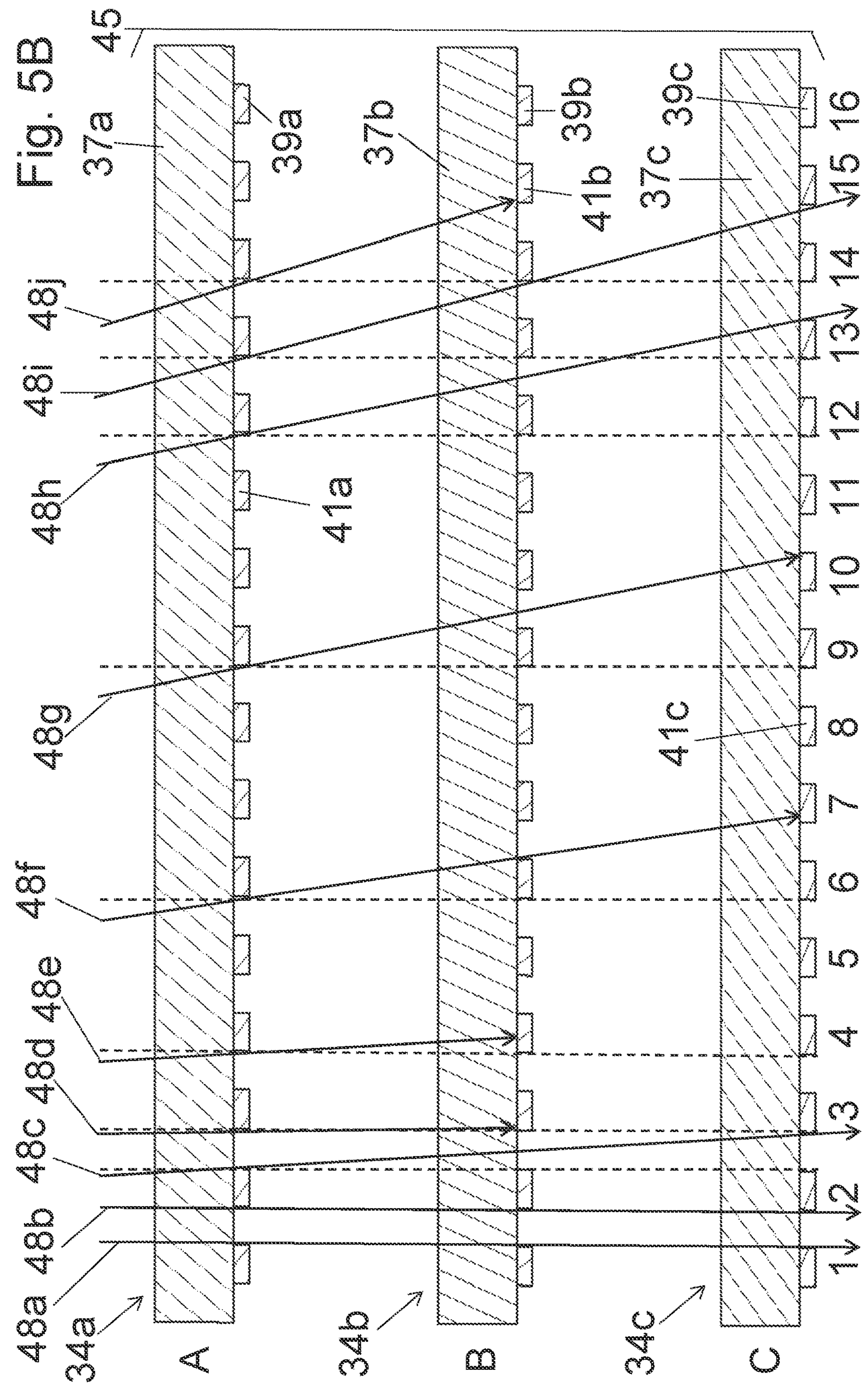
FIG. 5B is a cross-sectional view of an alternative embodiment of the filtering device of FIG. 5 showing the propagation of different incoming rays according to various incidence angles and entry points in an embodiment of the laser cutting filtering device of the present invention.

FIG. 5B shows a cross-section of an alternative embodiment of the filtering device 45 shown in FIG. 5 along the A-A section line. The filtering patterns 34*a*, 34*b*, 34*c* are sectioned by a plane perpendicular to the respective glass layers 37*a*, 37*b*, 37*c* but differently from the embodiment show in FIG. 5A, the mirror layers are not applied and instead only the sealant layers 39*a*, 39*b*, 39*c* that absorb the laser light are present.

The filtering patterns 34*a*, 34*b*, 34*c* are assembled at variable distances to each other but every filtering pattern 34*a*, 34*b*, 34*c* is placed in perfect alignment to each other so that when seen from above all fringes 41*a*, 41*b*, 41*c* as well as the other structures of the sealant layers 39*a*, 39*b*, 39*c* are all in perfect alignment.

A series of incoming rays 48*a* through 48*j* are shown to illustrate the geometry and workings of the filtering device 45.

As noted above, to facilitate the identification of individual fringes a grid structure with letters and numbers has been created. This way to refer to the fringe 41*a*, the reference A11 can be used. Likewise, the fringe 41*b* can be appointed by the reference B15 and the fringe 41*c*, by the reference C8. Using this grid structure it is easy to note that the fringes A1, B1, and C1 are in perfect alignment and likewise any fringes with different letters but with the same number are aligned.

Any set of fringes with different letters but with the same number that are aligned create a channel that allows incoming rays to pass through. Any incoming ray hitting a fringe at any level is absorbed.

The incoming ray 48*a* goes through all filtering patterns 34*a*, 34*b*, 34*c* as it is perpendicular to the filtering patterns and does not intercept any fringe, passing just to the right of the fringes located at position 1. Likewise the incoming ray 48*b* also goes through all filtering patterns 34*a*, 34*b*, 34*c* as it is perpendicular to the filtering patterns and does not intercept any fringe, passing just to the left of the fringes located at position 2. The incoming ray 48*a* and the incoming ray 48*b* pass at the edges of the channel 1-2, between the fringes located at the positions 1 and 2.

The incoming ray 48*c* goes through all filtering patterns 34*a*, 34*b*, 34*c* at the maximum possible diversion angle with the normal to the filtering patterns allowed for a ray going through a given channel, passing just at the right of the fringe located at A2 and to the left of the fringe located at C3. The diversion angle can be ascertained using the dashed line drawn perpendicular to the filtering patterns at the point where the incoming ray 48*c* passes the fringe located at A2.

The incoming ray 48*d* goes through the filtering pattern 34*a*, passing just at the left of the fringe located at A3. The incoming ray 48*d* has a smaller diversion angle than the maximum diversion angle of the incoming ray 48*c*, but because it passes just at the left edge of the channel 2-3 it does not go all the way through. Instead it hits the fringe located at B3 and is absorbed.

The incoming ray 48*e* goes through the filtering pattern 34*a*, passing just at the left of the fringe located at A4. The incoming ray 48*e* has a larger diversion angle than the diversion angle of the incoming ray 48*d* so it hits the fringe located at B4 further to the right than the incoming ray 48*d* hits the fringe located at B3 and is also absorbed.

The incoming ray 48*f* goes through the filtering pattern 34*a*, passing just at the left of the fringe located at A6. The incoming ray 48*f* has a larger diversion angle than the diversion angle of the incoming ray 48*e* just sufficient for it to go through the filtering pattern 34*b* missing the fringe located at B6 continuing until it hits the fringe located at C7 where it is absorbed.

The incoming ray 48*g* goes through the filtering pattern 34*a*, passing just at the left of the fringe located at A9. The incoming ray 48*g* has a larger diversion angle than the diversion angle of the incoming ray 48*f* the maximum possible for it to go through the filtering pattern 34*b* but not go through the filtering pattern 34*c* hitting the fringe located at C10 where it is absorbed.

The incoming ray 48*h* goes through the filtering pattern 34*a*, passing just at the left of the fringe located at A12. The incoming ray 48*h* has a larger diversion angle than the diversion angle of the incoming ray 48*g* exceeding the maximum possible diversion angle that still hits any fringe. As a result, the incoming ray 48*h* goes through all filtering patterns 34*a*, 34*b*, 34*c* exiting the filtering device 45 just at the right of the fringe located at C13.

The incoming ray 48*i* goes through the filtering pattern 34*a*, passing just at the left of the fringe located at A13. The incoming ray 48*i* has a larger diversion angle than the incoming ray 48*h* and at the same time still misses all fringes. As a result the incoming ray 48*i* goes through all filtering patterns 34*a*, 34*b*, 34*c* exiting the filtering device 45 just at the left of the fringe located at C15.

The incoming ray 48*j* goes through the filtering pattern 34*a*, passing just at the left of the fringe located at A14. The incoming ray 48*j* has a larger diversion angle than the diversion angle of the incoming ray 48*i* causing it to hit the fringe located at B15 where it is absorbed.

The embodiment of the filtering device 45 with three filtering patterns 34*a*, 34*b*, 34*c* as shown in FIG. 5 and FIG. 5B allows incoming rays with diversion angle equal or greater than the diversion angle of the incoming ray 48*h* to potentially go through. In fact a series of diversion angle ranges are allowed through, the first diversion angle range between the diversion angle of the incoming ray 48*h* and the diversion angle of the incoming ray 48*i*. The laser source used must have sufficient collimation to produce laser beams with smaller diversion angles than the diversion angle of incoming ray 48*h*. If sufficient collimation is not attainable, additional filtering patterns can be used to guarantee that all laser beams produced hitting the filtering device 45 at an unwanted angle are stopped and absorbed by the sealant layers 39*a*, 39*b*, 39*c*.

Because in the embodiment shown in FIG. 5B the laser beams are absorbed by the fringes of the sealant layers 39*a*, 39*b*, 39*c*, depending on the power of the laser source used, some cooling method to prevent damage to the sealant layers 39*a*, 39*b*, 39*c* is required. This can be done easily for example by blowing cool air between the filtering patterns 34*a*, 34*b*, 34*c*.

Figure 6:
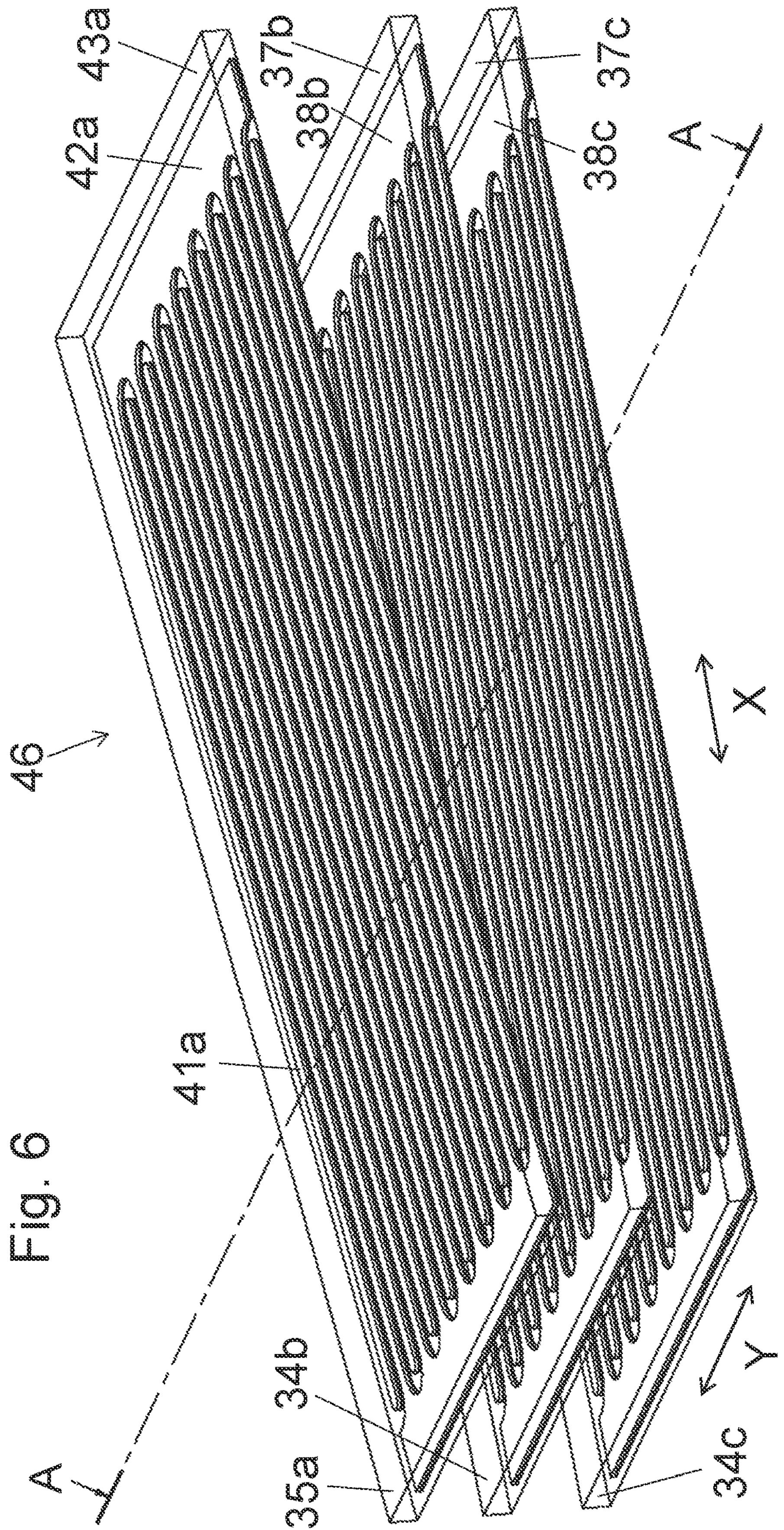
FIG. 6 is an isometric view of an embodiment of a filtering device with tilted filtering pattern with respect to the X-axis, tilted along the length of the filtering pattern, in an embodiment of the laser cutting filtering device of the present invention.

FIG. 6 shows an embodiment of a filtering device with tilted filtering pattern with respect to the X-axis 46 made with one filtering pattern tilted with respect to the X-axis 35*a* and one or more, two in the embodiment shown in FIG. 6, filtering patterns 34*b*, 34*c*. The filtering pattern tilted with respect to the X-axis 35*a* is composed of a modified glass layer 42*a* and a modified mirror layer 43*a*.

The filtering patterns 34*b*, 34*c* are identical, composed of the glass layer 37*b*, 37*c* coated with the mirror layer 38*b*, 38*c* in the underside. The filtering patterns 34*b*, 34*c* are assembled at a variable distance to each other with every filtering pattern 34*b*, 34*c* being placed in perfect alignment to each other so that when seen from above the mirror layers 38*b*, 38*c* are all in perfect alignment.

Because the filtering pattern tilted with respect to the X-axis 35*a* is installed at a certain inclination angle, the modified glass layer 42*a* and the modified mirror layer 43*a* need to be distorted along the X-axis to compensate for the inclination angle of installation. This distortion extends all the structures along the X-axis by a trigonometric factor given by the inverse of the cosine of the inclination angle and the secant of the inclination angle. This distortion causes the total length of the modified glass layer 42*a* and the modified mirror layer 43*a* to increase and the position of every feature to move by the exact factor needed to compensate for the installation at the chosen inclination angle. This way, when seen from above, the modified glass layer 42*a* perfectly matches the glass layers 37*b*, 37*c* and the modified mirror layer 43*a* perfectly matches the mirror layers 38*b*, 38*c* causing the filtering pattern tilted with respect to the X-axis 35*a* to be seen from above exactly as a filtering pattern 34*b*, 34*c*. Another way to explain this is that the projection of the filtering pattern tilted with respect to the X-axis 35*a* along a line normal to the filtering patterns 34*b*, 34*c* has exactly the same shape and perfectly matches the filtering patterns 34*b*, 34*c*.

The filtering pattern tilted with respect to the X-axis 35*a* and the filtering patterns 34*b*, 34*c* are assembled at variable distances to each other and the distance between the filtering pattern tilted with respect to the X-axis 35*a* and the filtering pattern 34*b* varies along the X-axis because of the angle that the filtering pattern tilted with respect to the X-axis 35*a* is placed at, the distance being shorter to the left and longer to the right as shown in FIG. 6.

Figure 6A:
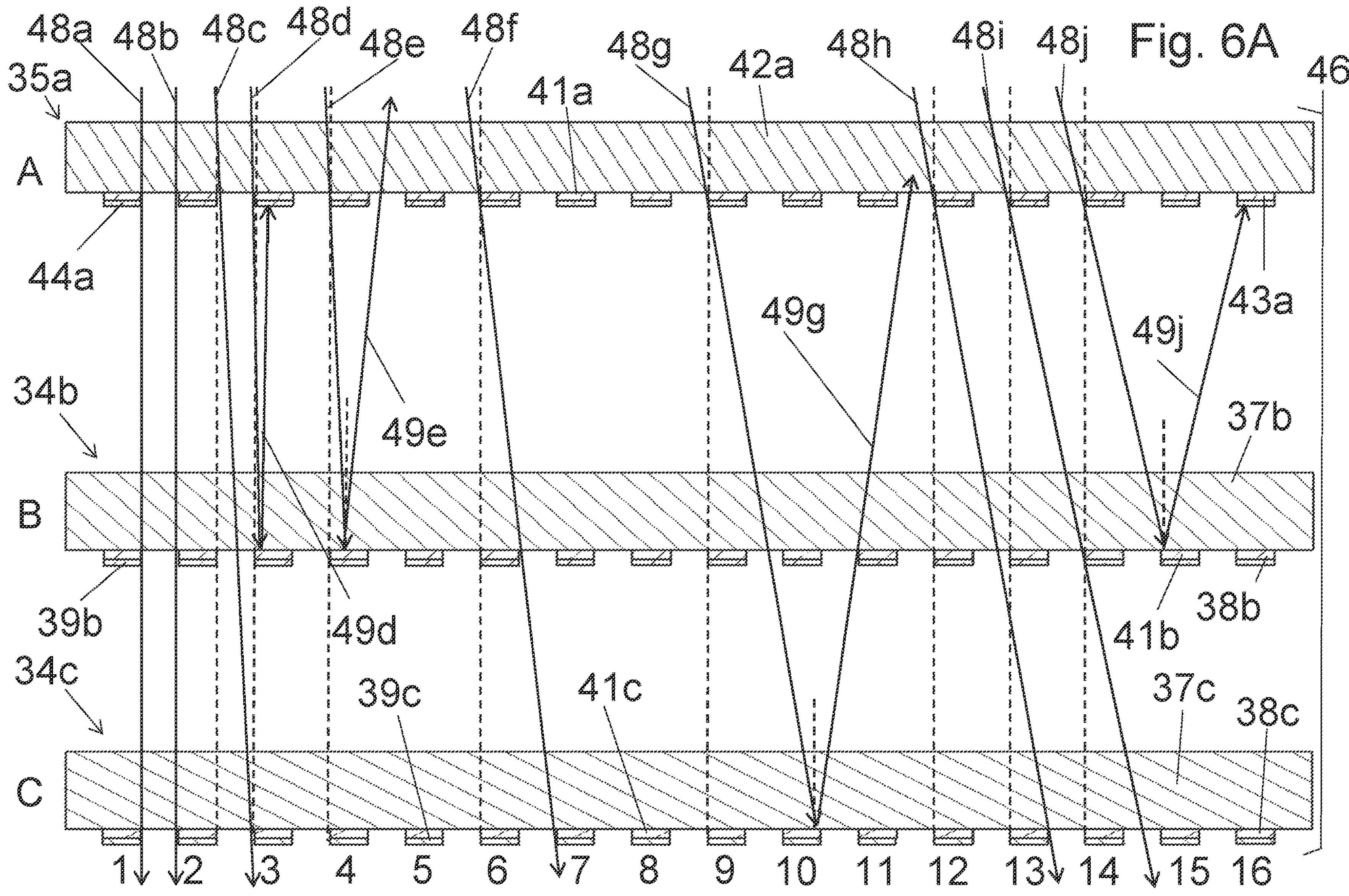
FIG. 6A is a cross-sectional view of the filtering device with tilted filtering pattern with respect to the X-axis, tilted along the length of the filtering pattern, of FIG. 6 showing the propagation of different incoming rays according to various incidence angles and entry points in an embodiment of the laser cutting filtering device of the present invention.

FIG. 6A shows a cross-sectional view of the filtering device with tilted filtering pattern with respect to the X-axis 46 shown in FIG. 6 along the A-A section line. The filtering pattern tilted with respect to the X-axis 35*a* and the filtering patterns 34*b*, 34*c* are sectioned by a plane perpendicular to the glass layers 37*b*, 37*c*. The section plane intercepts the modified glass layer 42*a*, the modified mirror layer 43*a* and the mirror layers 38*b*, 38*c*. The modified sealant layer 44*a* and the sealant layers 39*b*, 39*c* are seen directly below the modified mirror layer 43*a* and the mirror layers 38*b*, 38*c* respectively.

All elements are placed in perfect alignment to each other so that when seen from above all fringes 41*a*, 41*b*, 41*c* as well as the other structures of the modified mirror layer 43*a*, the mirror layers 38*b*, 38*c*, the modified sealant layer 44*a* and the sealant layers 39*b*, 39*c* are all in perfect alignment.

The filtering pattern tilted with respect to the X-axis 35*a* and the filtering patterns 34*b*, 34*c* are assembled at variable distances to each other and the distance between the filtering pattern tilted with respect to the X-axis 35*a* and the filtering pattern 34*b* varies along the X-axis because of the angle that the filtering pattern tilted with respect to the X-axis 35*a* is placed at.

In taking a cross-section A-A at a particular point along the length, the distance between the filtering pattern tilted with respect to the X-axis 35*a* and the filtering pattern 34*b* is constant when viewed through the A-A section line that extends through the width, as shown in FIG. 6. The distance between the filtering pattern tilted with respect to the X-axis 35*a* and the filtering pattern 34*b* changes depending upon which point along the length, the A-A section line is taken which is different than the constant distance between the filtering pattern 34*a* and the filtering pattern 34*b* in FIG. 5A.

If the A-A section line is made further to the right along the length in FIG. 6, the distance between the filtering pattern tilted with respect to the X-axis 35*a* and the filtering patterns 34*b* in FIG. 6A is longer than the actual distance seen in FIG. 6A. On the other hand, if the A-A section line is made further to the left in FIG. 6, the distance between the filtering pattern tilted with respect to the X-axis 35*a* and the filtering patterns 34*b* in FIG. 6A is shorter than the actual distance seen in FIG. 6A. If the A-A section line is made even further to the left, the distance between the filtering pattern tilted with respect to the X-axis 35*a* and the filtering patterns 34*b* in FIG. 6A is reduced further and could be shorter than the distance between the filtering pattern 34*a* and the filtering pattern 34*b* in FIG. 5A.

A series of incoming rays 48*a* through 48*j* and for the incoming rays that are reflected a series of corresponding reflected rays 49*d* through 49*j* are shown to illustrate the geometry and workings of the filtering device with tilted filtering pattern with respect to the X-axis 46.

As noted above, to facilitate the identification of individual fringes a grid structure with letters and numbers has been created. This way to refer to the fringe 41*a*, the reference A7 can be used. Likewise, the fringe 41*b* can be appointed by the reference B15 and the fringe 41*c*, by the reference C8. Using this grid structure it is easy to note that the fringes A1, B1, and C1 are in perfect alignment and likewise any fringes with different letters but with the same number are aligned.

Any set of fringes with different letters but with the same number that are aligned creates a channel that allows incoming rays to pass through. Any incoming ray hitting a fringe at any level is reflected.

The changing distance between the filtering pattern tilted with respect to the X-axis 35*a* and the filtering patterns 34*b* along the X-axis as explained above impacts the performance of the filtering device with tilted filtering pattern with respect to the X-axis 46 seen in FIG. 6 and FIG. 6A that does not have the same performance as the filtering device shown in FIG. 5 and FIG. 5A but provides the improvement of reducing damage to the laser from a reflected ray.

To facilitate the visualization and understanding of this performance change that translates into variations in maximum allowed diversion angles, similar incoming rays are drawn and numbered the same way in FIG. 5A and FIG. 6A so that the differences in incidence angles, when applicable, are easy to ascertain.

The incoming ray 48*a* goes through the filtering pattern tilted with respect to the X-axis 35*a* and other filtering patterns 34*b*, 34*c* as it is perpendicular to the filtering patterns and does not intercept any fringe, passing just to the right of the fringes located at position 1. Likewise the incoming ray 48*b* also goes through the filtering pattern tilted with respect to the X-axis 35*a* and all filtering patterns 34*b*, 34*c* as it is perpendicular to the filtering patterns and does not intercept any fringe, passing just to the left of the fringes located at position 2. The incoming ray 48*a* and the incoming ray 48*b* pass at the edges of the channel 1-2, between the fringes located at the positions 1 and 2.

The incoming ray 48*c* goes through the filtering pattern tilted with respect to the X-axis 35*a* and other filtering patterns 34*b*, 34*c* at the maximum possible diversion angle with the normal to the filtering patterns allowed for a ray going through a given channel, passing just at the right of the fringe located at A2 and to the left of the fringe located at C3. The diversion angle can be ascertained using the dashed line drawn perpendicular to the filtering patterns at the point where the incoming ray 48*c* passes the fringe located at A2.

The diversion angle of the incoming ray 48*c* seen in FIG. 6A is smaller than the diversion angle of the incoming ray 48*c* seen on FIG. 5A. This is because at the point of the section the filtering pattern tilted with respect to the X-axis 35*a* is further apart from the filtering pattern 34*c* in FIG. 6A than the distance of the filtering pattern 34*a* from the filtering pattern 34*c* in FIG. 5A and the longer distance forces a reduction on the allowed maximum angle. It is shown in FIG. 6A that, as the distance between the filtering pattern tilted with respect to the X-axis 35*a* and the filtering patterns 34*b* and 34*c* varies along the X-axis, so does the diversion angle allowed. This effect affects all other incoming rays on a similar manner and to facilitate the comparison between FIG. 5A and FIG. 6A similar incoming rays have been numbered the same way.

The incoming ray 48*d* goes through the filtering pattern tilted with respect to the X-axis 35*a* passing just at the left of the fringe located at A3. The incoming ray 48*d* hits the fringe located at B3 and is reflected. The reflected ray 49*d* goes back and is absorbed by the sealant layer at the back of the fringe located at A3.

The incoming ray 48*e* goes through the filtering pattern tilted with respect to the X-axis 35*a* passing just at the left of the fringe located at A4. The incoming ray 48*e* has a larger diversion angle than the diversion angle of the incoming ray 48*d* so it hits the fringe located at B4 further to the right than the incoming ray 48*d* hits the fringe located at B3. As a result the reflected ray 49*e* misses the sealant layer at the back of the fringe located at A4 and continues back towards the laser source as any other incoming ray hitting a fringe of the filtering pattern tilted with respect to the X-axis 35*a*.

Compared to the incoming ray 48*e* in FIG. 5A, the incoming ray 48*e* in FIG. 6A has a smaller diversion angle and yet passes further to the right of the fringe located at A4 because of the difference in the geometry, particularly the longer distance between the filtering pattern tilted with respect to the X-axis 35*a* and the filtering patterns 34*b* at the point the section was made.

The incoming ray 48*f* goes through the filtering pattern tilted with respect to the X-axis 35*a* passing just at the left of the fringe located at A6. The incoming ray 48*f* has a larger diversion angle than the diversion angle of the incoming ray 48*e* just sufficient for it to go through all the filtering patterns 34*b* and 34*c* exiting the filtering device with tilted filtering pattern with respect to the X-axis 46 just at the left of the fringe located at C7. Compared to the incoming ray 48*f* in FIG. 5A that is reflected and absorbed, the incoming ray 48*e* in FIG. 6A has a completely different behavior.

The diversion angle of the incoming ray 48*f* in FIG. 6A is smaller than the diversion angle of the incoming ray 48*f* in FIG. 5A because this angle is given by the distance between the left side of fringe A6 and the right side of fringe B6. As the distance between the filtering pattern tilted with respect to the X-axis 35*a* and the filtering pattern 34*b* is longer in FIG. 6A than the distance between the filtering pattern 34*a* and the filtering pattern 34*b* in FIG. 5A, this allows for the incoming ray 48*f* with smaller diversion angle in FIG. 6A to find a gap and go through all the filtering patterns missing all the fringes.

As the distance between the filtering pattern tilted with respect to the X-axis 35*a* and the filtering pattern 34*b* varies along the X-axis, taking a cross-section A-A along different points provides the variation in the distance between the filtering pattern tilted with respect to the X-axis 35*a* and the filtering pattern 34*b*. As a result, the diversion angle that is allowed through varies. At the points in the X-axis where the distance between the filtering pattern tilted with respect to the X-axis 35*a* and the filtering pattern 34*b* are equal or smaller than the distance between the filtering pattern 34*a* and the filtering pattern 34*b* on FIG. 5A the gap is closed and the incoming ray 48*f* is reflected as in FIG. 5A.

The incoming ray 48*g* goes through the filtering pattern tilted with respect to the X-axis 35*a*, passing just at the left of the fringe located at A9. The incoming ray 48*g* has a larger diversion angle than the diversion angle of the incoming ray 48*f* but instead of passing through as the incoming ray 48*f*, the incoming ray 48*g* hits the fringe located at C10. The reflected ray 49*g* goes back and misses the sealant layer at the back of the fringes located at B11 and A11 and continues back towards the laser source as any other incoming ray hitting a fringe of the filtering pattern tilted with respect to the X-axis 35*a*.

The incoming ray 48*h* goes through the filtering pattern tilted with respect to the X-axis 35*a*, passing just at the left of the fringe located at A12. The incoming ray 48*h* has a larger diversion angle than the diversion angle of the incoming ray 48*g* and goes through all filtering patterns 34*b*, 34*c* exiting the filtering device with tilted filtering pattern with respect to the X-axis 46 just at the right of the fringe located at C13. The diversion angle of the incoming ray 48*h* in FIG. 6A is smaller than the diversion angle of the incoming ray 48*h* in FIG. 5A because this angle is given by the distance between the left side of fringe A12 and the right side of fringe C13.

The incoming ray 48*i* goes through the filtering pattern tilted with respect to the X-axis 35*a*, passing just at the left of the fringe located at A13. The incoming ray 48*i* has a larger diversion angle than the incoming ray 48*h* and also goes through all filtering patterns 34*b*, 34*c* exiting the filtering device with tilted filtering pattern with respect to the X-axis 46 between the fringes located at C14 and C15. The diversion angle of the incoming ray 48*i* in FIG. 6A is smaller than the diversion angle of the incoming ray 48*i* in FIG. 5A because this angle is given by the distance between the left side of fringe A13 and the left side of fringe B14.

The incoming ray 48*j* goes through the filtering pattern tilted with respect to the X-axis 35*a*, passing just at the left of the fringe located at A14. The incoming ray 48*j* has a larger diversion angle than the diversion angle of the incoming ray 48*i* causing it to hit the fringe located at B15. The reflected ray 49*j* goes back and is absorbed by the sealant layer at the back of the fringe located at A16.

The embodiment of the filtering device with tilted filtering pattern with respect to the X-axis 46 with one filtering pattern tilted with respect to the X-axis 35*a* and two filtering patterns 34*b*, 34*c* as shown in FIG. 6 and FIG. 6A features a position dependent behavior along the X-axis allowing unwanted incoming rays with various diversion angles to potentially go through, depending on the point of incidence along the X-axis. As a result, the laser source used must have better collimation than the collimation required to operate using the apparatus shown in FIG. 5 and FIG. 5A.

To improve the performance of the filtering device with tilted filtering pattern with respect to the X-axis 46, additional filtering patterns parallel to the filtering patterns 34*b*, 34*c* can be used to guarantee that all laser beams produced by the available laser source hitting the filtering device with tilted filtering pattern with respect to the X-axis 46 at an unwanted angle are stopped.

Figure 6B:
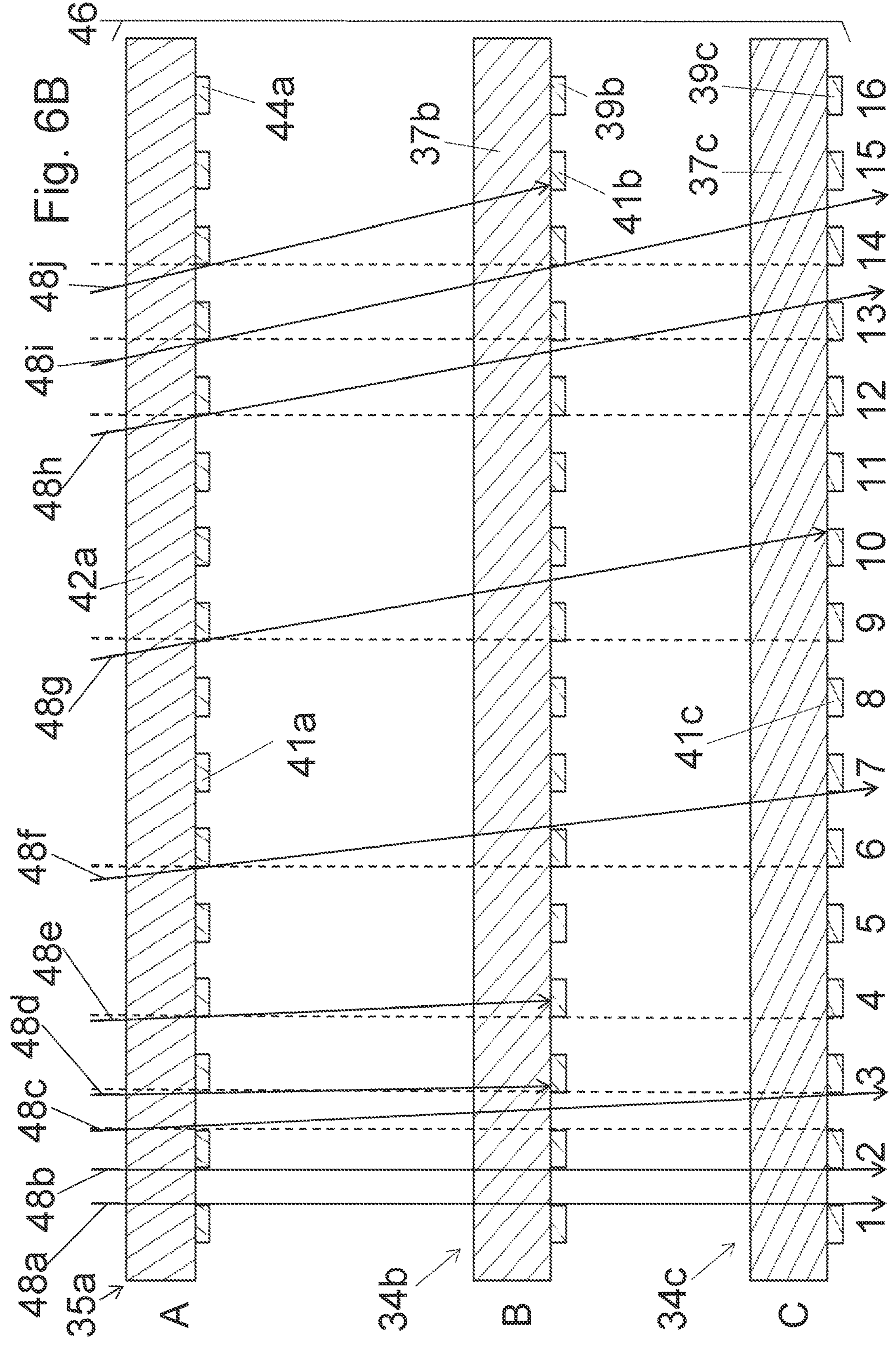
FIG. 6B is a cross-sectional view of an alternative embodiment of the filtering device with tilted filtering pattern with respect to the X-axis, along the length of the filtering pattern, of FIG. 6 showing the propagation of different incoming rays according to various incidence angles and entry points in an embodiment of the laser cutting filtering device of the present invention.

FIG. 6B shows a cross-section of an alternative embodiment of the filtering device with tilted filtering pattern with respect to the X-axis 46 shown FIG. 6 along the A-A section line. The filtering pattern tilted with respect to the X-axis 35*a* and the filtering patterns 34*b*, 34*c* are sectioned by a plane perpendicular to the glass layers 37*b*, 37*c*. The section plane intercepts the modified glass layer 42*a* and the glass layers 37*b*, 37*c*, but differently from the embodiment show in FIG. 6A the modified mirror layer and the mirror layers are not applied and instead only the modified sealant layer 44*a* and the sealant layers 39*b*, 39*c* that absorb the laser light are present.

All elements are placed in perfect alignment to each other so that when seen from above all fringes 41*a*, 41*b*, 41*c* as well as the other structures of the modified sealant layer 44*a* and the sealant layers 39*b*, 39*c* are all in perfect alignment.

The filtering pattern tilted with respect to the X-axis 35*a* and the filtering patterns 34*b*, 34*c* are assembled at variable distances to each other and the distance between the filtering pattern tilted with respect to the X-axis 35*a* and the filtering pattern 34*b* varies along the X-axis because of the angle that the filtering pattern tilted with respect to the X-axis 35*a* is placed at.

In taking a cross-section A-A at a particular point along the length, the distance between the filtering pattern tilted with respect to the X-axis 35*a* and the filtering pattern 34*b* is constant when viewed through the A-A section line that extends through the width, as shown in FIG. 6. The distance between the filtering pattern tilted with respect to the X-axis 35*a* and the filtering pattern 34*b* changes depending upon which point along the length, the cross-section A-A is taken which is different than the constant distance between the filtering patterns 34*a* and the filtering patterns 34*b* in FIG. 5B.

If the A-A section line is made further to the right in FIG. 6, the distance between the filtering pattern tilted with respect to the X-axis 35*a* and the filtering patterns 34*b* in FIG. 6B is longer than the actual distance seen in FIG. 6B. On the other hand, if the A-A section line is made further to the left in FIG. 6, the distance between the filtering pattern tilted with respect to the X-axis 35*a* and the filtering patterns 34*b* in FIG. 6B is shorter than the actual distance seen in FIG. 6B. If the A-A section line is made even further to the left, the distance between the filtering pattern tilted with respect to the X-axis 35*a* and the filtering patterns 34*b* in FIG. 6B is reduced further and could be shorter than the distance between the filtering pattern 34*a* and the filtering pattern 34*b* in FIG. 5B.

A series of incoming rays 48*a* through 48*j* are shown to illustrate the geometry and workings of the filtering device with tilted filtering pattern with respect to the X-axis 46.

To facilitate the identification of individual fringes a grid structure with letters and numbers has been created. This way to refer to the fringe 41*a*, the reference A7 can be used. Likewise, the fringe 41*b* can be appointed by the reference B15 and the fringe 41*c*, by the reference C8. Using this grid structure it is easy to note that the fringes A1, B1, and C1 are in perfect alignment and likewise any fringes with different letters but with the same number are aligned.

Any set of fringes with different letters but with the same number that are aligned creates a channel that allows incoming rays to pass through. Any incoming ray hitting a fringe at any level is absorbed.

The changing distance between the filtering pattern tilted with respect to the X-axis 35*a* and the filtering patterns 34*b* along the X-axis as explained above impacts the performance of the filtering device with tilted filtering pattern with respect to the X-axis 46 seen in FIG. 6 and FIG. 6B that does not have the same performance as the filtering device shown in FIG. 5 and FIG. 5B.

To facilitate the visualization and understanding of this performance change that translates into variations in maximum allowed diversion angles, similar incoming rays are drawn and numbered the same way in FIG. 5B and FIG. 6B so that the differences in incidence angles, when applicable, are easy to ascertain.

The incoming ray 48*a* goes through the filtering pattern tilted with respect to the X-axis 35*a* and other filtering patterns 34*b*, 34*c* as it is perpendicular to the filtering patterns and does not intercept any fringe, passing just to the right of the fringes located at position 1. Likewise the incoming ray 48*b* also goes through the filtering pattern tilted with respect to the X-axis 35*a* and other filtering patterns 34*b*, 34*c* as it is perpendicular to the filtering patterns and does not intercept any fringe, passing just to the left of the fringes located at position 2. The incoming ray 48*a* and the incoming ray 48*b* pass at the edges of the channel 1-2, between the fringes located at the positions 1 and 2.

The incoming ray 48*c* goes through the filtering pattern tilted with respect to the X-axis 35*a* and other filtering patterns 34*b*, 34*c* at the maximum possible diversion angle with the normal to the filtering patterns allowed for a ray going through a given channel, passing just at the right of the fringe located at A2 and to the left of the fringe located at C3. The diversion angle can be ascertained using the dashed line drawn perpendicular to the filtering patterns at the point where the incoming ray 48*c* passes the fringe located at A2.

The diversion angle of the incoming ray 48*c* seen in FIG. 6B is smaller than the diversion angle of the incoming ray 48*c* seen on FIG. 5B. This is because the filtering pattern tilted with respect to the X-axis 35*a* is further apart from the filtering pattern 34*c* in FIG. 6B than the distance of the filtering pattern 34*a* from the filtering pattern 34*c* in FIG. 5B and the longer distance forces a reduction on the allowed maximum angle. It is shown in FIG. 6B that, as the distance between the filtering pattern tilted with respect to the X-axis 35*a* and the filtering patterns 34*b* and 34*c* varies along the X-axis, so does the diversion angle allowed. This effect affects all other incoming rays on a similar manner and to facilitate the comparison between FIG. 5B and FIG. 6B similar incoming rays have been numbered the same way.

The incoming ray 48*d* goes through the filtering pattern tilted with respect to the X-axis 35*a* passing just at the left of the fringe located at A3. The incoming ray 48*d* hits the fringe located at B3 and is absorbed.

The incoming ray 48*e* goes through the filtering pattern tilted with respect to the X-axis 35*a* passing just at the left of the fringe located at A4. The incoming ray 48*e* has a larger diversion angle than the diversion angle of the incoming ray 48*d* so it hits the fringe located at B4 further to the right than the incoming ray 48*d* hits the fringe located at B3.

Compared to the incoming ray 48*e* in FIG. 5B, the incoming ray 48*e* in FIG. 6B has a smaller diversion angle and yet hits the fringe located at B4 at approximately the same point because of the difference in the geometry, particularly the longer distance between the filtering pattern tilted with respect to the X-axis 35*a* and the filtering patterns 34*b*.

The incoming ray 48*f* goes through the filtering pattern tilted with respect to the X-axis 35*a* passing just at the left of the fringe located at A6. The incoming ray 48*f* has a larger diversion angle than the diversion angle of the incoming ray 48*e* just sufficient for it to go through all the filtering patterns 34*b* and 34*c* exiting the filtering device with tilted filtering pattern with respect to the X-axis 46 just at the left of the fringe located at C7. Compared to the incoming ray 48*f* in FIG. 5B that is absorbed, the incoming ray 48*e* in FIG. 6B has a completely different behavior.

The diversion angle of the incoming ray 48*f* in FIG. 6B is smaller than the diversion angle of the incoming ray 48*f* in FIG. 5B because this angle is given by the distance between the left side of fringe A6 and the right side of fringe B6. As the distance between the filtering pattern tilted with respect to the X-axis 35*a* and the filtering pattern 34*b* is longer in FIG. 6B than the distance between the filtering pattern 34*a* and the filtering pattern 34*b* in FIG. 5B, this allows for the incoming ray 48*f* with smaller diversion angle in FIG. 6B to find a gap and go through all the filtering patterns missing all the fringes.

As the distance between the filtering pattern tilted with respect to the X-axis 35*a* and the filtering pattern 34*b* varies along the X-axis, the distance varies between the filtering pattern tilted with respect to the X-axis 35*a* and the filtering pattern 34*b*. As a result, the diversion angle that is allowed through varies. At the points in the X-axis where the distance between the filtering pattern tilted with respect to the X-axis 35*a* and the filtering pattern 34*b* are equal or smaller than the distance between the filtering pattern 34*a* and the filtering pattern 34*b* on FIG. 5B the gap is closed and the incoming ray 48*f* is reflected as in FIG. 5B.

The incoming ray 48*g* goes through the filtering pattern tilted with respect to the X-axis 35*a*, passing just at the left of the fringe located at A9. The incoming ray 48*g* has a larger diversion angle than the diversion angle of the incoming ray 48*f* but instead of passing through as the incoming ray 48*f*, the incoming ray 48*g* hits the fringe located at C10 and is absorbed.

The incoming ray 48*h* goes through the filtering pattern tilted with respect to the X-axis 35*a*, passing just at the left of the fringe located at A12. The incoming ray 48*h* has a larger diversion angle than the diversion angle of the incoming ray 48*g* and goes through all filtering patterns 34*b*, 34*c* exiting the filtering device with tilted filtering pattern with respect to the X-axis 46 just at the right of the fringe located at C13. The diversion angle of the incoming ray 48*h* in FIG. 6B is smaller than the diversion angle of the incoming ray 48*h* in FIG. 5B because this angle is given by the distance between the left side of fringe A12 and the right side of fringe C13.

The incoming ray 48*i* goes through the filtering pattern tilted with respect to the X-axis 35*a*, passing just at the left of the fringe located at A13. The incoming ray 48*i* has a larger diversion angle than the incoming ray 48*h* and also goes through all filtering patterns 34*b*, 34*c* exiting the filtering device with tilted filtering pattern with respect to the X-axis 46 between the fringes located at C14 and C15. The diversion angle of the incoming ray 48*i* in FIG. 6B is smaller than the diversion angle of the incoming ray 48*i* in FIG. 5B because this angle is given by the distance between the left side of fringe A13 and the left side of fringe B14.

The incoming ray 48*j* goes through the filtering pattern tilted with respect to the X-axis 35*a*, passing just at the left of the fringe located at A14. The incoming ray 48*j* has a larger diversion angle than the diversion angle of the incoming ray 48*i* causing it to hit the fringe located at B15 and be absorbed.

The embodiment of the filtering device with tilted filtering pattern with respect to the X-axis 46 with one filtering pattern tilted with respect to the X-axis 35*a* and two filtering patterns 34*b*, 34*c* as shown in FIG. 6 and FIG. 6B features a position dependent behavior along the X-axis allowing unwanted incoming rays with various diversion angles to potentially go through, depending on the point of incidence along the X-axis. As a result, the laser source used must have better collimation than the collimation required to operate using the apparatus shown in FIG. 5 and FIG. 5B.

To improve the performance of the filtering device with tilted filtering pattern with respect to the X-axis 46, additional filtering patterns parallel to the filtering patterns 34*b*, 34*c* can be used to guarantee that all laser beams produced by the available laser source hitting the filtering device with tilted filtering pattern with respect to the X-axis 46 at an unwanted angle are stopped.

Figure 7:
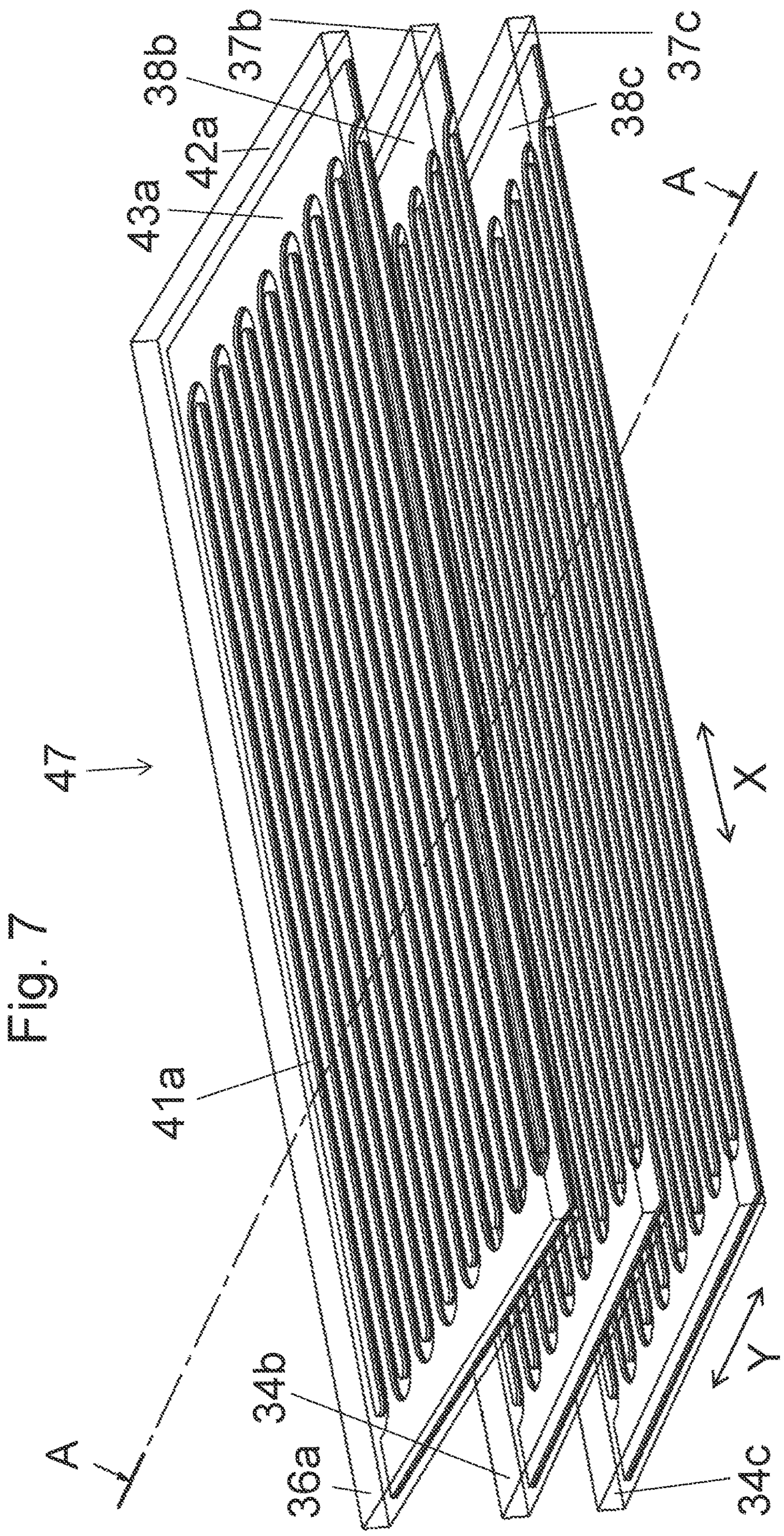
FIG. 7 is an isometric view of an embodiment of a filtering device with tilted filtering pattern with respect to the Y-axis, along the width of the filtering pattern, in an embodiment of the laser cutting filtering device of the present invention.

FIG. 7 shows an embodiment of a filtering device with tilted filtering pattern with respect to the Y-axis 47 made with a filtering pattern tilted with respect to the Y-axis 36*a* and one or more, two in the embodiment shown in FIG. 7, filtering patterns 34*b*, 34*c*. The filtering pattern tilted with respect to the Y-axis 36*a* is composed of a modified glass layer 42*a* and a modified mirror layer 43*a* that are distorted along the Y-axis to compensate for the inclination angle of installation.

The filtering patterns 34*b*, 34*c* are identical, composed of the glass layer 37*b*, 37*c* coated with the mirror layer 38*b*, 38*c* in the underside. The filtering patterns 34*b*, 34*c* are assembled at a variable distance to each other with every filtering pattern 34*b*, 34*c* being placed in perfect alignment to each other so that when seen from above the mirror layers 38*b*, 38*c* are all in perfect alignment.

Because the filtering pattern tilted with respect to the Y-axis 36*a* is installed at a certain inclination angle, the modified glass layer 42*a* and the modified mirror layer 43*a* need to be distorted along the Y-axis to compensate for the inclination angle of installation. This distortion extends all the structures along the Y-axis by a trigonometric factor given by the inverse of the cosine of the inclination angle the secant of the inclination angle. This distortion causes the total width of the modified glass layer 42*a* and the modified mirror layer 43*a* to increase and the position of every feature to move by the exact factor needed to compensate for the installation at the chosen inclination angle. This way, when seen from above, the modified glass layer 42*a* perfectly matches the glass layers 37*b*, 37*c* and the modified mirror layer 43*a* perfectly matches the mirror layers 38*b*, 38*c* causing the filtering pattern tilted with respect to the Y-axis 36*a* to be seen from above exactly as a filtering pattern 34*b*, 34*c*. Another way to explain this is that the projection of the filtering pattern tilted with respect to the Y-axis 36*a* along a line normal to the filtering patterns 34*b*, 34*c* has exactly the same shape and perfectly matches the filtering patterns 34*b*, 34*c*.

Figure 11:
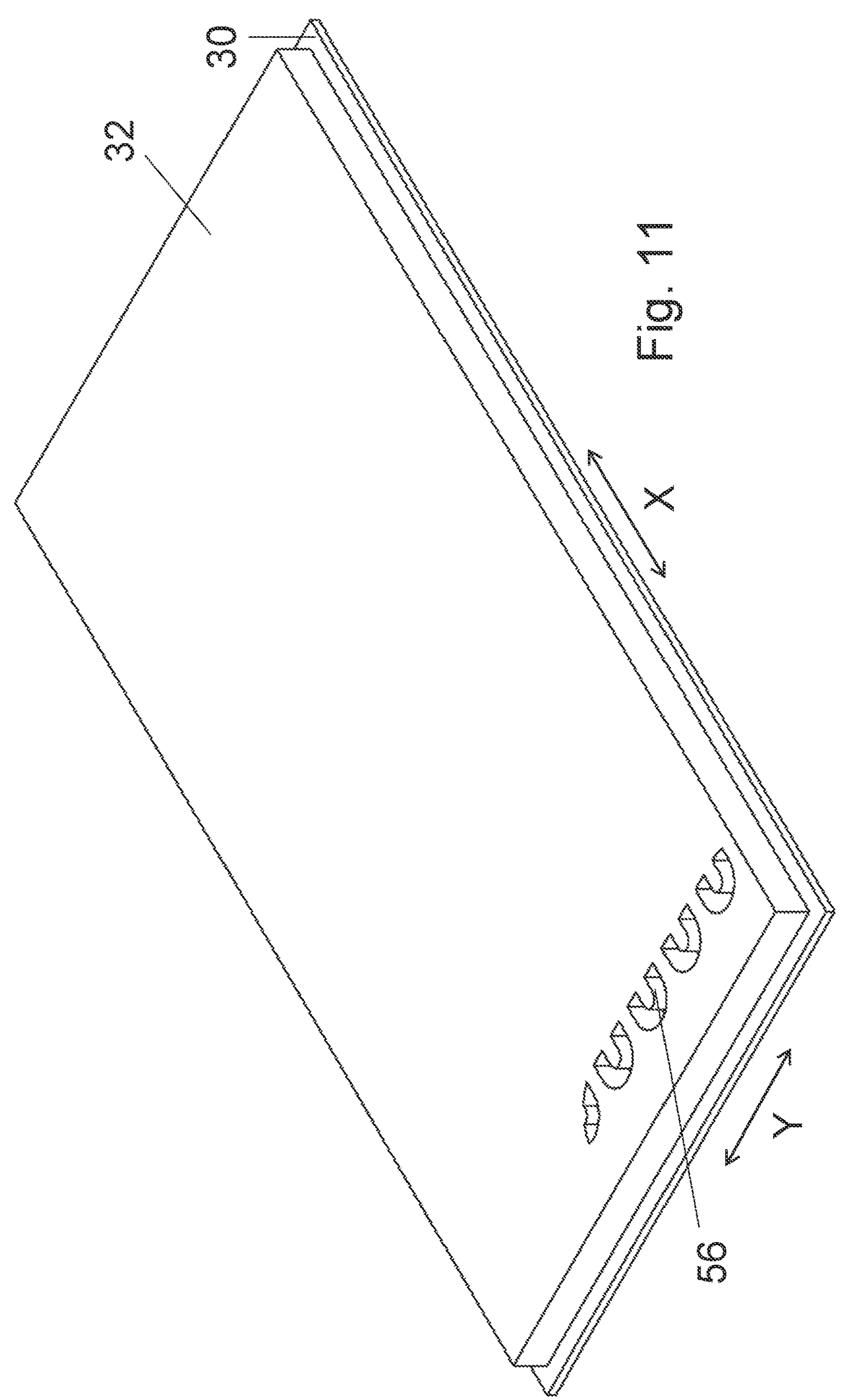
FIG. 11 is an isometric view of resulting cut path done by the apparatus for laser cutting of FIG. 10 on the substrate with applied graphene layer of FIG. 1 in an embodiment of the laser cutting filtering device of the present invention.

The filtering pattern tilted with respect to the Y-axis 36*a* and the filtering patterns 34*b*, 34*c* are assembled at variable distances to each other and the distance between the filtering pattern tilted with respect to the Y-axis 36*a* and the filtering pattern 34*b* varies along the Y-axis because of the angle that the filtering pattern tilted with respect to the Y-axis 36*a* is placed at, the distance being shorter towards the front and longer towards the back of FIG. 11.

Figure 7A:
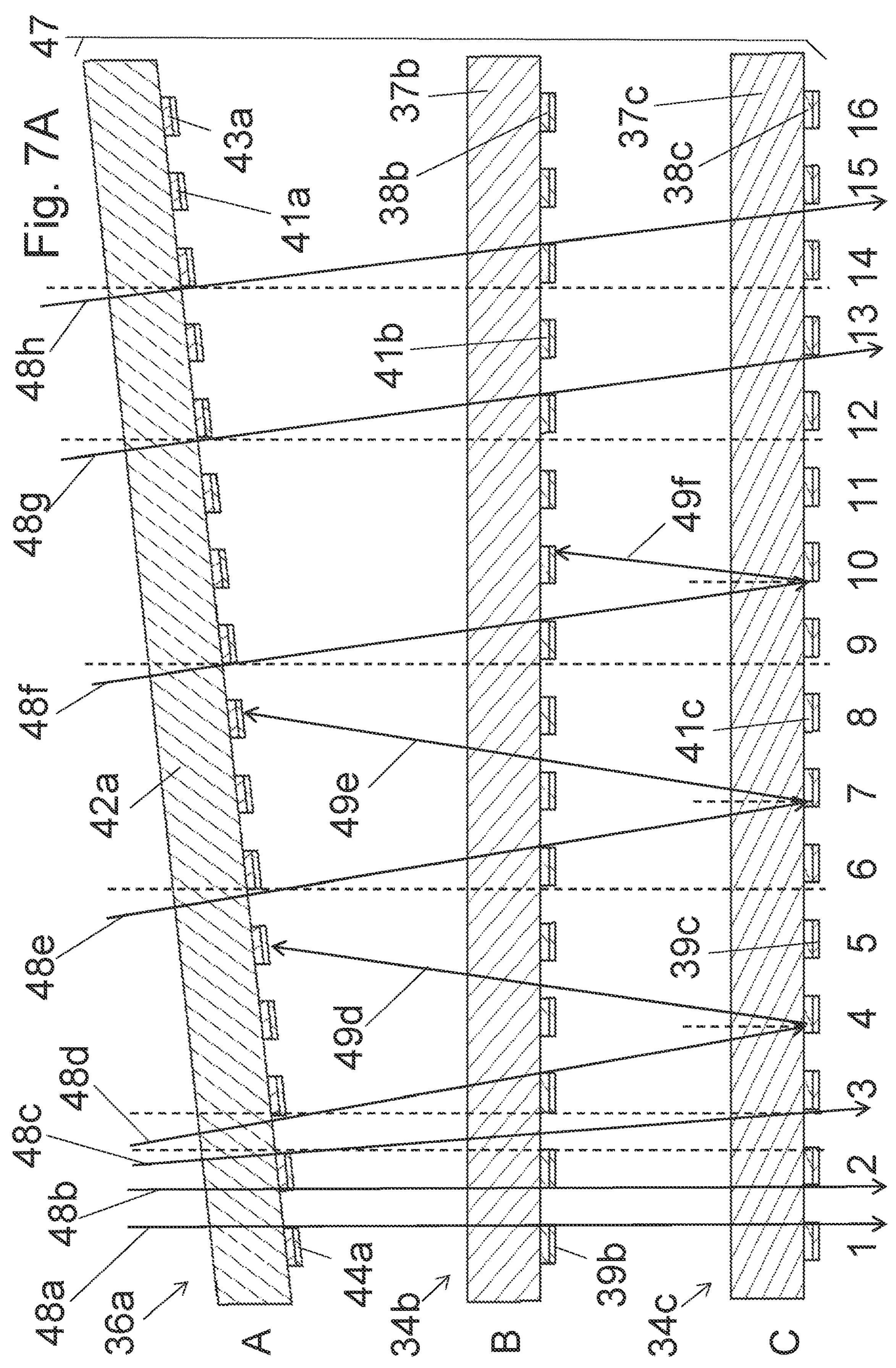
FIG. 7A is a cross-sectional view of the filtering device with tilted filtering pattern with respect to the Y-axis, along the width of the filtering pattern, of FIG. 7 showing the propagation of different incoming rays according to various incidence angles and entry points in an embodiment of the laser cutting filtering device of the present invention.

FIG. 7A shows a cross-section of the filtering device with tilted filtering pattern with respect to the Y-axis 47 shown in FIG. 7 along the A-A section line. The filtering pattern tilted with respect to the Y-axis 36*a* and the filtering patterns 34*b*, 34*c* are sectioned by a plane perpendicular to the glass layers 37*b*, 37*c*. The section plane intercepts the modified glass layer 42*a*, the modified mirror layer 43*a* and the mirror layers 38*b*, 38*c*. The modified sealant layer 44*a* and the sealant layers 39*b*, 39*c* are seen directly below the modified mirror layer 43*a* and the mirror layers 38*b*, 38*c* respectively.

The filtering pattern tilted with respect to the Y-axis 36*a* and the filtering patterns 34*b*, 34*c* are assembled at variable distances to each other and the distance between the filtering pattern tilted with respect to the Y-axis 36*a* and the filtering pattern 34*b* varies along the Y-axis because of the angle that the filtering pattern tilted with respect to the Y-axis 36*a* is placed at, the distance being shorter at the left and longer at the right of FIG. 7A.

All elements are placed in perfect alignment to each other so that when seen from above all fringes 41*a*, 41*b*, 41*c* as well as the other structures of the modified mirror layer 43*a*, the mirror layers 38*b*, 38*c*, the modified sealant layer 44*a* and the sealant layers 39*b*, 39*c* are all in perfect alignment.

A series of incoming rays 48*a* through 48*h* and for the incoming rays that are reflected a series of corresponding reflected rays 49*d* through 49*f* are shown to illustrate the geometry and workings of the filtering device with tilted filtering pattern with respect to the Y-axis 47.

To facilitate the identification of individual fringes a grid structure with letters and numbers has been created. This way to refer to the fringe 41*a*, the reference A15 can be used. Likewise, the fringe 41*b* can be appointed by the reference B13 and the fringe 41*c*, by the reference C8. Using this grid structure it is easy to note that the fringes A1, B1, and C1 are in perfect alignment and likewise any fringes with different letters but with the same number are aligned.

Any set of fringes with different letters but with the same number that are aligned creates a channel that allows incoming rays to pass through. Any incoming ray hitting a fringe at any level is reflected.

The incoming ray 48*a* goes through the filtering pattern tilted with respect to the Y-axis 36*a* and other filtering patterns 34*b*, 34*c* as it is perpendicular to the filtering patterns and does not intercept any fringe, passing just to the right of the fringes located at position 1. Likewise the incoming ray 48*b* also goes through the filtering pattern tilted with respect to the Y-axis 36*a* and other filtering patterns 34*b*, 34*c* as it is perpendicular to the filtering patterns and does not intercept any fringe, passing just to the left of the fringes located at position 2. The incoming ray 48*a* and the incoming ray 48*b* pass at the edges of the channel 1-2, between the fringes located at the positions 1 and 2.

The incoming ray 48*c* goes through the filtering pattern tilted with respect to the Y-axis 36*a* and other filtering patterns 34*b*, 34*c* at the maximum possible diversion angle with the normal to the filtering patterns allowed for a ray going through the channel between fringes 2 and 3, passing just at the right of the fringe located at A2 and to the left of the fringe located at C3. The diversion angle can be ascertained using the dashed line drawn perpendicular to the filtering patterns at the point where the incoming ray 48*c* passes the fringe located at A2.

The diversion angle of the incoming ray 48*c* seen on FIG. 7A is larger than the diversion angle of the incoming ray 48*c* seen on FIG. 5A. This is because at the point of the incoming ray incidence the filtering pattern tilted with respect to the Y-axis 36*a* is closer to the filtering pattern 34*c* in FIG. 7A than the distance the filtering pattern 34*a* is from the filtering pattern 34*c* on FIG. 5A and the shorter distance increases the allowed maximum angle.

As in the filtering device with tilted filtering pattern with respect to the Y-axis 47 shown in FIG. 7A the distance between the filtering pattern tilted with respect to the Y-axis 36*a* and the filtering patterns 34*b* and 34*c* varies along the Y-axis, the geometry changes affecting the propagation path of incoming rays entering the device at different points. To better illustrate this effect a series of similar incoming rays are drawn at different points to ascertain the differences in the propagation path and clearances.

The incoming ray 48*d* goes through the filtering pattern tilted with respect to the Y-axis 36*a* passing just at the left of the fringe located at A3 and at an angle that allows it to just miss the fringe located at B3. The incoming ray 48*d* hits the fringe located at C4 and is reflected. The reflected ray 49*d* goes back and is absorbed by the sealant layer at the back of the fringe located at A5.

The incoming ray 48*e* goes through the filtering pattern tilted with respect to the Y-axis 36*a* passing just at the left of the fringe located at A6 and at an angle that allows it to just miss the fringe located at B6. The incoming ray 48*e* has a smaller diversion angle than the incoming ray 48*d*, hits the fringe located at C7 and is reflected. The reflected ray 49*e* goes back and is absorbed by the sealant layer at the back of the fringe located at A8.

The incoming ray 48*f* goes through the filtering pattern tilted with respect to the Y-axis 36*a* passing just at the left of the fringe located at A9 and at an angle that allows it to just miss the fringe located at B9. The incoming ray 48*f* has a smaller diversion angle than the incoming ray 48*e*, hits the fringe located at C10 and is reflected. The reflected ray 49*f* goes back and is absorbed by the sealant layer at the back of the fringe located at B10.

The incoming ray 48*g* goes through the filtering pattern tilted with respect to the Y-axis 36*a* passing just at the left of the fringe located at A12 and at an angle that allows it to just miss the fringe located at B12. The incoming ray 48*g* has a smaller diversion angle than the incoming ray 48*f*, misses the fringe located at C13 and exits the filtering device with tilted filtering pattern with respect to the Y-axis 47.

The incoming ray 48*h* goes through the filtering pattern tilted with respect to the Y-axis 36*a* passing just at the left of the fringe located at A14 and at an angle that allows it to just miss the fringe located at B14. The incoming ray 48*g* has a smaller diversion angle than the incoming ray 48*f*, misses the fringe located at C15 and exits the filtering device with tilted filtering pattern with respect to the Y-axis 47.

Note that the required incidence angle, the diversion angle, for incoming ray 48*f* to miss the fringe at level B is smaller than the incidence angle of incoming ray 48*e*. Likewise, the incidence angle for incoming ray 48*e* to miss the fringe at level B is smaller than the incidence angle of incoming ray 48*d*. This is a result of the gradual increase in the distance between the fringes caused by the angled installation of the filtering pattern tilted with respect to the Y-axis 36*a*. As this continues eventually incoming ray 48*g* is able to go through and exit the filtering device with tilted filtering pattern with respect to the Y-axis 47. The next incoming ray 48*h* also goes through and exits the filtering device with tilted filtering pattern with respect to the Y-axis 47 with some clearance to the fringe located at C15.

The embodiment of the filtering device with tilted filtering pattern with respect to the Y-axis 47 with one filtering pattern tilted with respect to the Y-axis 36*a* and two filtering patterns 34*b*, 34*c* as shown in FIG. 7 and FIG. 7A allows unwanted incoming rays with various diversion angles to potentially go through, depending on the point of incidence along the Y-axis. As a result, the laser source used must have better collimation than the collimation required to operate using the apparatus shown in FIG. 5 and FIG. 5A.

To improve the performance of the filtering device with tilted filtering pattern with respect to the Y-axis 47, additional filtering patterns parallel to the filtering patterns 34*b*, 34*c* can be used to guarantee that all laser beams produced by the available laser source hitting the filtering device with tilted filtering pattern with respect to the Y-axis 47 at an unwanted angle are stopped.

Figure 7B:
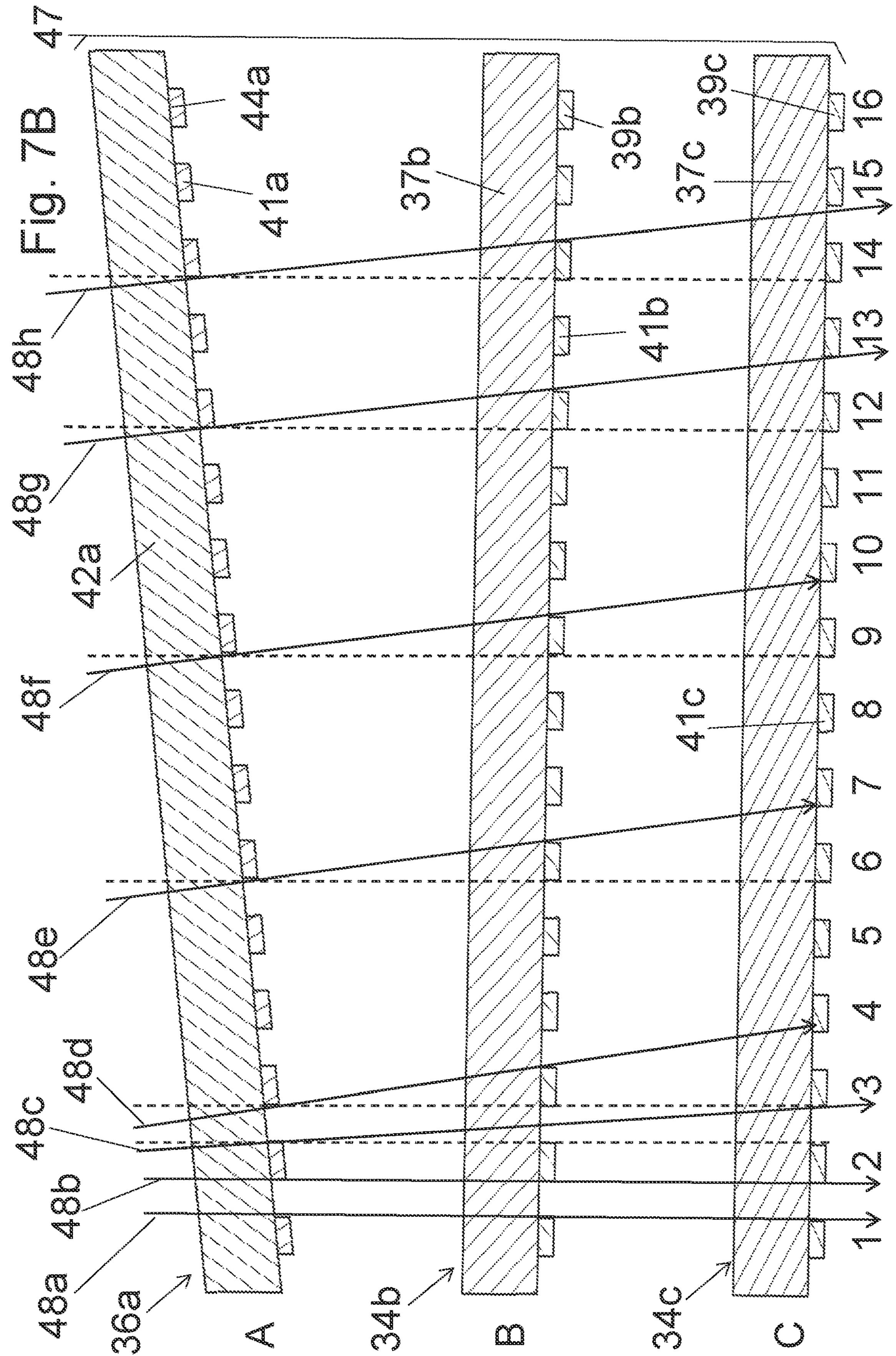
FIG. 7B is a cross-sectional view of an alternative embodiment of the filtering device with tilted filtering pattern with respect to the Y-axis, along the width of the filtering pattern, of FIG. 7 showing the propagation of different incoming rays according to various incidence angles and entry points in an embodiment of the laser cutting filtering device of the present invention.

FIG. 7B shows a cross-section of an alternative embodiment of the filtering device with tilted filtering pattern with respect to the Y-axis 47 shown in FIG. 7 along the A-A section line. The filtering pattern tilted with respect to the Y-axis 36*a* and the filtering patterns 34*b*, 34*c* are sectioned by a plane perpendicular to the glass layers 37*b*, 37*c*. The section plane intercepts the modified glass layer 42*a*, but differently from the embodiment show in FIG. 7A the modified mirror layer and the mirror layers are not applied and instead only the modified sealant layer 44*a* and the sealant layers 39*b*, 39*c* that absorb the laser light are present.

The filtering pattern tilted with respect to the Y-axis 36*a* and the filtering patterns 34*b*, 34*c* are assembled at variable distances to each other and the distance between the filtering pattern tilted with respect to the Y-axis 36*a* and the filtering pattern 34*b* varies along the Y-axis because of the angle that the filtering pattern tilted with respect to the Y-axis 36*a* is placed. All elements are placed in perfect alignment to each other so that when seen from above all fringes 41*a*, 41*b*, 41*c* as well as the other structures of the modified mirror layer 43*a*, the mirror layers 38*b*, 38*c*, the modified sealant layer 44*a* and the sealant layers 39*b*, 39*c* are all in perfect alignment.

A series of incoming rays 48*a* through 48*h* are shown to illustrate the geometry and workings of the filtering device with tilted filtering pattern with respect to the Y-axis 47.

To facilitate the identification of individual fringes a grid structure with letters and numbers has been created. This way to refer to the fringe 41*a*, the reference A15 can be used. Likewise, the fringe 41*b* can be appointed by the reference B13 and the fringe 41*c*, by the reference C8. Using this grid structure it is easy to note that the fringes A1, B1, and C1 are in perfect alignment and likewise any fringes with different letters but with the same number are aligned.

Any set of fringes with different letters but with the same number that are aligned creates a channel that allows incoming rays to pass through. Any incoming ray hitting a fringe at any level is reflected.

The incoming ray 48*a* goes through the filtering pattern tilted with respect to the Y-axis 36*a* and other filtering patterns 34*b*, 34*c* as it is perpendicular to the filtering patterns and does not intercept any fringe, passing just to the right of the fringes located at position 1. Likewise the incoming ray 48*b* also goes through the filtering pattern tilted with respect to the Y-axis 36*a* and other filtering patterns 34*b*, 34*c* as it is perpendicular to the filtering patterns and does not intercept any fringe, passing just to the left of the fringes located at position 2. The incoming ray 48*a* and the incoming ray 48*b* pass at the edges of the channel 1-2, between the fringes located at the positions 1 and 2.

The incoming ray 48*c* goes through the filtering pattern tilted with respect to the Y-axis 36*a* and other filtering patterns 34*b*, 34*c* at the maximum possible diversion angle with the normal to the filtering patterns allowed for a ray going through the channel between fringes 2 and 3, passing just at the right of the fringe located at A2 and to the left of the fringe located at C3. The diversion angle can be ascertained using the dashed line drawn perpendicular to the filtering patterns at the point where the incoming ray 48*c* passes the fringe located at A2.

The diversion angle of the incoming ray 48*c* seen on FIG. 7B is larger than the diversion angle of the incoming ray 48*c* seen on FIG. 5A. This is because at the point of the incoming ray incidence the filtering pattern tilted with respect to the Y-axis 36*a* is closer to the filtering pattern 34*c* in FIG. 7B than the distance the filtering pattern 34*a* is from the filtering pattern 34*c* on FIG. 5A and the shorter distance increases the allowed maximum angle.

As in the filtering device with tilted filtering pattern with respect to the Y-axis 47 shown in FIG. 7B the distance between the filtering pattern tilted with respect to the Y-axis 36*a* and the filtering pattern 34*b* and 34*c* varies along the Y-axis, the geometry changes affecting the propagation path of incoming rays entering the device at different points. To better illustrate this effect a series of similar incoming rays are drawn at different points to ascertain the differences in the propagation path and clearances.

The incoming ray 48*d* goes through the filtering pattern tilted with respect to the Y-axis 36*a* passing just at the left of the fringe located at A3 and at an angle that allows it to just miss the fringe located at B3. The incoming ray 48*d* hits the fringe located at C4 and is absorbed.

The incoming ray 48*e* goes through the filtering pattern tilted with respect to the Y-axis 36*a* passing just at the left of the fringe located at A6 and at an angle that allows it to just miss the fringe located at B6. The incoming ray 48*e* has a smaller diversion angle than the incoming ray 48*d*, hits the fringe located at C7 and absorbed.

The incoming ray 48*f* goes through the filtering pattern tilted with respect to the Y-axis 36*a* passing just at the left of the fringe located at A9 and at an angle that allows it to just miss the fringe located at B9. The incoming ray 48*f* has a smaller diversion angle than the incoming ray 48*e*, hits the fringe located at C10 and is absorbed.

The incoming ray 48*g* goes through the filtering pattern tilted with respect to the Y-axis 36*a* passing just at the left of the fringe located at A12 and at an angle that allows it to just miss the fringe located at B12. The incoming ray 48*g* has a smaller diversion angle than the incoming ray 48*f*, misses the fringe located at C13 and exits the filtering device with tilted filtering pattern with respect to the Y-axis 47.

The incoming ray 48*h* goes through the filtering pattern tilted with respect to the Y-axis 36*a* passing just at the left of the fringe located at A14 and at an angle that allows it to just miss the fringe located at B14. The incoming ray 48*g* has a smaller diversion angle than the incoming ray 48*f*, misses the fringe located at C15 and exits the filtering device with tilted filtering pattern with respect to the Y-axis 47.

Note that the required incidence angle, the diversion angle, for incoming ray 48*f* to miss the fringe at level B is smaller than the incidence angle of incoming ray 48*e*. Likewise, the incidence angle for incoming ray 48*e* to miss the fringe at level B is smaller than the incidence angle of incoming ray 48*d*. This is a result of the gradual increase in the distance between the fringes caused by the angled installation of the filtering pattern tilted with respect to the Y-axis 36*a*. As this continues eventually incoming ray 48*g* is able to go through and exit the filtering device with tilted filtering pattern with respect to the Y-axis 47. The next incoming ray 48*h* also go through and exit the filtering device with tilted filtering pattern with respect to the Y-axis 47 with some clearance to the fringe located at C15.

The embodiment of the filtering device with tilted filtering pattern with respect to the Y-axis 47 with one filtering pattern tilted with respect to the Y-axis 36*a* and two filtering patterns 34*b*, 34*c* as shown in FIG. 7 and FIG. 7B allows unwanted incoming rays with various diversion angles to potentially go through, depending on the point of incidence along the Y-axis. As a result, the laser source used must have better collimation than the collimation required to operate using the apparatus shown in FIG. 5 and FIG. 5A.

To improve the performance of the filtering device with tilted filtering pattern with respect to the Y-axis 47, additional filtering patterns parallel to the filtering patterns 34*b*, 34*c* can be used to guarantee that all laser beams produced by the available laser source hitting the filtering device with tilted filtering pattern with respect to the Y-axis 47 at an unwanted angle are stopped.

Figure 8:
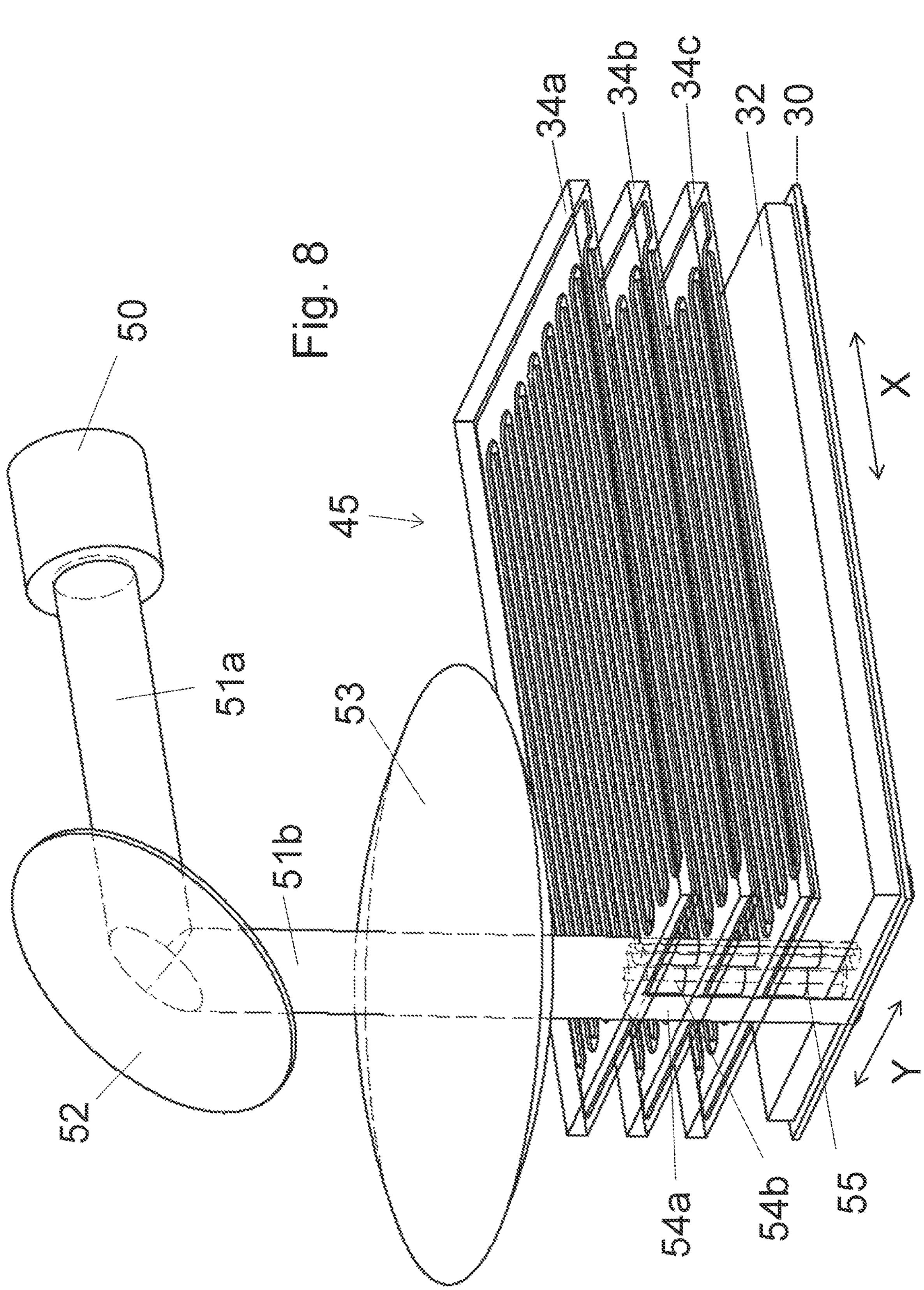
FIG. 8 is an isometric view of an embodiment of an apparatus for laser cutting of the substrate with applied graphene layer of FIG. 1 in an embodiment of the laser cutting filtering device of the present invention.

FIG. 8 shows a first embodiment of an apparatus to laser cut the graphene layer 32 applied over the substrate 30. A laser source 50 produces a laser beam 51*a* that is diverted using a mirror 52 through a lens 53. As the laser beam 51*b* exit the lens 53 it hits the filtering device 45 composed of several, three in the example of FIG. 8, filtering patterns 34*a*, 34*b*, 34*c* that are placed perfectly aligned with each other so that from the perspective of the laser beam 51*b* the filtering patterns appear as a single filtering pattern.

The reason for multiple filtering patterns is that due to physical limitations in the optic system the laser beam 51*b* may not be perfectly collimated and focused and therefore may have a degree of divergence producing rays that slowly spread out. The first filtering pattern 34*a* reflects the bulk of the unwanted portions of the laser beam 51*b* generating a series of beam fringes 54*a*, 54*b* that pass through and correspond to the places that need to be cut.

As explained in the above paragraph the beam fringes 54*a*, 54*b* are already in the shape of the intended cuts but due to the divergence of the laser beam 51*b* the beam fringes are still spreading out. The second filtering pattern 34*a* and the third filtering pattern 34*c* are placed at a distance to the previous filtering pattern producing an assembly that works as a collimator. As the laser beam passes through the channels in one filtering pattern, the portions that pass near the edge of the reflective surface that are not perfectly aligned will hit the reflective surface in the next filtering pattern and will be removed producing a beam with increasing collimation and accuracy as the laser beam continues to the subsequent filtering patterns. More than three filtering patterns can be used if needed according to the level of collimation required. The last filtering pattern 34*c* is placed as close to the graphene layer 32 as feasible to produce a laser cut 55 as accurate as possible in the graphene layer 32.

Figure 9:
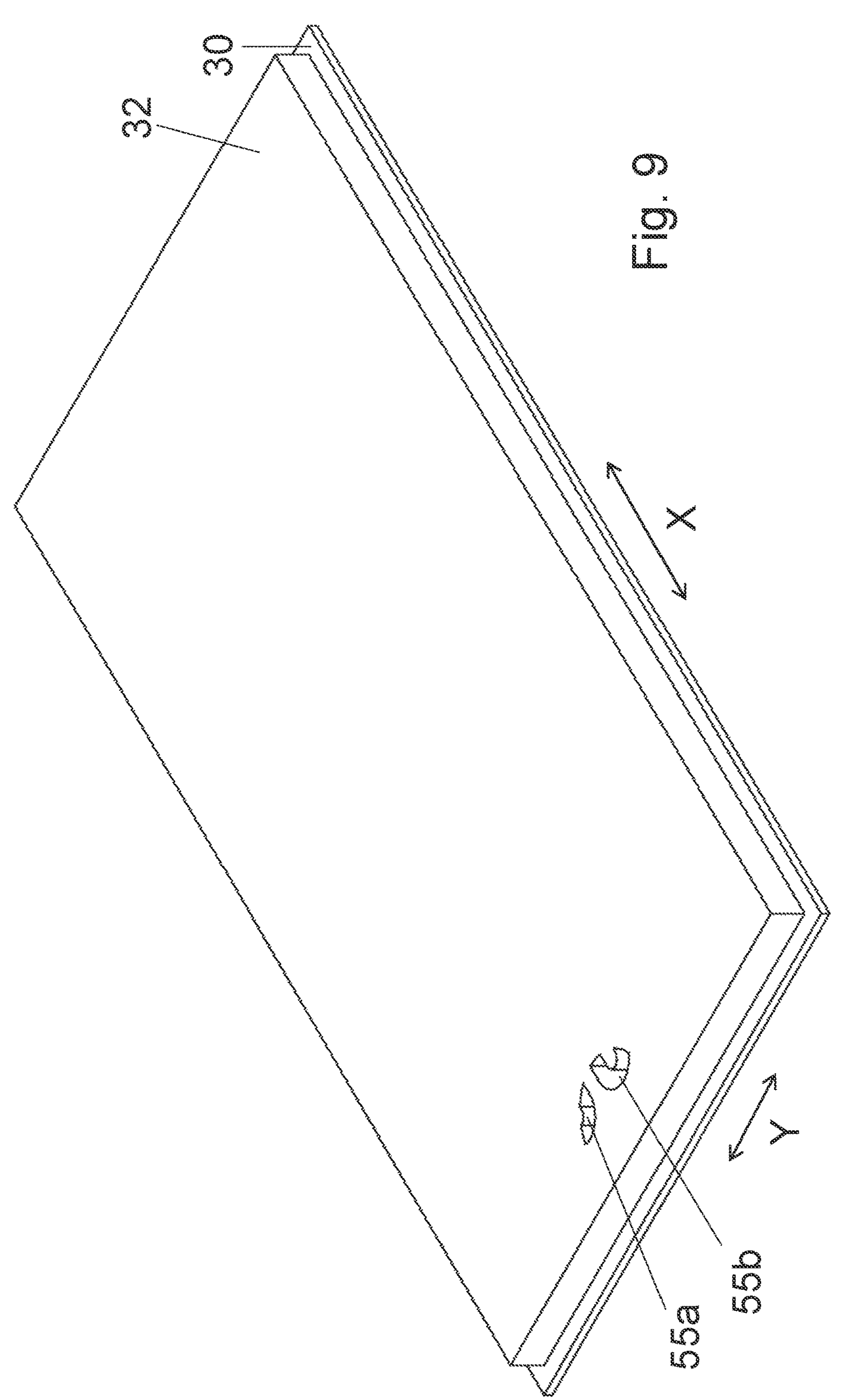
FIG. 9 is an isometric view of resulting laser cut done by the apparatus for laser cutting of FIG. 8 on the substrate with applied graphene layer of FIG. 1 in an embodiment of the laser cutting filtering device of the present invention.

FIG. 9 shows the laser cuts 55*a*, 55*b* on the graphene layer 32 applied over the substrate 30 produced by the apparatus shown in FIG. 8.

Figure 10:
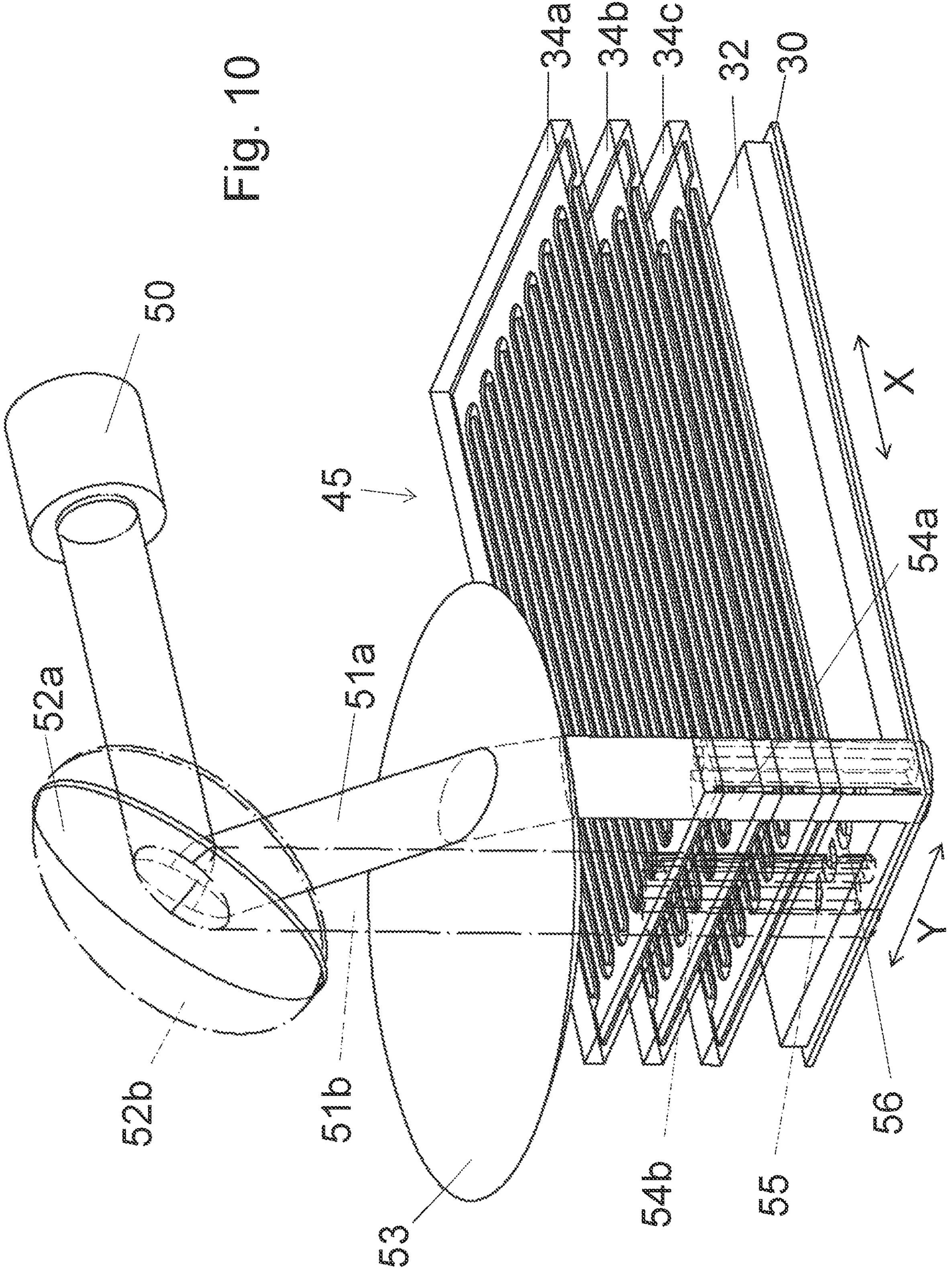
FIG. 10 is an isometric view of the embodiment of FIG. 8 of the apparatus for laser cutting showing laser beam positioning in an embodiment of the laser cutting filtering device of the present invention.

FIG. 10 shows a cut path 56 produced when the mirror 52*a* moves to deflect the laser beam 51*a* generated by the laser source 50. The lens 53 deflects the laser beam 51*a* and corrects the angle at the point of incidence so that after leaving the lens 53 the laser beam 51*a* hits the filtering device 45 composed of several, three in the example of FIG. 10, filtering patterns 34*a*, 34*b*, 34*c* in a straight angle or at an angle as straight as possible producing beam fringes 54*a* that hit the graphene layer 32 previously applied over the substrate 30.

To better illustrate the cut path 56 produced when the mirror 52 moves to deflect the laser beam 51*a*, FIG. 10 shows an overlay with the mirror 52*b* in the same position as seen on previous FIG. 8. In the overlay shown in FIG. 10, the produced laser beam 51*b* hits the first filtering pattern 34*a* and subsequent filtering patterns 34*b*, 34*c* at a straight angle and the produced beam fringes 54*b* hit the graphene layer 32 and produce the intended laser cut 55 at the beginning of the cut path 56. The beam fringes 54*a* produced by the deflected laser beam 51*a* hit the graphene layer 32 at the end of the cut path 56.

Figure 12:
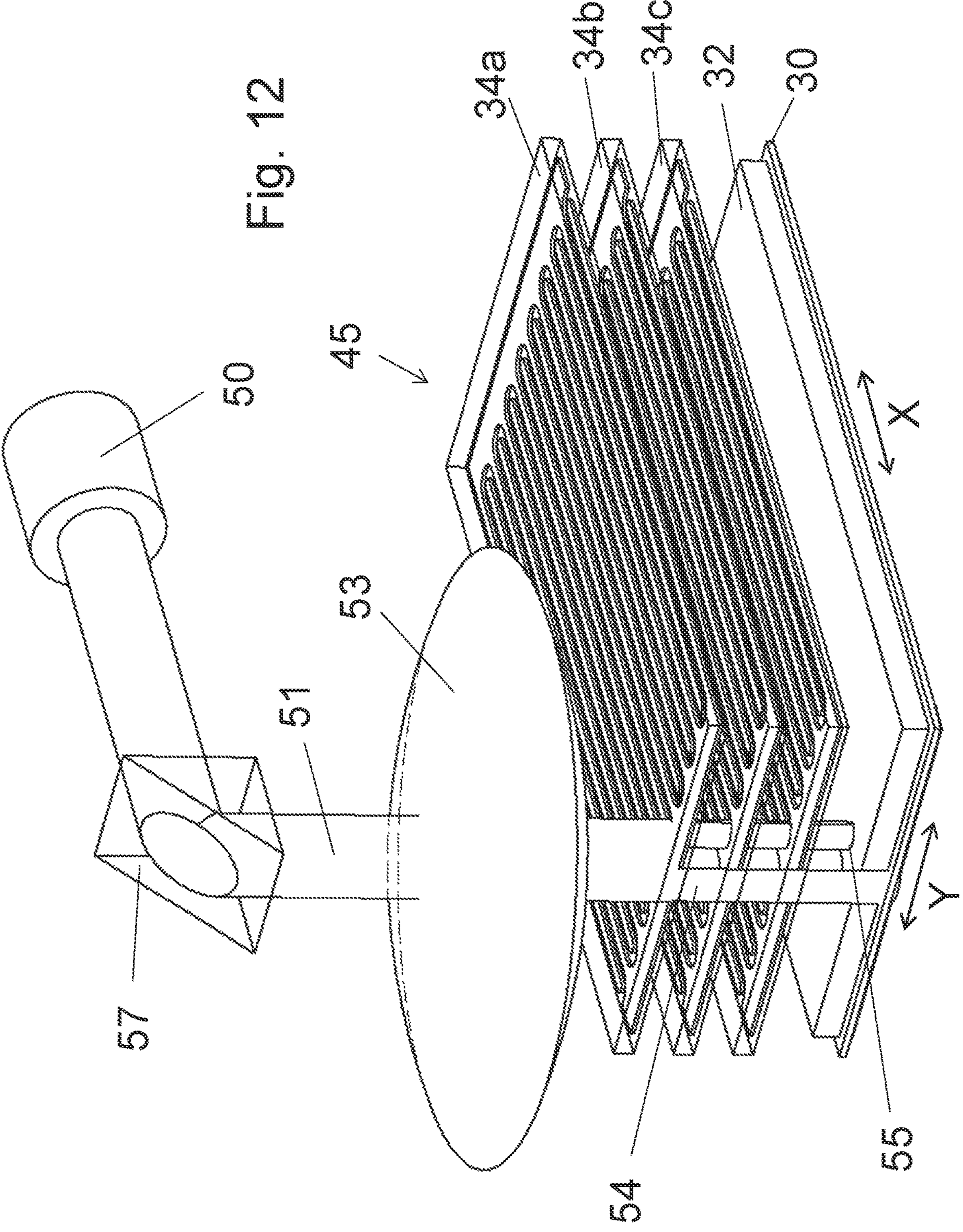
FIG. 12 is an isometric view of an embodiment of an apparatus for laser cutting of the substrate with applied graphene layer of FIG. 1 using a prism in an embodiment of the laser cutting filtering device of the present invention.

FIG. 11 shows the cut path 56 on the graphene layer 32 applied over the substrate 30 produced by the apparatus shown in FIG. 12.

FIG. 12 shows a slightly different possibility where a prism 57 is used instead of the mirror to deflect the laser beam 51 through the lens 53. As the laser beam 51 exits the lens 53 it hits the filtering device 45 composed of several, three in the example of FIG. 12, filtering patterns 34*a*, 34*b*, 34*c* that are placed perfectly aligned with each other so that from the perspective of the laser beam 51 the filtering patterns appear as a single filtering pattern. The first filtering pattern 34*a* reflects the bulk of the unwanted portions of the laser beam 51 generating the beam fringes 54 that hit the graphene layer 32 previously applied over the substrate 30 producing the intended laser cut 55.

Figure 13:
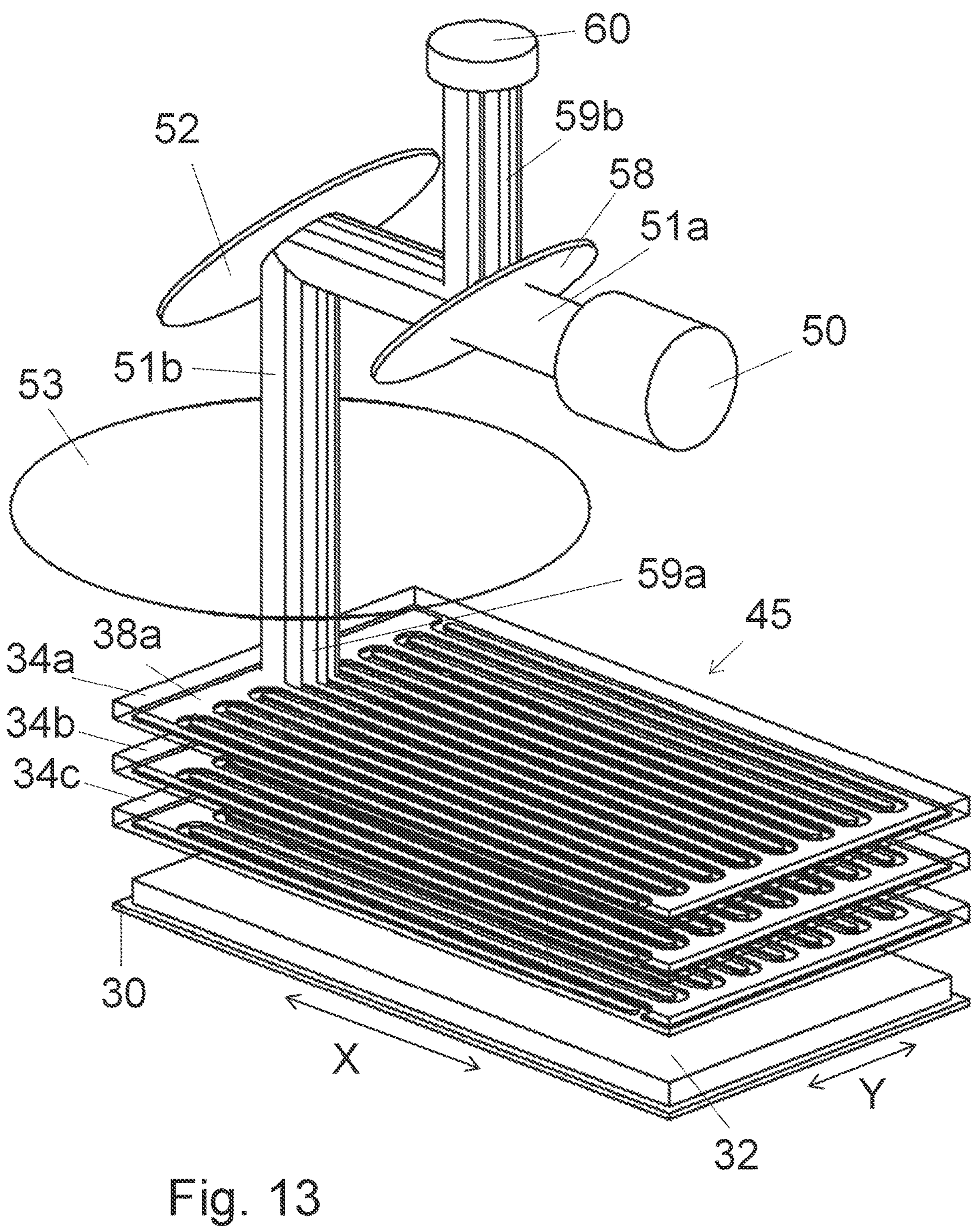
FIG. 13 is an isometric view of an embodiment of an apparatus for laser cutting of the substrate with applied graphene layer of FIG. 1 producing a straight reflected laser beam in an embodiment of the laser cutting filtering device of the present invention.

FIG. 13 shows the apparatus to laser cut the graphene layer 32 applied over the substrate 30 from a different angle to show additional detail. The laser beam 51*a* produced by the laser source 50 is diverted in the mirror 52, passes through the lens 53 and hits the filtering device 45. A reflected laser beam 59*a* is produced when the laser beam 51*b* hits the mirror layer 38*a* of the filtering pattern 34*a*, and the mirror layers of the subsequent filtering patterns 34*b*, 34*c*.

As the filtering pattern 34*a* is placed exactly perpendicular to the laser beam 51*b*, the reflected laser beam 59*a* returns in the same path in reverse order going through the lens 53 and the mirror 52. To prevent the reflected laser beam 59*a* to return to the laser source 50 potentially causing damage to the laser source 50, a partial mirror 58 is placed between the laser source 50 and the mirror 52 in such a way that the laser beam 51*a* coming from the laser source 50 passes through but the reflected laser beam 59*b* coming from the mirror 52 is reflected 90 degrees so it can be safely absorbed by an assimilator 60.

Figure 14:
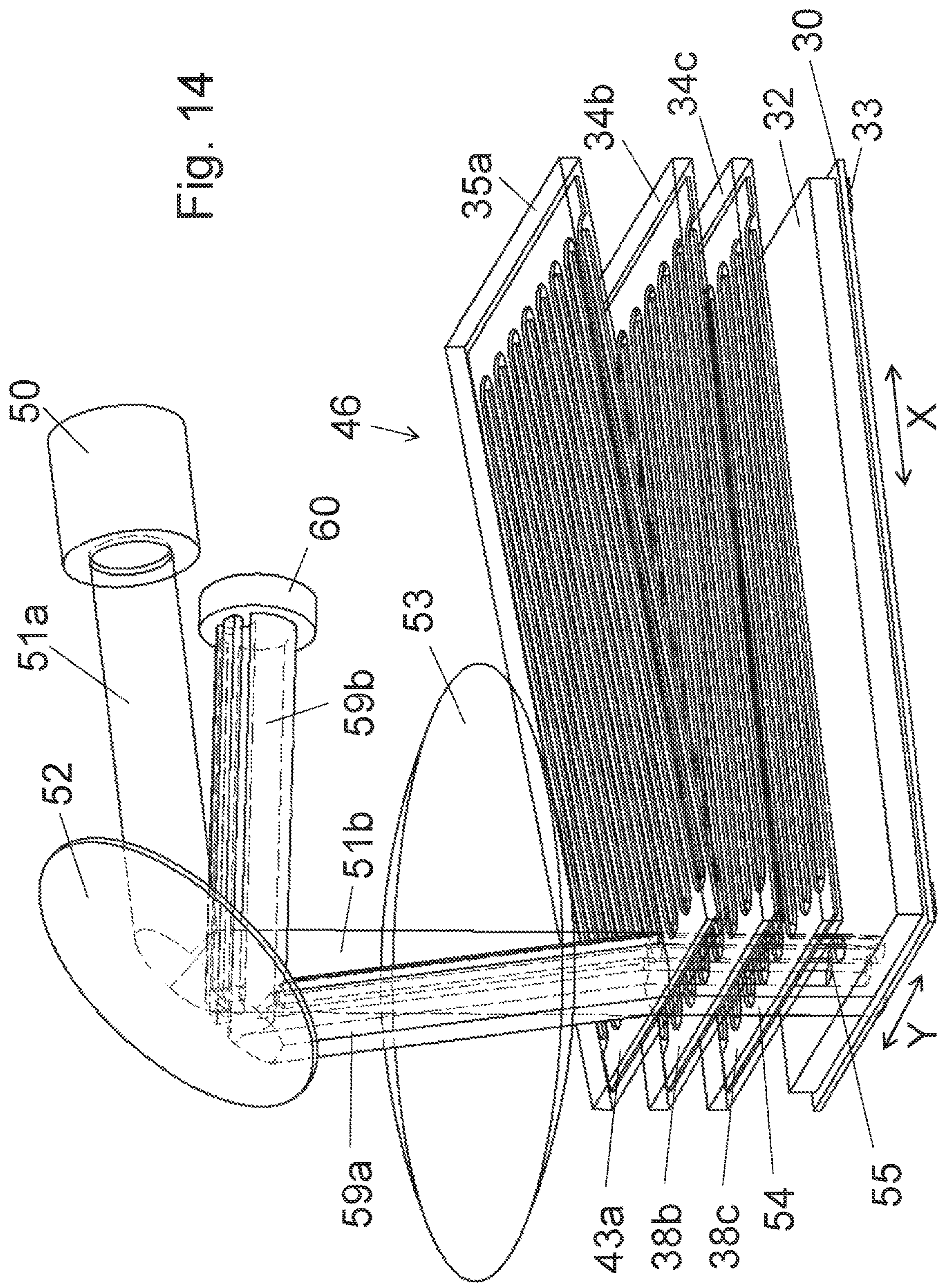
FIG. 14 is an isometric view of an embodiment of an apparatus for laser cutting of the substrate with applied graphene layer of FIG. 1 producing an angled reflected laser beam in an embodiment of the laser cutting filtering device of the present invention.

FIG. 14 shows a slightly different arrangement to safely absorb the reflected laser beam 59*b* in the assimilator 60. The laser beam 51*a* produced by the laser source 50 is diverted in the mirror 52, passes through the lens 53 and hits the filtering device with tilted filtering pattern with respect to the X-axis 46.

The bulk of the reflected laser beam 59*a* is produced when the laser beam 51*b* hits the modified mirror layer 43*a* of the filtering pattern tilted with respect to the X-axis 35*a*. There are secondary reflections in the mirror layers 38*b*, 38*c* of the subsequent filtering patterns 34*b*, 34*c* but as these secondary reflections are caused by divergence of the laser beam 51*b* they are substantially less powerful and do not need to be considered a threat to the laser source 50.

As the filtering pattern tilted with respect to the X-axis 35*a* is placed with its normal at a small angle to the laser beam 51*b*, the reflected laser beam 59*a* returns in a slightly different path than the path taken by the laser beam 51*b*. The reflected laser beam 59*a* goes through the lens 53 and the mirror 52 but hits the mirror 52 at a different point and at a different angle. As a result the reflected laser beam 59*b* skips the laser source 50 and goes directly to the assimilator 60 to be absorbed.

The angle between the normal of the filtering pattern tilted with respect to the X-axis 35*a* and the laser beam 51*b*, must be relatively small to avoid big variations in distance between both ends of the filtering pattern tilted with respect to the X-axis 35*a* and the filtering pattern 34*b* that could impair the collimation function of the filtering device with tilted filtering pattern with respect to the X-axis 46.

The laser beam 51*b* portions that are not reflected create many beam fringes 54 that hit the graphene layer 32 and produce the intended laser cut 55.

Figure 19:
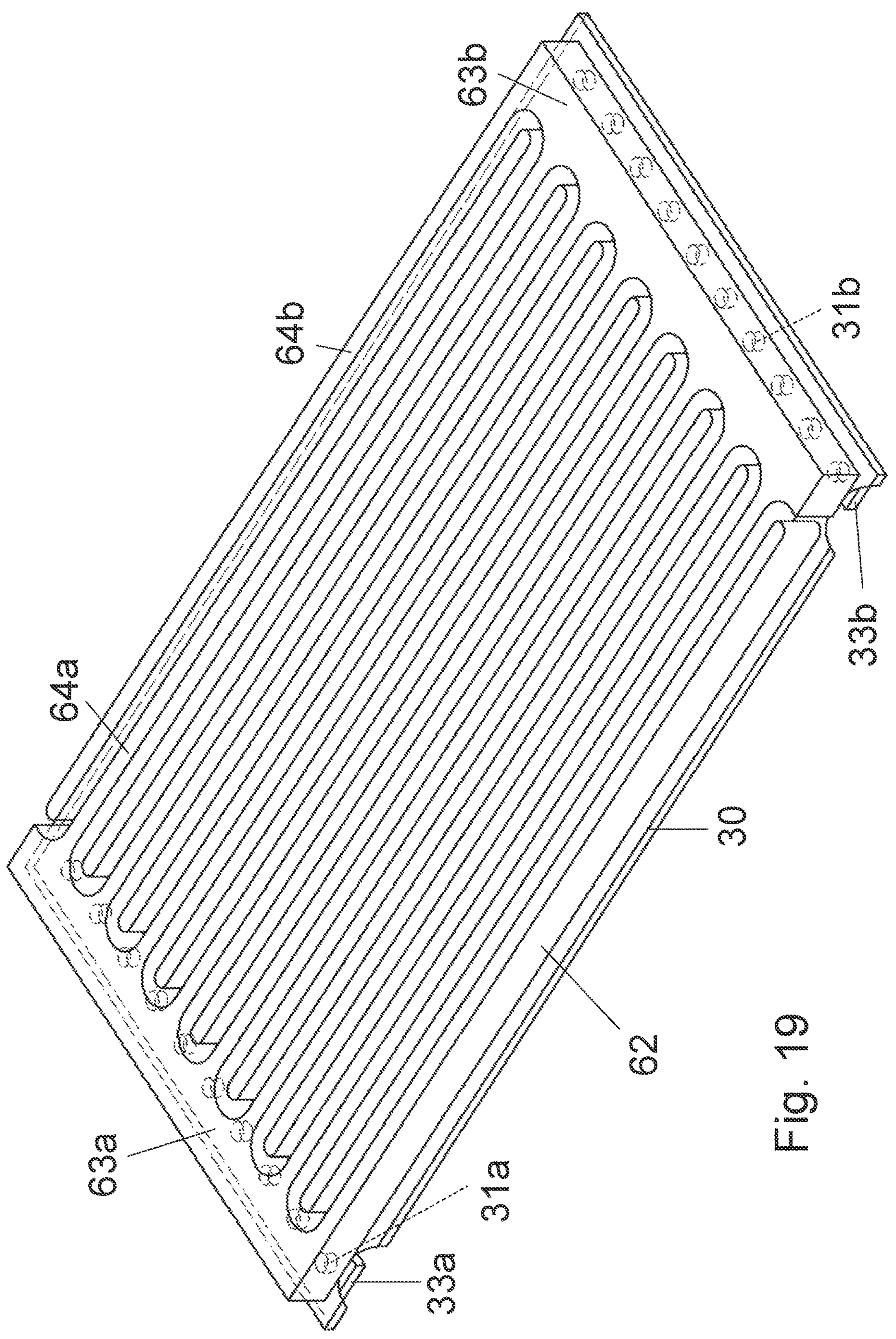
FIG. 19 is an isometric view of an embodiment of a substrate with processed graphene layer in an embodiment of the laser cutting filtering device of the present invention

FIG. 19 shows the end result of the laser cutting on the graphene layer applied over the substrate 30. As the cutting is completed a processed graphene layer 62 is produced with a pair of terminals 63*a* and 63*b*. In the design shown in FIG. 19 the terminals 63*a* and 63*b* are fully separated from each other and remain connected to a series of alternated fringes 64*a*, 64*b*, etc. in such a way that the terminal 63*a* is connected to the fringe 64*a* but not to the next adjacent fringe 64*b*. Similarly, the terminal 63*b* is connected to the fringe 64*b* but not to fringe 64*a*. The terminals 63*a* and 63*b* are also connected to the respective under contacts 33*a* and 33*b* under the substrate 30 through the perforations 31*a*, 31*b* in such a way that the terminal 63*a* is connected to the under contact 33*a* but not to the under contact 33*b* and the terminal 63*b* is connected to the under contact 33*b* but not to the under contact 33*a*. To facilitate the visualization of the under contacts 33*a* and 33*b* two circular cutouts have been made in the substrate 30 at the appropriate points.

Figure 20:
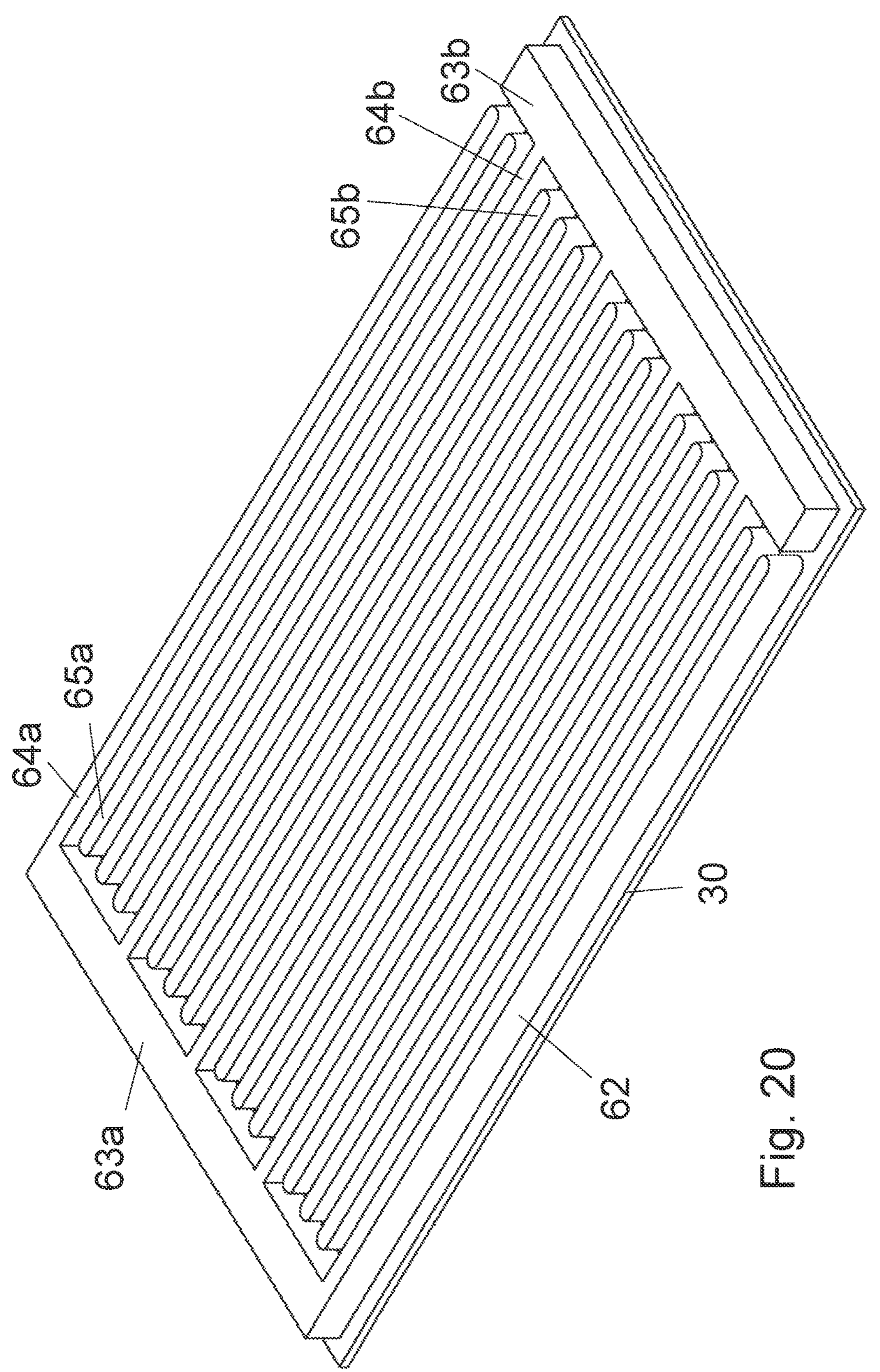
FIG. 20 is an isometric view of another embodiment of a substrate with processed graphene layer in an embodiment of the laser cutting filtering device of the present invention.

FIG. 20 shows an alternate end result of the laser cutting on the graphene layer applied over the substrate 30. As the cutting is completed using an appropriate set of filtering patterns the processed graphene layer 62 is produced with a set of unconnected fringes 65*a*, 65*b*, etc. that are not connected to any of the terminals 63*a* and 63*b*. In the example of FIG. 20, the terminals 63*a* and 63*b* are fully separated from each other and remain connected to a series of alternated fringes 64*a*, 64*b*, etc. in such a way that one unconnected fringe 65*a*, is placed between two consecutive fringes 64*a*, 64*b*, connected to the terminals 63*a* and 63*b* respectively. Similarly, the unconnected fringe 65*b* is placed between fringe 64*b* connected to the terminals 63*b* and the next fringe connected to the terminal 63*a* and so on.

Figure 21:
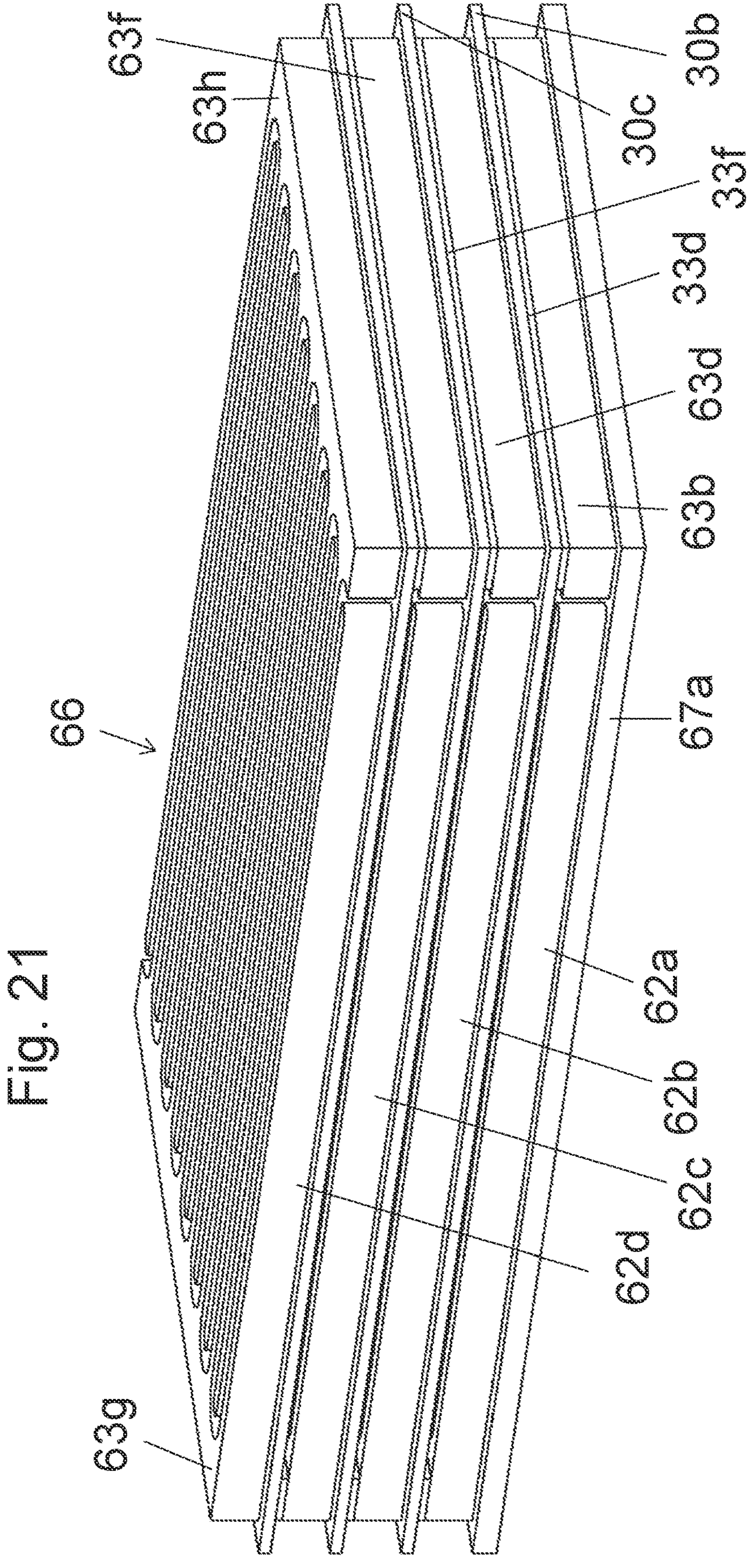
FIG. 21 is an isometric view of an embodiment of an element stack in an embodiment of the laser cutting filtering device of the present invention.

FIG. 21 shows an element stack 66 that is produced when multiple processed graphene layers 62*a*, 62*b*, 62*c*, 62*d*, etc. are stacked to increase the total device capacity. For better stability the first processed graphene layer 62*a* to be placed in the element stack 66 is constructed on a base 67*a* made of a thicker, sturdier material than the material used in the substrate 30*b*, 30*c*, etc. used to support the other processed graphene layers 62*b*, 62*c*, 62*d* included in the element stack 66.

The individual layers are just simply stacked on top of each other taking care to align all the layers so that for example the under contact 33*d* in the second layer is placed exactly above the terminal 63*b* in the first layer. Similarly, the under contact 33*f* in the third layer is placed exactly above the terminal 63*d* in the second layer. The same applies for the terminals 63*g* on the other side and the terminals 63*f*, 63*h* on other layers.

Figure 22:
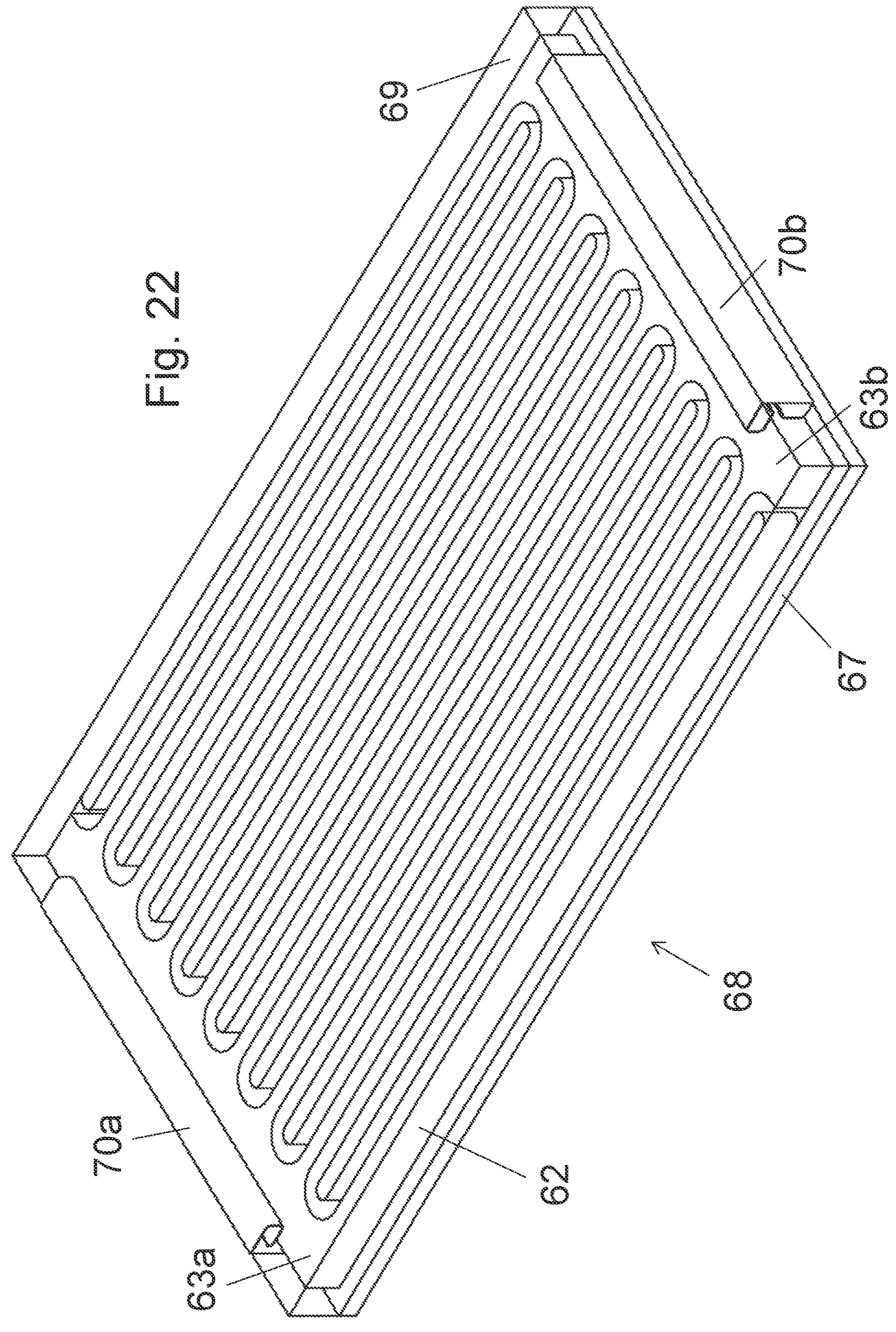
FIG. 22 is an isometric view of an embodiment of a supercapacitor assembly produced from a laser cutting process of the present invention in an embodiment of the laser cutting filtering device of the present invention.

FIG. 22 shows a supercapacitor assembly 68 that is produced when a cover 69 is placed over the base 67 containing one processed graphene layer 62 or one element stack to fully encase the structure inside a protective environment. A pair of metallic contacts 70*a*, and 70*b* are placed in contact with the terminals 63*a*, and 63*b* respectively to provide a sturdy electric contact to supply power to external devices. To facilitate the visualization of other components, the cover 69 was drawn transparent.

Operation—First Embodiment

First the perforations 31 are made at both ends of the substrate 30 as seen in FIG. 1. Then the graphene layer 32 is applied on top of the substrate 30 in such a way to cover and flow through and cover all the perforations 31. The application of the graphene layer 32 can be done in one or more steps applying a single layer of the intended thickness or applying successive layers of an adequate thickness and letting it dry before applying the next layer until the intended thickness is achieved. To ensure that the graphene layer 32 has a good bond to the substrate 30, a surface treatment such as surface plasma eroding can be applied to the substrate 30 if necessary.

As shown in FIG. 2, under contacts 33 made out of the same material used to create the graphene layer 32 are made in the underside of the graphene layer 32. The previously done perforations 31 create a series of bridges that are filled with the same material as the graphene layer 32 and the under contacts 33 allowing the graphene layer 32 and the under contacts 33 to remain physically and electrically connected across the substrate 30.

FIG. 3 shows an isometric view of the graphene layer 32 applied over the substrate 30 showing the perforations 31 and the under contacts 33 and FIG. 4 shows an embodiment of the filtering pattern 34 that is composed of the glass layer 37 with portions of the glass layer 37 coated with the mirror layer 38 along the underside of the glass layer 37 with the mirror layer 38 formed in a pattern.

The laser cutting operation may be performed using any one of filtering devices 45, 46, and 47 shown in FIGS. 5-7B or other embodiments. The filtering patterns may be of any suitable design to develop the desired properties of the supercapacitor or other products.

FIG. 8 shows the basic cutting method. The laser source 50 produces the laser beam 51*a* that is diverted using the mirror 52 through the lens 53. As the laser beam 51*b* exits the lens 53 it hits several, three in the example of FIG. 8, filtering patterns 34*a*, 34*b*, 34*c* that are placed perfectly aligned with each other so that from the perspective of the laser beam 51*b* the filtering patterns appear as a single filtering pattern. By using multiple filtering patterns any degree of divergence producing rays that slowly spread out is eliminated.

The first filtering pattern 34*a* reflects the bulk of the unwanted portions of the laser beam 51*b* generating many beam fringes 54*a*, 54*b* that pass through and correspond to the places that will be cut. The second filtering pattern 34*a* and the third filtering pattern 34*c* are placed at a distance to the previous filtering pattern producing an assembly that works as a collimator. As the laser beam passes through the channels in one filtering pattern, the portions that pass near the edge of the reflective surface that are not perfectly aligned hit the reflective surface in the next filtering pattern and are removed producing a beam with increasing collimation and accuracy as the laser beam continues to the subsequent filtering patterns with last filtering pattern 34*c* placed as close to the graphene layer 32 as achievable to produce the laser cut 55 as accurately as possible in the graphene layer 32 as shown in FIG. 9.

As shown in FIG. 10, the mirror pivots indicated in a first position 52*a* and in a second position as 52*b* to divert the laser beam 51*b* along the Y axis. The substrate 30 with the applied graphene layer 32 and the filtering patterns 34*a*, 34*b*, 34*c* move together in unison to allow the laser beam 51*a* to reach different points across the X axis. As the laser beam 51*a* moves and hits different points in the filtering patterns 34*a*, 34*b*, 34*c* the beam fringes 54*a*, 54*b* alter accordingly keeping the precise pattern that needs to be produced at the laser cut 55 point in the graphene layer 32 below. To maximize cutting efficiency, the laser beam 51*a* is produced orders of magnitude wider than the smallest dimensions in the filtering patterns 34*a*, 34*b*, 34*c* spreading the laser power over a larger area and producing a plurality, which might be several thousands, of beam fringes 54*a*, 54*b* that have each a tiny portion of the total energy contained in the laser beam 51*a*. These low power beam fringes 54*a*, 54*b* can cut the graphene layer 32 more gently than a concentrated thin laser beam would, taking smaller chunks of material at each pass. However, as there are a plurality, which might be several thousands, of beam fringes 54*a*, 54*b* the combined effect produces a faster and more reliable result than a single more powerful laser beam could possibly produce.

As shown in FIG. 10, the cut path 56 is produced after the lens 53 deflects the laser beam 51*a* and corrects the angle at the point of incidence so that after leaving the lens 53 the laser beam 51*a* hits the first filtering pattern 34*a* and subsequent filtering patterns 34*b*, 34*c* in a straight angle or at an angle as straight as possible producing beam fringes 54*a* that hit and cut the graphene layer 32 previously applied over the substrate 30 in the design of the filtering patterns 34*a*, 34*b*, and 34*c* of the filtering device 45.

As shown in FIG. 12 the mirror shown in previous FIG. 8 and FIG. 10, can be replaced by the prism 57 and operate in the same way as described above for FIG. 8 and FIG. 10 with similar results.

FIG. 13 shows the reflected laser beam 59*a* produced when the laser beam 51*b* hits the mirror layer 38*a* of the filtering pattern 34*a* and the mirror layers of the subsequent filtering patterns 34*b*, 34*c*. Because the filtering pattern 34*a* is placed exactly perpendicular to the laser beam 51*b*, the reflected laser beam 59*a* returns in the same path in reverse order going through the lens 53 and the mirror 52 so to prevent damage to the laser source 50, the partial mirror 58 is placed between the laser source 50 and the mirror 52 in such a way that the laser beam 51*a* coming from the laser source 50 passes through but the reflected laser beam 59*b* coming from the mirror 52 is reflected 90 degrees so it can be safely absorbed by the assimilator 60.

The mirror 52 pivots to divert the laser beam 51*b* along the Y axis and the substrate 30 with the applied graphene layer 32 and the filtering patterns 34*a*, 34*b*, 34*c* move together in unison to allow the laser beam 51*b* to reach different points across the X axis. As this process occurs the reflected laser beam 59*b* changes accordingly depending on the pattern at the particular point it hits in the filtering patterns 34*a*, 34*b*, 34*c*. The reflected laser beam 59*b* is reflected back in the mirror 52 and reflected again in the partial mirror 58 and continues to be safely absorbed by the assimilator 60.

FIG. 14 shows a slightly different arrangement to safely absorb the reflected laser beam 59*b* in the assimilator 60. As the filtering pattern tilted with respect to the X-axis 35*a* is placed with its normal at a small angle to the laser beam 51*b*, the reflected laser beam 59*a* returns in a slightly different path than the path taken by the laser beam 51*b*. The reflected laser beam 59*a* goes through the lens 53 and the mirror 52 but hits the mirror 52 at a different point and at a different angle. As a result the reflected laser beam 59*b* skips the laser source 50 and goes directly to the assimilator 60 to be absorbed.

The angle between the normal of the filtering pattern tilted with respect to the X-axis 35*a* and the laser beam 51*b*, must be relatively small to avoid big variations in distance between both ends of the filtering pattern tilted with respect to the X-axis 35*a* and the filtering pattern 34*b* that could impair the collimation function of the filtering device with tilted filtering pattern with respect to the X-axis 46.

The mirror 52 pivots to divert the laser beam 51*b* along the Y axis and the substrate 30 with the applied graphene layer 32 and the filtering patterns 34*a*, 34*b*, 34*c* move together in unison to allow the laser beam 51*b* to reach different points across the X axis. As this process occurs the reflected laser beam 59*b* is reflected back in the mirror 52 and continues to be safely absorbed by the assimilator 60.

As the laser beam 51*b* moves and hits different points in the filtering pattern tilted with respect to the X-axis 35*a* and the filtering patterns 34*b*, 34*c* the beam fringes 54 alter accordingly keeping the precise pattern that needs to be produced at the laser cut 55 point in the graphene layer 32 below. To maximize cutting efficiency, the laser beam 51*b* is produced orders of magnitude wider than the smallest dimensions in the filtering pattern tilted with respect to the X-axis 35*a* and the filtering patterns 34*b*, 34*c* spreading the laser power over a larger area and producing a plurality, which might be several thousands, of beam fringes 54 that each have a tiny portion of the total energy contained in the laser beam 51*b*. These low power beam fringes 54 can cut the graphene layer 32 more gently than a concentrated thin laser beam would, taking smaller chunks of material at each pass. However, as there are a plurality, which might be several thousands, of beam fringes 54 the combined effect produces a faster and more reliable result than a single more powerful laser beam could possibly produce.

FIG. 19 shows the end result of the laser cutting on the graphene layer applied over the substrate 30. As the cutting is completed the processed graphene layer 62 is produced with the pair of terminals 63*a* and 63*b*. In the design shown in FIG. 19 the terminals 63*a* and 63*b* are fully separated from each other and remain connected to the series of alternated fringes 64*a*, 64*b*, etc. in such a way that the terminal 63*a* is connected to the fringe 64*a* but not to the next adjacent fringe 64*b*. Similarly, the terminal 63*b* is connected to the fringe 64*b* but not to the fringe 64*a*. The terminals 63*a* and 63*b* are also connected to the respective under contacts 33*a* and 33*b* under the substrate 30 through the perforations 31*a*, 31*b* in such a way that the terminal 63*a* is connected to the under contact 33*a* but not to the under contact 33*b* and the terminal 63*b* is connected to the under contact 33*b* but not to the under contact 33*a*. To facilitate the visualization of the under contacts 33*a* and 33*b* two circular cutouts have been made in the substrate 30 at the appropriate points.

Any two adjacent fringes 64*a* and 64*b* implement a unit capacitor. As the alternate fringes are connected to separate terminals 63*a* and 63*b* the total arrangement works as thousands of capacitors connected in parallel. The under contacts 33*a* and 33*b* placed directly under the terminals 63*a* and 63*b* and electrically connected to their respective terminals 63*a* and 63*b* work as an easy way to stack multiple layers of thousands of capacitors connected in parallel.

FIG. 20 shows an alternate end result of the laser cutting on the graphene layer applied over the substrate 30. As the cutting is complete using an appropriate set of filtering patterns the processed graphene layer 62 is produced with the set of unconnected fringes 65*a*, 65*b*, etc. that are not connected to any of the terminals 63*a* and 63*b*. In the example of FIG. 20, the terminals 63*a* and 63*b* are fully separated from each other and remain connected to a series of alternated fringes 64*a*, 64*b*, etc. in such a way that one unconnected fringe 65*a*, is always placed between two consecutive fringes 64*a*, 64*b*, connected to the terminals 63*a* and 63*b* respectively. Similarly, the unconnected fringe 65*b* is placed between fringe 64*b* connected to the terminals 63*b* and the next fringe connected to the terminal 63*a*.

The two adjacent fringes 64*a* and 64*b* that are connected to the terminals 63*a* and 63*b* together with the unconnected fringe 65*a* in the middle implement two unit capacitors arranged in series. One capacitor between the fringe 64*a* and the unconnected fringe 65*a* and one capacitor between the unconnected fringe 65*a* and the fringe 64*b*. As the alternate fringes 64*a* and 64*b* are connected to separate terminals 63*a* and 63*b* the total arrangement works as thousands of paired capacitors connected in series that are connected in parallel. The under contacts 33*a* and 33*b* placed directly under the terminals 63*a* and 63*b* and electrically connected to their respective terminals 63*a* and 63*b* work as an easy way to stack multiple layers of thousands of 2 capacitors connected in series that are connected in parallel.

FIG. 21 shows the element stack 66 that is produced when multiple processed graphene layers 62*a*, 62*b*, 62*c*, 62*d*, etc. are stacked to increase the total device capacity. For better stability the first processed graphene layer 62*a* to be placed in the element stack 66 is constructed on the base 67*a* made of a thicker, sturdier material than the material used in the substrate 30*b*, 30*c*, etc. used to support the other processed graphene layers 62*b*, 62*c*, 62*d* included in the element stack 66.

The individual layers are just simply stacked on top of each other taking care to align all the layers so that for example the under contact 33*d* in the second layer is placed exactly above the terminal 63*b* in the first layer. Similarly, the under contact 33*f* in the third layer is placed exactly above the terminal 63*d* in the second layer. The same applies for the terminals 63*g* on the other side and the terminals 63*f*, 63*h* on other layers.

FIG. 22 shows the supercapacitor assembly 68 that is produced placing the cover 69 over the base 67 containing one processed graphene layer 62 or one element stack to fully encase the structure inside a protective environment. The pair of metallic contacts 70*a*, and 70*b* is placed in contact with the terminals 63*a*, and 63*b* respectively to provide a sturdy electric contact to supply power to external devices.

Second Embodiment

Figure 15:
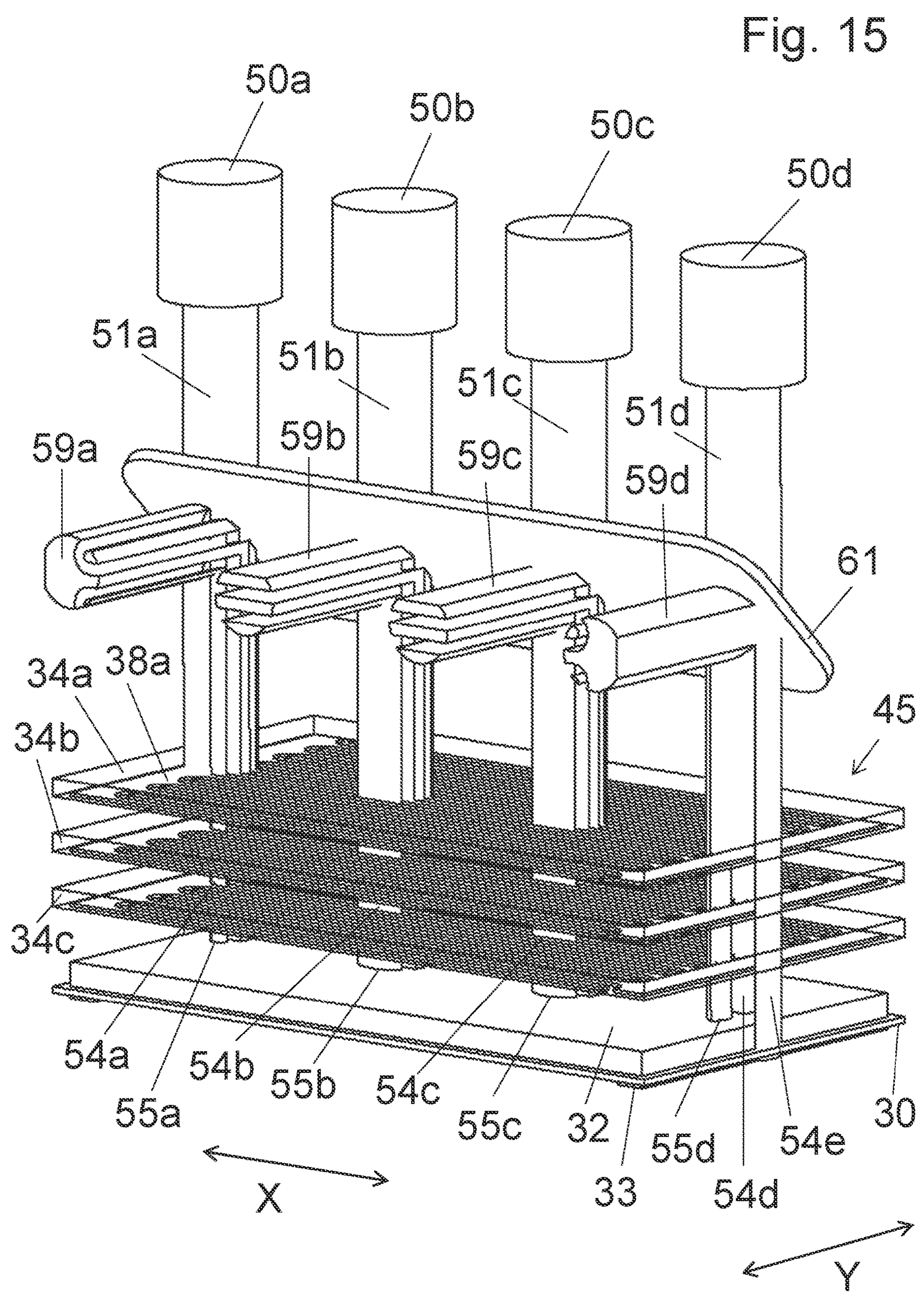
FIG. 15 is an isometric view of an embodiment of an alternative apparatus for laser cutting of the substrate with applied graphene layer of FIG. 1 using multiple laser beams producing multiple straight reflected laser beams in an embodiment of the laser cutting filtering device of the present invention.
Figure 16:
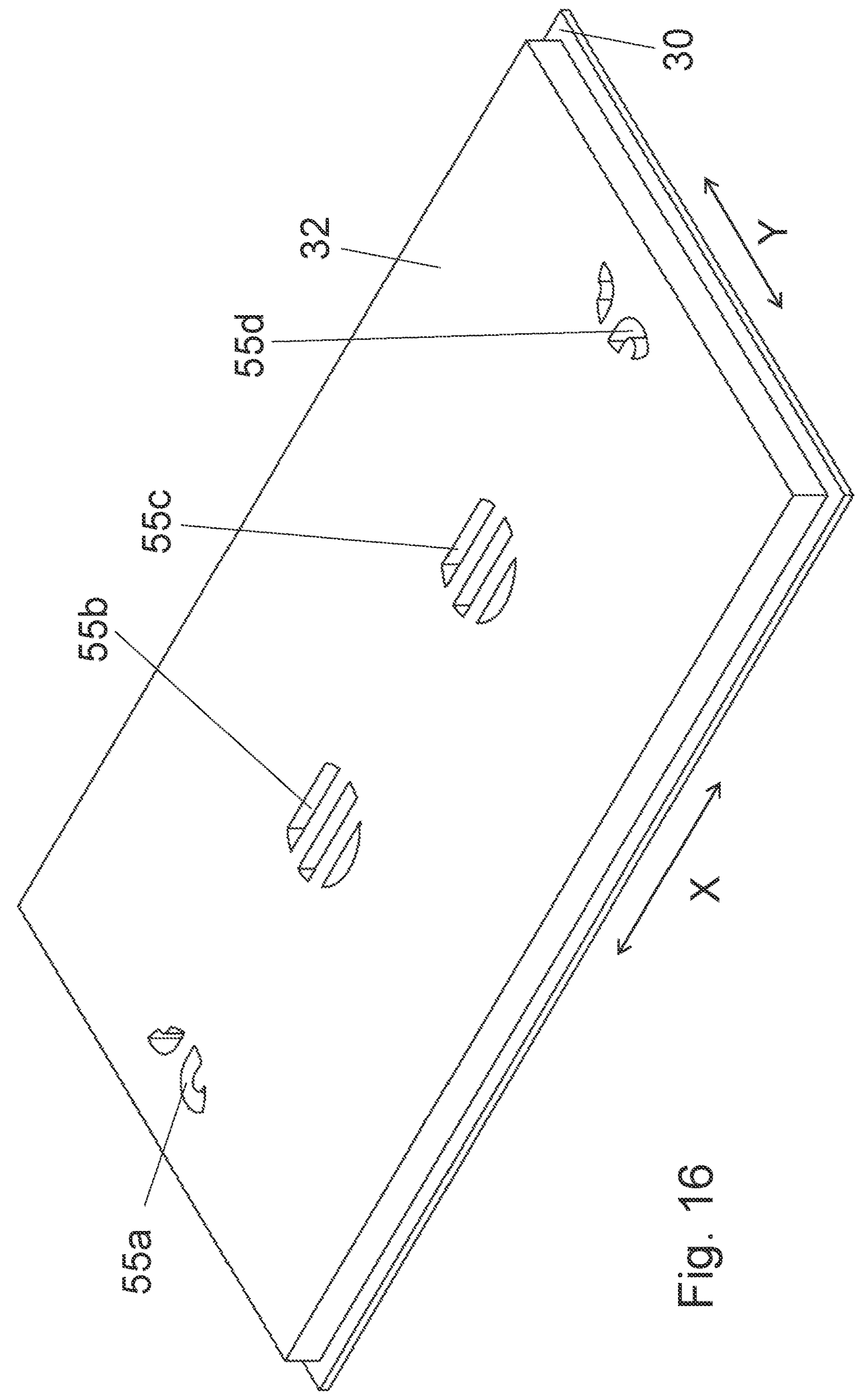
FIG. 16 is an isometric view of resulting multiple laser cuts done by the apparatus for laser cutting of FIG. 15 on the substrate with applied graphene layer of FIG. 1 in an embodiment of the laser cutting filtering device of the present invention.

FIG. 15 shows an alternative embodiment of the present invention that offers the significant advantage of allowing faster processing using multiple laser beams. Many laser beams can be used simultaneously provided that they are sufficiently separated to avoid interference and proper time for heat dissipation. In the example of FIG. 15, only 4 laser beams are drawn to avoid cluttering. The laser source 50*a*, 50*b*, 50*c*, 50*d* is placed directly above the filtering patterns 34*a*, 34*b*, 34*c* and the graphene layer 32 applied over the substrate 30. The laser beam 51*a*, 51*b*, 51*c*, 51*d* portions that are not reflected create many beam fringes 54*a*, 54*b*, 54*c*, 54*d*, 54*e* that hit the graphene layer 32 and produce the intended laser cut 55*a*, 55*b*, 55*c*, 55*d* as illustrated in FIG. 16.

The reason for multiple filtering patterns is that the laser beams may not be perfectly collimated and focused and therefore may have a degree of divergence producing rays that slowly spread out. The first filtering pattern 34*a* reflects the bulk of the unwanted portions of the laser beams generating many beam fringes that pass through and correspond to the places that will be cut.

As explained in the above paragraph the beam fringes are already in the shape of the intended cuts but due to the divergence of the laser beams the beam fringes are still spreading out. The second filtering pattern 34*b* and the third filtering pattern 34*c* are placed at a distance to the previous filtering pattern producing an assembly that works as a collimator. As the laser beams pass through the channels in one filtering pattern, the portions that pass near the edge of the reflective surface that are not perfectly aligned will hit the reflective surface in the next filtering pattern and will be removed producing a beam with increasing collimation and accuracy as the laser beam continues to the subsequent filtering patterns. More than three filtering patterns can be used if needed according to the level of collimation required. The last filtering pattern 34*c* is placed as close to the graphene layer 32 as feasible to produce the laser cut 55 as accurately as possible in the graphene layer 32.

The reflected laser beam 59*a*, 59*b*, 59*c*, 59*d* is produced when the laser beam 51*a*, 51*b*, 51*c*, 51*d* hits the mirror layer 38*a* of the filtering pattern 34*a* and the mirror layers of the subsequent filtering patterns 34*b*, 34*c*. As the filtering pattern 34*a* is placed perpendicular to the laser beam 51*a*, 51*b*, 51*c*, 51*d*, the reflected laser beam 59*a*, 59*b*, 59*c*, 59*d* returns in the same path than the path taken by the laser beam 51*a*, 51*b*, 51*c*, 51*d*. To prevent the reflected laser beam 59*a*, 59*b*, 59*c*, 59*d* to return to the laser source 50*a*, 50*b*, 50*c*, 50*d* and damage the laser source 50*a*, 50*b*, 50*c*, 50*d* a long partial mirror 61 is placed at a 45 degree angle to the laser beam 51*a*, 51*b*, 51*c*, 51*d* in such a way that the laser beam 51*a*, 51*b*, 51*c*, 51*d* coming from the laser source 50*a*, 50*b*, 50*c*, 50*d* passes through but the reflected laser beam 59*a*, 59*b*, 59*c*, 59*d* is reflected 90 degrees to a direction where it can be safely absorbed.

FIG. 16 shows the laser cuts 55*a*, 55*b*, 55*c*, 55*d* on the graphene layer 32 applied over the substrate 30 produced by the apparatus shown in FIG. 15.

Figure 17:
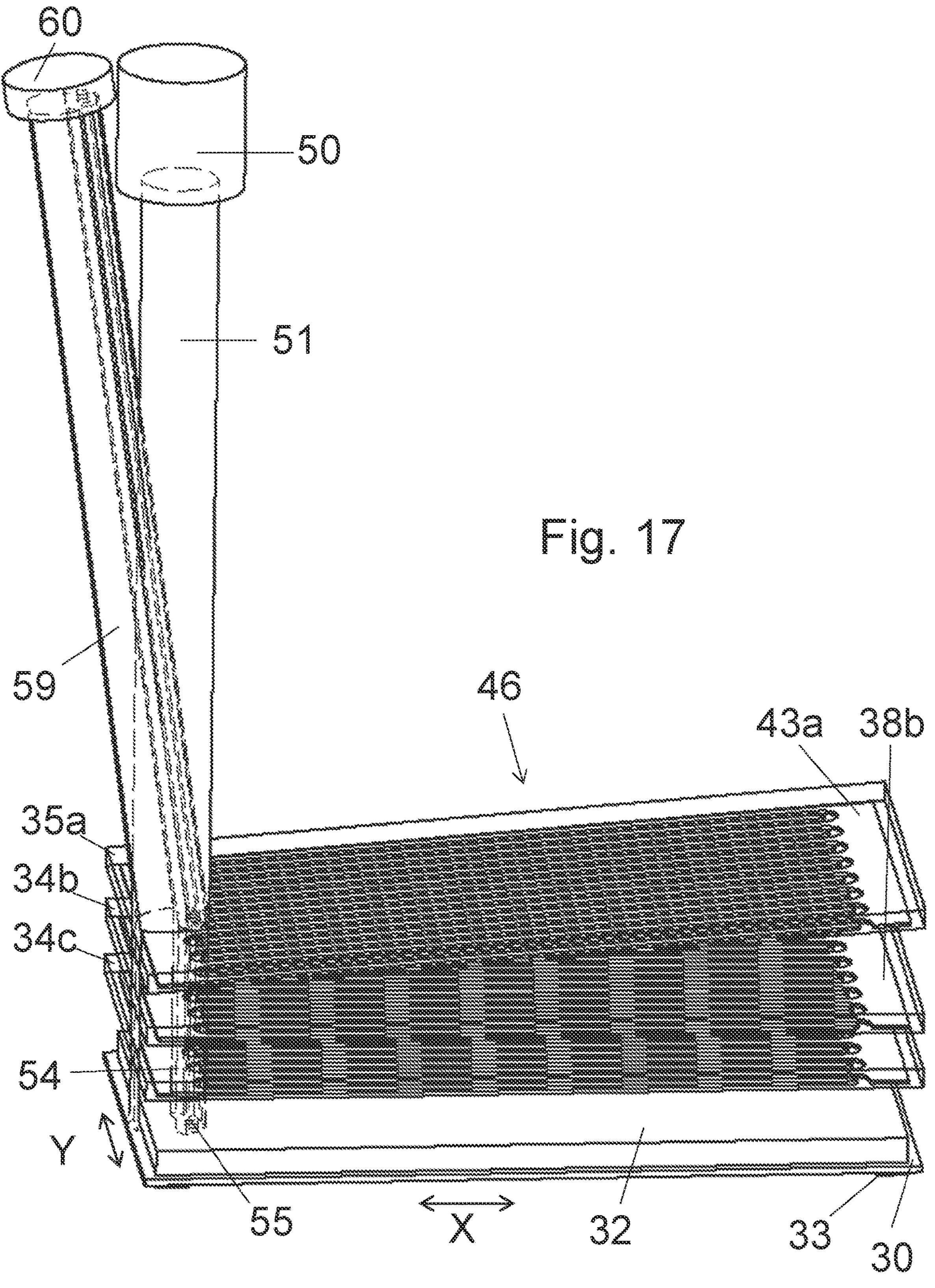
FIG. 17 is an isometric view of an embodiment of an alternative apparatus for laser cutting of the substrate with applied graphene layer of FIG. 1 producing an angled reflected laser beam in an embodiment of the laser cutting filtering device of the present invention.

FIG. 17 shows a slightly different arrangement to safely absorb the reflected laser beam 59 in the assimilator 60. The laser source 50 is placed directly above the filtering device with tilted filtering pattern with respect to the X-axis 46 and the graphene layer 32 applied over the substrate 30. The filtering device with tilted filtering pattern with respect to the X-axis 46 is composed of one filtering pattern tilted with respect to the X-axis 35*a* and several, two in the example of FIG. 17, filtering patterns 34*b*, 34*c*.

The laser beam 51 portions that are not reflected in the filtering pattern tilted with respect to the X-axis 35*a* create many beam fringes 54 that hit the graphene layer 32 and produce the intended laser cut 55.

The bulk of the reflected laser beam 59 is produced when the laser beam 51 hits the modified mirror layer 43*a* of the filtering pattern tilted with respect to the X-axis 35*a*. The filtering pattern tilted with respect to the X-axis 35*a* is placed with its normal at a small angle to the laser beam 51 to have the reflected laser beam 59 return in a slightly different path than the path taken by the laser beam 51. As a result the reflected laser beam 59 skips the laser source 50 and continues directly to the assimilator 60 where it is safely absorbed.

The secondary reflections in the mirror layers of the subsequent filtering patterns 34*b*, 34*c* are caused by divergence of the laser beam 51 and are therefore substantially less powerful and are no threat to the laser source 50.

The angle between the normal of the filtering pattern tilted with respect to the X-axis 35*a* and the laser beam 51, must be relatively small to avoid big variations in distance between both ends of the filtering pattern tilted with respect to the X-axis 35*a* and the filtering pattern 34*b* that could impair the collimation function of the filtering device with tilted filtering pattern with respect to the X-axis 46.

Figure 18:
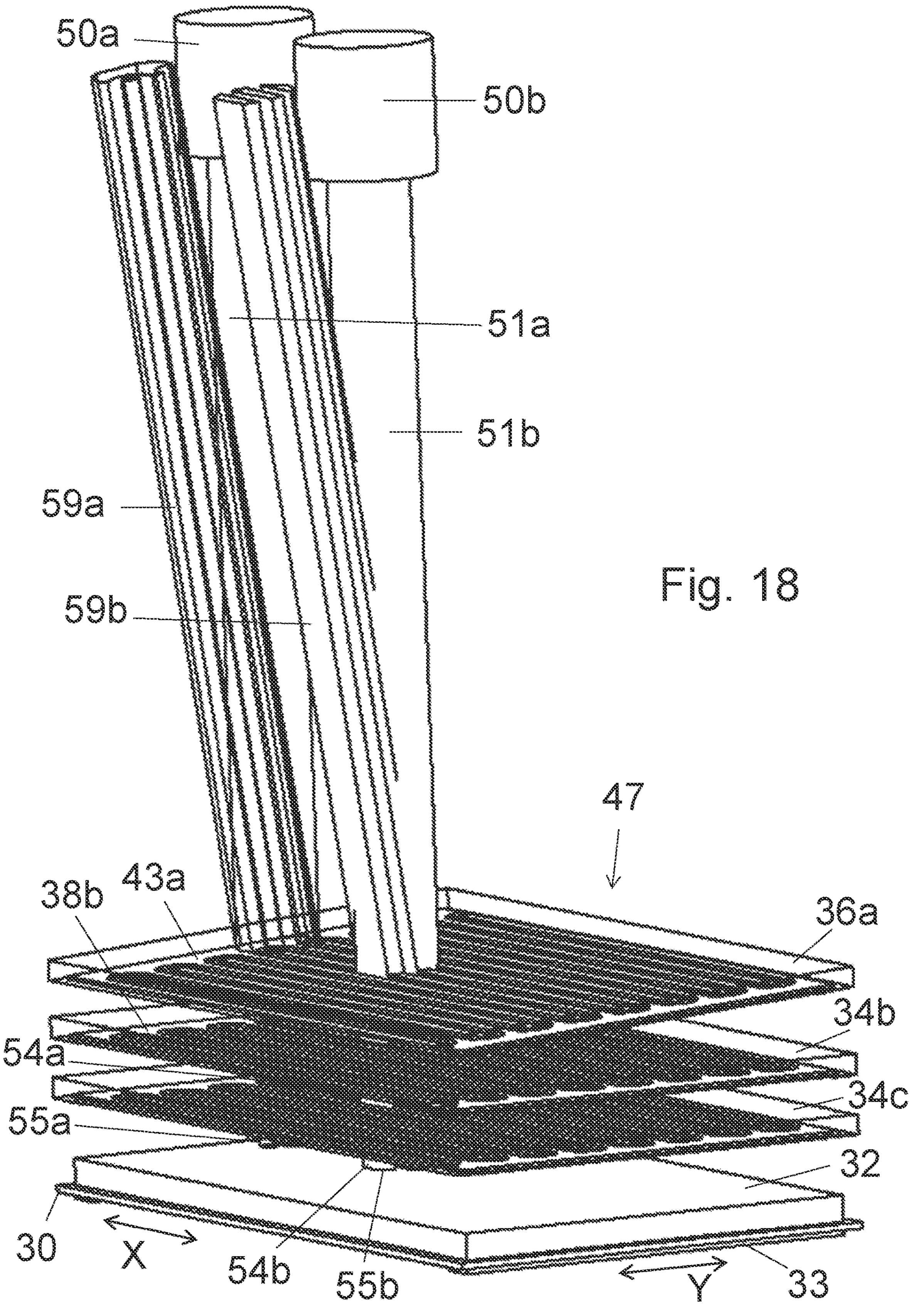
FIG. 18 is an isometric view of an embodiment of an alternative apparatus for laser cutting of the substrate with applied graphene layer of FIG. 1 using multiple laser beams producing multiple angled reflected laser beams in an embodiment of the laser cutting filtering device of the present invention.

FIG. 18 shows a variation of the arrangement of FIG. 17. In the example of FIG. 18, the filtering device with tilted filtering pattern with respect to the Y-axis 47 is used and the filtering pattern tilted with respect to the Y-axis 36*a* is placed at an angle to the laser beam 51*a*, 51*b* relative to the width along the Y-axis. The axis of the angle can be ascertained using the under contact 33 as reference.

FIG. 18 also differs from FIG. 17 by the fact that two laser beams 51*a*, 51*b* are used in parallel to reduce manufacturing time. More than two laser beams could be used to further reduce the manufacturing time in FIG. 18 as well as more than one in FIG. 17 if desired. The drawings in FIG. 17 were made with one laser beam and in FIG. 18 with two laser beams for simplicity and to avoid clutter that would make it harder to show all the detail.

The arrangement in FIG. 18 offers the significant advantage of allowing faster processing using multiple laser beams. Many laser beams can be used simultaneously provided that they are sufficiently separated to avoid interference and proper time for heat dissipation. The laser source 50*a*, 50*b* is placed directly above the filtering device with tilted filtering pattern with respect to the Y-axis 47 that is composed of one filtering pattern tilted with respect to the Y-axis 36*a* and several, two in the example of filtering patterns 34*b*, 34*c*. The laser beam 51*a*, 51*b* portions that are not reflected by the filtering pattern tilted with respect to the Y-axis 36*a* create many beam fringes 54*a*, 54*b* that hit the graphene layer 32 applied over the substrate 30 and produce the intended laser cut 55*a*, 55*b*.

The bulk of the reflected laser beam 59*a*, 59*b* is produced when the laser beam 51*a*, 51*b* hits the modified mirror layer 43*a* of the filtering pattern tilted with respect to the Y-axis 36*a*. As the filtering pattern tilted with respect to the Y-axis 36*a* is placed with its normal at a small to the laser beam 51*a*, 51*b*, the reflected laser beam 59*a*, 59*b* returns in a slightly different path than the path taken by the laser beam 51*a*, 51*b*. As a result the reflected laser beam 59*a*, 59*b* skips the laser source 50*a*, 50*b* and continues to a point where it is safely absorbed.

There are secondary reflections in the mirror layers of the subsequent filtering patterns 34*b*, 34*c* but as these secondary reflections are caused by divergence of the laser beam 51*a*, 51*b* they are substantially less powerful and are not a threat to the laser source 50*a*, 50*b*.

The advantage of the arrangement shown in FIG. 18 is that it is simpler and requires less components is cheaper than the arrangement described in FIG. 14. The disadvantage of the arrangement shown in FIG. 18 is that the small angle between the normal of the filtering pattern tilted with respect to the Y-axis 36*a* and the laser beam 51*a*, 51*b*, results in a small angle between the laser beam 51*a*, 51*b* and the reflected laser beam 59*a*, 59*b* that in turn forces the laser source 50*a*, 50*b* to be placed at a greater distance to the filtering pattern tilted with respect to the Y-axis 36*a* so that the reflected laser beam 59*a*, 59*b* has sufficient distance to skip the laser source 50*a*, 50*b*.

Operation—Second Embodiment

The preparation of the substrate 30 with the perforations 31 and the application of the graphene layer 32 on top of the substrate 30 and creating under contacts 33 made out of the same material used to create the graphene layer 32 as well as the preparation and operation of the filtering pattern 34 are made as described in the operation of the first embodiment of the present invention.

In FIG. 15 four laser beams are used simultaneously to cut the desired pattern into the graphene layer 32. More or less laser beams could instead be used but to avoid cluttering the explanation is made for a typical case with four laser beams.

The laser sources 50*a*, 50*b*, 50*c*, 50*d* are placed directly above the filtering patterns 34*a*, 34*b*, 34*c* and the graphene layer 32 applied over the substrate 30. The laser beams 51*a*, 51*b*, 51*c*, 51*d* portions that are not reflected create many beam fringes 54*a*, 54*b*, 54*c*, 54*d*, 54*e* that hit the graphene layer 32 and produce the intended laser cuts 55*a*, 55*b*, 55*c*, 55*d*.

The reflected laser beams 59*a*, 59*b*, 59*c*, 59*d* are produced when the laser beams 51*a*, 51*b*, 51*c*, 51*d* hit the mirror layer 38*a* of the filtering pattern 34*a* and the mirror layers of the subsequent filtering patterns 34*b*, 34*c*. As the filtering pattern 34*a* is placed perpendicular to the laser beams 51*a*, 51*b*, 51*c*, 51*d*, the reflected laser beams 59*a*, 59*b*, 59*c*, 59*d* return in the same path as the paths taken by the respective laser beams 51*a*, 51*b*, 51*c*, 51*d*. The long partial mirror 61 allows the laser beams 51*a*, 51*b*, 51*c*, 51*d* coming from the laser sources 50*a*, 50*b*, 50*c*, 50*d* to pass through but deflects the reflected laser beams 59*a*, 59*b*, 59*c*, 59*d* 90 degrees to a direction where they can be safely absorbed preventing potential damage to the laser sources 50*a*, 50*b*, 50*c*, 50*d*.

The laser sources 50*a*, 50*b*, 50*c*, 50*d* can move in the X and Y axis relative to the graphene layer 32 that is kept at the same relative position to the filtering patterns 34*a*, 34*b*, and 34*c* and the long partial mirror 61.

As the laser sources 50*a*, 50*b*, 50*c*, 50*d* move, the laser beams 51*a*, 51*b*, 51*c*, 51*d* hit different points in the filtering patterns 34*a*, 34*b*, 34*c* causing the beam fringes 54*a*, 54*b*, 54*c*, 54*d* to alter accordingly keeping the precise pattern that needs to be produced at the laser cut 55*a*, 55*b*, 55*c*, 55*d* points in the graphene layer 32 below. To maximize cutting efficiency, the laser beams 51*a*, 51*b*, 51*c*, 51*d* are produced orders of magnitude wider than the smallest dimensions in the filtering patterns 34*a*, 34*b*, 34*c* spreading the laser power over a larger area and producing a plurality, which might be several thousands, of beam fringes 54*a*, 54*b*, 54*c*, 54*d* that have each a tiny portion of the total energy contained in the laser beams. These low power beam fringes can cut the graphene layer more gently than a concentrated thin laser beam would, taking smaller chunks of material at each pass. However, as there are thousands of beam fringes the combined effect produces a faster and more reliable result than a single more powerful laser beam could possibly produce.

In the example of FIG. 17, the filtering pattern tilted with respect to the X-axis 35*a* is placed at an angle to the laser beam 51 relative to the X axis along the length of the filtering pattern tilted with respect to the X-axis 35*a*. The axis of the angle can be ascertained using the under contact 33 as reference.

The arrangement in FIG. 17 requires the filtering pattern tilted with respect to the X-axis 35*a* to be slightly modified. The filtering pattern tilted with respect to the X-axis 35*a* must be constructed taking the angle between the normal of the filtering pattern tilted with respect to the X-axis 35*a* and the laser beam 51 into consideration. This is easily achieved altering the pattern in the filtering pattern tilted with respect to the X-axis 35*a* in such a way that when seen by the laser beam 51 perspective, at an angle, it presents exactly the same pattern as the other filtering patterns 34*b* and 34*c* that are seen straight on. The laser beam 51 portions that are not reflected create many beam fringes 54 that hit the graphene layer 32 and produce the intended laser cut 55.

The laser source 50 can move in the X and Y axis relatively to the graphene layer 32 that is kept at the same relative position to the filtering device with tilted filtering pattern with respect to the X-axis 46.

As the laser source 50 moves, the laser beam 51 hits different points in the filtering pattern tilted with respect to the X-axis 35*a* and the filtering patterns 34*b*, 34*c* causing the beam fringes 54 to alter accordingly keeping the precise pattern that needs to be produced at the laser cut 55 point in the graphene layer 32 below. To maximize cutting efficiency, the laser beam 51 is produced orders of magnitude wider than the smallest dimensions in the filtering pattern tilted with respect to the X-axis 35*a* and the filtering patterns 34*b*, 34*c* spreading the laser power over a larger area and producing a plurality, which might be several thousands, of beam fringes 54 that have each a tiny portion of the total energy contained in the laser beam. These low power beam fringes can cut the graphene layer more gently than a concentrated thin laser beam would, taking smaller chunks of material at each pass. However, as there are a plurality, which might be thousands of beam fringes the combined effect produces a faster and more reliable result than a single more powerful laser beam could possibly produce.

The advantage of the arrangement shown in FIG. 17 is that it is simpler and requires less components is cheaper than the arrangement described in FIG. 14. The disadvantage of the arrangement shown in FIG. 17 is that the small angle between the normal of the filtering pattern tilted with respect to the X-axis 35*a* and the laser beam 51, results in a small angle between the laser beam 51 and the reflected laser beam 59 that in turn forces the laser source 50 to be placed at a greater distance to the filtering pattern tilted with respect to the X-axis 35*a* so that the reflected laser beam 59 has sufficient distance to skip the laser source 50.

In FIG. 18 two laser beams are used simultaneously to cut the desired pattern into the graphene layer 32. More or less laser beams could instead be used but to avoid cluttering the explanation is made for a typical case with two laser beams.

The laser sources 50*a*, 50*b* are placed directly above the filtering device with tilted filtering pattern with respect to the Y-axis 47 and the graphene layer 32 applied over the substrate 30. The laser beams 51*a*, 51*b* portions that are not reflected by the filtering pattern tilted with respect to the Y-axis 36*a* create many beam fringes 54*a*, 54*b* that hit the graphene layer 32 and produce the intended laser cuts 55*a*, 55*b*.

The bulk of the reflected laser beam 59*a*, 59*b* is produced when the laser beam 51*a*, 51*b* hits the modified mirror layer

43*a* of the filtering pattern tilted with respect to the Y-axis 36*a*. As the filtering pattern tilted with respect to the Y-axis 36*a* is placed with its normal at a small to the laser beam 51*a*, 51*b*, the reflected laser beam 59*a*, 59*b* returns in a slightly different path than the path taken by the laser beam 51*a*, 51*b*. As a result the reflected laser beam 59*a*, 59*b* skips the laser source 50*a*, 50*b* and continues to a point where it is safely absorbed.

There are secondary reflections in the mirror layers of the subsequent filtering patterns 34*b*, 34*c* but as these secondary reflections are caused by divergence of the laser beam 51*a*, 51*b* they are substantially less powerful and are not a threat to the laser source 50*a*, 50*b*.

The laser sources 50*a*, 50*b* can move in the X and Y axis relatively to the graphene layer 32 that is kept at the same relative position to the filtering device with tilted filtering pattern with respect to the Y-axis 47.

As the laser sources 50*a*, 50*b* move, the laser beams 51*a*, 51*b* hit different points in the filtering pattern tilted with respect to the Y-axis 36*a* and the filtering patterns 34*b*, 34*c* causing the beam fringes 54*a*, 54*b* to alter accordingly keeping the precise pattern that needs to be produced at the laser cut 55*a*, 55*b* points in the graphene layer 32 below. To maximize cutting efficiency, the laser beams 51*a*, 51*b* are produced orders of magnitude wider than the smallest dimensions in the filtering pattern tilted with respect to the X-axis 35*a* and the filtering patterns 34*b*, 34*c* spreading the laser power over a larger area and producing a plurality, which might be several thousands, of beam fringes 54*a*, 54*b* that have each a tiny portion of the total energy contained in the laser beams. These low power beam fringes can cut the graphene layer more gently than a concentrated thin laser beam would, taking smaller chunks of material at each pass. However, as there are a plurality, which might be thousands, of beam fringes the combined effect produces a faster and more reliable result than a single more powerful laser beam could possibly produce.

CONCLUSION

A new method to produce parts with laser cutting technology using a filtering pattern is presented. This method can produce parts with a very high number of fine details or in other words, the part can be fully covered by a pattern of detailed structures with details having dimensions 3 to 5 orders of magnitude smaller than the overall dimensions of the part and these parts can be produced in a reasonable timeframe that is several thousand times faster than what can be achieved using traditional laser cutting methods.

The proposed filtering pattern serves multiple purposes: a it serves as a pattern to the intended detail that must be cut; b it serves as a collimator that avoids or drastically reduces problems caused by laser beam divergence such as damage to unintended areas; c it serves as a beam splitter that dynamically splits a wide laser beam into several thousand very narrow child laser beams that are more suitable for cutting very delicate structures; d it serves as a means to allow simplification of the optics needed to focus the laser beam and assimilate imprecisions of the positioning control mechanism; e it creates flexibility in the production line where multiple filtering patterns using different mask designs can be easily made and these designs can be cheaply and quickly interchanged in the manufacturing line to produce a variety of devices to cope with different customer demands.

The proposed invention is very suitable to produce high performance double layer graphene supercapacitors that require a very high number of very fine detailed structures, such as fringes, to be constructed at very small separation from each other. Another requirement is a very high aspect ratio between the thickness of the individual fringes to accommodate as many fringes as possible in the width or length of the graphene slab and the height of the individual fringes so the fringes extend all the way from the bottom to the top of the graphene slab.

The proposed invention allows the construction of high performance, energy dense graphene supercapacitor in a timeframe compatible with mass production, several thousand times faster than other methods can. As a result, the produced devices can be manufactured at an affordable cost that allows them to be competitive in the market with other electricity storage devices.

While the invention has been disclosed by this specification, including its accompanying drawings and examples, various equivalents, modifications and improvements will be apparent to the person skilled in the art. Such equivalents, modifications and improvements are also intended to be encompassed by the following claims.

DRAWINGS—REFERENCE NUMERALS

| N | Item Name | Shown in FIGS. |
|---|---|---|
| 30 | substrate | 1 2 3 8 9 10 11 12 13 14 15 16 17 18 19 20 21 |
| 31 | perforations | 1 2 3 19 |
| 32 | graphene layer | 1 2 3 8 9 10 11 12 13 14 15 16 17 18 |
| 33 | under contact | 2 3 14 15 17 18 19 21 |
| 34 | filtering pattern | 4 4A 5 5A 5B 6 6A 6B 7 7A 7B 8 10 12 13 14 15 17 18 |
| 35 | filtering pattern tilted with respect to the X-axis | 6 6A 6B 14 17 |
| 36 | filtering pattern tilted with respect to the Y-axis | 7 7A 7B 18 |
| 37 | glass layer | 4 5 5A 6 6A 6B 7 7A 7B |
| 38 | mirror layer | 4 5 5A 6 6A 7 7A 13 14 15 17 18 |
| 39 | sealant layer | 5A 5B 6A 6B 7A 7B |
| 40 | terminal | 4 |
| 41 | fringe | 4 5 5A 5B 6 6A 6B 7 7A 7B |
| 42 | modified glass layer | 6 6A 6B 7 7A 7B |
| 43 | modified mirror layer | 6 6A 7 7A 14 17 18 |
| 44 | modified sealant layer | 6A 6B 7A 7B |
| 45 | filtering device | 5 5A 58 8 10 12 13 15 |
| 46 | filtering device with tilted filtering pattern with respect to the X-axis | 6 6A 6B 14 17 |
| 47 | filtering device with tilted filtering pattern with respect to the Y-axis | 7 7A 7B 18 |
| 48 | incoming ray | 5A 6A 7A |
| 49 | reflected ray | 5A 6A 7A |
| 50 | laser source | 8 10 12 13 14 15 17 18 |
| 51 | laser beam | 8 10 12 13 14 15 17 18 |
| 52 | mirror | 8 10 13 14 |
| 53 | lens | 8 10 12 13 14 |
| 54 | beam fringe | 8 10 12 14 15 17 18 |
| 55 | laser cut | 8 9 10 12 14 15 16 17 18 |
| 56 | cut path | 10 11 |
| 57 | prism | 12 |
| 58 | partial mirror | 13 |
| 59 | reflected laser beam | 13 14 15 17 18 |
| 60 | assimilator | 13 14 17 |
| 61 | long partial mirror | 15 |
| 62 | processed graphene layer | 19 20 21 22 |
| 63 | terminal | 19 20 21 22 |
| 64 | fringe | 19 20 |
| 65 | unconnected fringe | 20 |
| 66 | element stack | 21 |

-continued

| DRAWINGS—REFERENCE NUMERALS | | |
|---|---|---|
| N | Item Name | Shown in FIGS. |
| 67 | base | 21 22 |
| 68 | supercapacitor assembly | 22 |
| 69 | cover | 22 |
| 70 | metallic contact | 22 |

The invention claimed is:

1. A filtering device for the collimation of a laser beam suitable for the production of high-density supercapacitors having high energy capacity comprising:

a sealant layer;

a substrate;

a plurality of filtering patterns, each filtering pattern comprising a pattern formed by a plurality of gaps formed within the sealant layer, the gaps designed to allow the laser beam to pass through the sealant layer and produce cuts on the substrate;

wherein the plurality of filtering patterns are placed at variable distances to each other in perfect alignment so that when seen from the point of view of the incident laser beam all filtering patterns are seen as a single filtering pattern and correspondent gaps in the filtering patterns are seen as a single gap;

wherein the filtering device is configured to reflect or absorb portions of a laser beam that enter the plurality of filtering patterns at diversion angles non-perpendicular to the plurality of filtering patterns and at angles greater than the angle allowed by the edges of correspondent gaps in the first and last filtering pattern and smaller than a maximum diversion angle of the laser source.

2. The filtering device for the collimation of a laser beam suitable for the production of high-density supercapacitors having high energy capacity according to claim 1 comprising:

a mirror layer, having a pattern identical to and perfectly aligned with the pattern in the sealant layer, configured to allow the laser beam to pass through the mirror layer and the sealant layer and produce cuts on the substrate.

3. The filtering device for the collimation of a laser beam suitable for the production of high-density supercapacitors having high energy capacity according to claim 2, wherein the mirror layer is formed on a surface of a glass layer and the mirror layer is designed to reflect the laser beam; and wherein the mirror layer is formed between the sealant layer and the glass layer in such a way that the mirror layer is isolated from the atmosphere and the sealant layer is designed to absorb the laser beam.

4. The filtering device for the collimation of a laser beam suitable for the production of high-density supercapacitors having high energy capacity according to claim 3, wherein at least one of the plurality of filtering patterns formed by the plurality of gaps creates a first terminal and a second terminal;

wherein the first terminal and the second terminal each contain a plurality of alternate fringes, each fringe connected to a terminal in an alternate pattern; and wherein the first terminal pattern and second terminal pattern are physically separated from each other by a continuous gap between the first terminal pattern and the second terminal pattern, the gap configured to allow the laser beam to pass through and produce cuts on the substrate.

5. The filtering device for the collimation of a laser beam suitable for the production of high-density supercapacitors having high energy capacity according to claim 4, wherein the width of the gap between the first terminal pattern and the second terminal pattern is fifty microns or less.

6. The filtering device for the collimation of a laser beam suitable for the production of high-density supercapacitors having high energy capacity according to claim 4, wherein the width of the gap between the isolated fringes, the fringes connected to the first terminal pattern and the fringes connected to the second terminal pattern is fifty microns or less.

7. The filtering device for the collimation of a laser beam suitable for the production of high-density supercapacitors having high energy capacity according to claim 3, wherein the pattern formed by the plurality of gaps creates a first terminal and a second terminal and isolated fringes;

wherein the first terminal and the second terminal each contain a plurality of alternate fringes, each fringe connected to a terminal in an alternate pattern and the plurality of isolated fringes are not connected to any terminal;

wherein one or more of the isolated fringes are placed between each fringe connected to the first terminal pattern and each fringe connected to the second terminal pattern, in such a way that a continuous gap prevents physical contact among the isolated fringes or the first terminal pattern and the second terminal pattern, the gap configured to allow the laser beam to pass through and produce cuts on the substrate.

8. The filtering device for the collimation of a laser beam suitable for the production of high-density supercapacitors having high energy capacity according to claim 1:

wherein the filtering patterns formed by the plurality of gaps create a first terminal and a second terminal;

wherein the first terminal and the second terminal each contain a plurality of alternate fringes, each fringe connected to a terminal in an alternate pattern;

wherein the first terminal pattern and second terminal pattern are physically separated from each other by a continuous gap between the first terminal pattern and the second terminal pattern, the gap configured to allow the laser beam to pass through and produce cuts on the substrate.

9. The filtering device for the collimation of a laser beam suitable for the production of high-density supercapacitors having high energy capacity according to claim 1;

wherein the filtering patterns formed by the plurality of gaps creates a first terminal and a second terminal and isolated fringes;

wherein the first terminal and the second terminal each contain a plurality of alternate fringes, each fringe connected to a terminal in an alternate pattern and the plurality of isolated fringes are not connected to any terminal;

wherein one or more of the isolated fringes are placed between each fringe connected to the first terminal pattern and each fringe connected to the second terminal pattern, in such a way that a continuous gap prevents physical contact among the isolated fringes or the first terminal pattern and the second terminal pattern, the gap configured to allow the laser beam to pass through and produce cuts on the substrate.

10. The filtering device for the collimation of a laser beam suitable for the production of high-density supercapacitors having high energy capacity according to claim 1 wherein the plurality of filtering patterns is configured to be aligned beneath a laser beam.

11. The filtering device for the collimation of a laser beam suitable for the production of high-density supercapacitors having high energy capacity according to claim 1 comprising:

a glass layer;

wherein the sealant layer is formed on a surface of the glass layer and the sealant layer is designed to absorb the laser beam.

12. A method for the production of a supercapacitor using a filtering device and laser, comprising:

forming a plurality of filtering patterns with gaps in the intended pattern to be created;

aligning the plurality of filtering patterns with a laser source;

aligning a substrate to the plurality of filtering patterns;

emitting a laser beam from the laser source;

reflecting or absorbing portions of the laser beam that encounter a reflective or absorptive structure in any of the plurality of filtering patterns;

cutting the substrate with the portion of the laser beam entering the gaps to produce the pattern contained in the filtering patterns, resulting in a structure with a first terminal and a second terminal of a supercapacitor.

13. The method for the production of a supercapacitor using a filtering device and laser of claim 12, wherein the substrate comprises a graphene layer.

14. The method for the production of a supercapacitor using a filtering device and laser of claim 12, wherein the substrate comprises a graphite layer.

15. The method for the production of a supercapacitor using a filtering device and laser of claim 12, wherein the substrate comprises perforations and a graphene layer, with the graphene layer extending through the perforations.

16. The method for the production of a supercapacitor using a filtering device and laser of claim 12 comprising tilting one of the plurality of filtering patterns at an angle with respect to an axis.

17. The method for the production of a supercapacitor using a filtering device and laser of claim 12 comprising a plurality of laser sources.

18. The method for the production of a supercapacitor using a filtering device and laser of claim 12 comprising diverting the axis of the laser beam off of a mirror, the mirror configured to deflect reflected laser beams to prevent damage to the laser source.

* * * * *